(12) United States Patent
Clark

(10) Patent No.: US 11,948,206 B2
(45) Date of Patent: Apr. 2, 2024

(54) SYSTEMS AND METHODS FOR BUILDING AND MANAGING AN INTEGRATED PERMANENT LIFE INSURANCE PRODUCT USING INDIVIDUAL TERM AND ANNUITY POLICIES

(71) Applicant: AmerUs Group Inc., Clive, IA (US)

(72) Inventor: Brian J. Clark, Clive, IA (US)

(73) Assignee: AmerUs Group Inc., Clive, IA (US)

( * ) Notice: Subject to any disclaimer, the term of this patent is extended or adjusted under 35 U.S.C. 154(b) by 0 days.

(21) Appl. No.: 18/235,703

(22) Filed: Aug. 18, 2023

(65) Prior Publication Data

US 2023/0394589 A1 Dec. 7, 2023

Related U.S. Application Data

(63) Continuation-in-part of application No. 17/587,244, filed on Jan. 28, 2022.

(60) Provisional application No. 63/142,582, filed on Jan. 28, 2021.

(51) Int. Cl.
*G06Q 40/08* (2012.01)
*G06Q 10/067* (2023.01)

(52) U.S. Cl.
CPC .......... *G06Q 40/08* (2013.01); *G06Q 10/067* (2013.01)

(58) Field of Classification Search
CPC .................................................. G06Q 40/08
See application file for complete search history.

(56) References Cited

U.S. PATENT DOCUMENTS

| 8,660,863 B2* | 2/2014 | Berlin .............. G06Q 30/02 705/4 |
| 10,535,101 B2* | 1/2020 | Hilario ............. G06Q 40/08 |
| 2003/0187768 A1* | 10/2003 | Ryan ................ G06Q 40/08 705/35 |

(Continued)

*Primary Examiner* — Scott S Trotter
*Assistant Examiner* — William D Newlon
(74) *Attorney, Agent, or Firm* — Bryan Cave Leighton Paisner LLP

(57) ABSTRACT

Systems and methods including one or more processors and one or more non-transitory computer readable media storing computing instructions that, when executed on the one or more processors coordinate analysis of data streams from separate computing systems communicatively coupled to different computing networks to build a personalized permanent life insurance product. In particular, the coordinated analysis builds a permanent life insurance product where one or more term life insurance policies, one or more annuity policies, and qualified additional benefit policies are combined into one master product for the purpose of creating a new overarching permanent life insurance product on the same insured. Systems and methods disclosed herein include IRC section 7702 & 7702A compliance testing on the insured's portfolio of individual policies as an integrated permanent life insurance product. Systems and methods herein include a user interface to facilitate the consumer's ability to create and manage their own unique, flexible permanent life insurance policy for federal income tax purposes that may include multiple individual term life insurance and annuity policies and qualified additional benefit policies issued by different insurance companies.

1 Claim, 70 Drawing Sheets

(56) References Cited

U.S. PATENT DOCUMENTS

| | | | |
|---|---|---|---|
| 2013/0231964 A1* | 9/2013 | Schiminovich | G06Q 40/08 |
| | | | 705/4 |
| 2017/0061543 A1* | 3/2017 | Kosmos | G06Q 40/08 |
| 2021/0279810 A1* | 9/2021 | Pancholi | G06F 3/0482 |

* cited by examiner

Sample Indexed UL Policy $1 M Face (Option B: DB = Face Amt + AV)

| Age | Policy Year | Premium | Premium Load | COI | Per K Expense | Policy Fee | AV Charge | Total Expenses | Illustrated Account Value (1) | Unbundled Product $1 M Face 30 Year Guar Term | Annuity Premium | Illustrated Account Value (2) |
|---|---|---|---|---|---|---|---|---|---|---|---|---|
| 45 | 1 | $16,810 | $1,009 | $153 | $4,590 | $72 | $22 | $5,846 | $11,251 | $2,180 | $14,630 | $15,164 |
| 46 | 2 | $16,810 | $1,009 | $250 | $4,590 | $72 | $63 | $5,984 | $22,967 | $2,180 | $14,630 | $30,881 |
| 47 | 3 | $16,810 | $1,009 | $339 | $4,590 | $72 | $106 | $6,116 | $35,200 | $2,180 | $14,630 | $47,173 |
| 48 | 4 | $16,810 | $1,009 | $417 | $4,590 | $72 | $151 | $6,239 | $47,995 | $2,180 | $14,630 | $64,058 |
| 49 | 5 | $16,810 | $1,009 | $491 | $4,590 | $72 | $198 | $6,360 | $61,391 | $2,180 | $14,630 | $81,561 |
| 50 | 6 | $16,810 | $1,009 | $686 | $4,590 | $72 | $247 | $6,604 | $75,757 | $2,180 | $14,630 | $99,702 |
| 51 | 7 | $16,810 | $1,009 | $782 | $4,590 | $72 | $299 | $6,752 | $90,887 | $2,180 | $14,630 | $118,505 |
| 52 | 8 | $16,810 | $1,009 | $895 | $4,590 | $72 | $356 | $6,922 | $106,811 | $2,180 | $14,630 | $137,994 |
| 53 | 9 | $16,810 | $1,009 | $1,031 | $4,590 | $72 | $414 | $7,116 | $123,553 | $2,180 | $14,630 | $158,195 |
| 54 | 10 | $16,810 | $1,009 | $1,196 | $4,590 | $72 | $475 | $7,342 | $141,133 | $2,180 | $14,630 | $179,133 |
| 55 | 11 | $16,810 | $1,009 | $1,373 | - | $72 | $549 | $3,003 | $164,465 | $2,180 | $14,630 | $200,835 |
| 56 | 12 | $16,810 | $1,009 | $1,566 | - | $72 | $634 | $3,281 | $189,005 | $2,180 | $14,630 | $223,330 |
| 57 | 13 | $16,810 | $1,009 | $1,775 | - | $72 | $724 | $3,580 | $214,809 | $2,180 | $14,630 | $246,645 |
| 58 | 14 | $16,810 | $1,009 | $1,993 | - | $72 | $819 | $3,893 | $241,944 | $2,180 | $14,630 | $270,812 |
| 59 | 15 | $16,810 | $1,009 | $2,222 | - | $72 | $918 | $4,221 | $270,480 | $2,180 | $14,630 | $295,860 |
| 64 | 20 | $16,810 | $1,009 | $3,447 | - | $72 | $1,500 | $6,028 | $437,319 | $2,180 | $14,630 | $435,504 |
| 69 | 25 | $16,810 | $1,009 | $6,776 | - | $72 | $2,236 | $10,093 | $647,438 | $2,180 | $14,630 | $602,561 |
| 74 | 30 | $16,810 | $1,009 | $12,364 | - | $72 | - | $13,445 | $917,671 | $2,180 | $14,630 | $802,415 |
| Total | | $504,300 | | | | | | $206,303 | | $65,400 | | |
| | | | | | | | 30 Year Expenses as % Premium | 41% | | 13% | | |

(1) Credited Rate 5.73% for 5 Years; 6.3% for Years 6+ (10% Bonus), 9.00% Annual Cap on S&P 500
(2) Credited Rate 3.62% in All Years; 5.50% Annual Cap on S&P 500, April 4th, 2021 New Money Rates.

FIG. 1

|  | First Year Sales Cost | | | Renewal Years Cost | |
|---|---|---|---|---|---|
|  | Premium | Rate | Amount | Rate | Amount |
| Premium | $16,810 | 135% | $ 22,694 ~5 | 4% | $ 672 |
| Term | $ 2,180 | 135% | $ 2,943 | 4% | $ 87 |
| Annuity | $14,630 | 7% | $ 1,024 | 7% | $ 1,024 |
| Total | $16,810 | | $ 3,967 ~6 | | $ 1,111 |
| Difference | | | $ 18,726 | | $ (439) |

FIG. 2

Corridor Factors By Attained Age for Guideline Premium Test

| Age | Factor | Age | Factor | Age | Factor | Age | Factor |
|---|---|---|---|---|---|---|---|
| Under 40 | 250% | 50 | 185% | 60 | 130% | 70 | 115% |
| 41 | 243% | 51 | 178% | 61 | 128% | 71 | 113% |
| 42 | 236% | 52 | 171% | 62 | 126% | 72 | 111% |
| 43 | 229% | 53 | 164% | 63 | 124% | 73 | 109% |
| 44 | 222% | 54 | 157% | 64 | 122% | 74 | 107% |
| 45 | 215% | 55 | 150% | 65 | 120% | 75-90 | 105% |
| 46 | 209% | 56 | 146% | 66 | 119% | 91 | 104% |
| 47 | 203% | 57 | 142% | 67 | 118% | 92 | 103% |
| 48 | 197% | 58 | 138% | 68 | 117% | 93 | 102% |
| 49 | 191% | 59 | 134% | 69 | 116% | 94 | 101% |
|  |  |  |  |  |  | 95+ | 100% |

FIG. 3

| | Interest Credits | Withdrawals & Surrenders | Policy Loans | Death Benefits | Mortality Cost |
|---|---|---|---|---|---|
| Permanent Life | Tax deferred | Cost basis first then net gain taxed | Not taxed | Tax free including accumlated interest credits | Netted against interest gains |
| Permanent Life (Modified Endowment Contract) | Tax deferred | Taxable Event (income out first, then cost basis) | Taxable Event (same as withdrawal) | Tax free including accumlated interest credits | Netted against interest gains |
| Term Insurance | N/A | N/A | N/A | Tax Free | Premium paid with after-tax dollars |
| Annuities | Tax deferred | Taxable Event (income out first, then cost basis) | Taxable Event (same as withdrawal) | Taxed same as a surrender | N/A |

FIG. 4

Basic Actuarial Formulas for IRS Section 7702

A. Cash Value Accumulation Test ("CVAT")

$$\text{Net Single Premium}(x) = DB(x) * [\sum_{n=0}^{m+x-1} (v^{n+1} * {}_nP_x * Q_{x+n}) * A + ({}_{m-x}P_x * v^{m-x})]$$

Compliant Policy: Net Single Premium(x) > CV(x)

- $DB(x)$ is the Total Death Benefit of the Policy at the Insured's Age x
- FA is the Face Amount of the Policy (e.g., Death Benefit at Issue Age x)
- M is the Age Upon Which the Policy is Deemed to Mature for these Calculation Purposes (e.g., 95)
- $v = 1 / (1 + i)$ where i is the Discount Rate
- $A = i /$ Natural log $(1+i)$; Adjustment for Immediate Payment of Death Claims Assumption
- ${}_nP_x$ Represents the probability of Insured age X Living N Years (Survivorship Rate)
- $Q_{x+n}$ Represents the probability of Death in the Year the Insured is age $(x + n)$
- $CV(x)$ Represents the "Cash Value" of the Policy at Insured's age X
- $\text{Premium}_n$ Represents the Actual Premium Paid into the Policy in Year n

B. Guideline Premium Test ("GPT")

Guideline Single Premium (GSP) =

$$\frac{[FA * [\sum_{n=0}^{m+x-1} (v^{n+1} * {}_nP_x * Q_{x+n})] * A + [\sum_{n=0}^{m+x-1} (v^n * {}_nP_x * E_{n+1}) + FA * ({}_{m-x}P_x * v^{m-x})]}{(1-L_1)}$$

Guideline Level Premium "GLP" (Level Death Benefit Policy) = $GSP / \sum_{n=0}^{w+x-1} [V^N * {}_nP_x / (1-L_{n+1})]$ Guideline Level Premium "GLP" (Increasing Death Benefit Policy) =

$$[FA * [\sum_{n=0}^{m+x-1} (v^{n+1} * Q_{x+n})] * A + [\sum_{n=0}^{m+x-1} (V^n * E_{n+1}) + FA * v^{m-x}] / [\sum_{n=0}^{m+x-1} V^N / (1 - L_{n+1})]$$

FIG. 5

Compliant Policy (part 1): $\sum_{n=1}^{T}$ Premium$_n$ < Greater of [GSP, GLP* N] for all Years (T = 1 to Termination)

- E$_n$ is the Policy Expenses in Year N Exclusive of any Premium-based Load
- L$_{n+1}$ Represents the Premium Load (Expense %) for Policy Year (n+1)

Corridor Test

Compliant Policy (Part 2): CV(x) < DB(x) x Corridor Factor(x)     (see Fig 3 for x=Attained Age Factor)

C. IRS Section 7702A Modified Endowment Contract ("MEC" aka 7-pay Premium Test)

Annual 7$_{pay}$ =[FA* [ $\sum_{n=0}^{m+x-1}$ (v$^{n+1}$ * $_n$P$_x$ * Q$_{x+n}$) *A + ($_{m-x}$P$_x$*V$^{m-x}$)] / $\sum_{n=0}^{6}$ V$^N$ * $_n$P$_x$ Non-MEC Life Policies: $\sum_{n=1}^{T}$ Premium$_n$ < $\sum_{n=1}^{T}$ Annual 7$_{pay}$ * T     for T = 1 to 7

NP Test: New 7-pay = [Net Single Premium(Current DB) + Net NP - CV(x)] / $\sum_{n=0}^{6}$ V$^N$ * $_n$P$_x$ Net NP = Amount of Premium Paid in Excess of Necessary Premium Test Limit at Restart

FIG. 5 (Cont.)

| Calender Year | Insurance Interest Rate | Rate of GLP, MEC & CVAT | Rate for GSP |
|---|---|---|---|
| 2017 | 4.00% | 4.00% | 6.00% |
| 2018 | 4.00% | 4.00% | 6.00% |
| 2019 | 4.00% | 4.00% | 6.00% |
| 2020 | 4.00% | 4.00% | 6.00% |
| 2021 | 2.00% | 2.00% | 4.00% |
| 2022 | 2.00% | 2.00% | 4.00% |
| 2023 | 2.00% | 2.00% | 4.00% |
| 2024 | 2.00% | 2.00% | 4.00% |
| 2025 | 3.00% | 3.00% | 5.00% |
| 2026 | 3.00% | 3.00% | 5.00% |
| 2027 | 3.00% | 3.00% | 5.00% |

| Discount Rate for GLP, MEC & CVAT (GSP is 2% higher) | | | | | |
|---|---|---|---|---|---|
| Year 1 | Year 2 | Year 3 | Year 4 | Year 5 | Year 6+ |
| 5% | 5% | 5% | 4% | 4% | 4% |
| 5% | 5% | 5% | 4% | 4% | 4% |
| 5% | 5% | 5% | 4% | 4% | 4% |
| 5% | 5% | 5% | 4% | 4% | 4% |
| 5% | 5% | 5% | 4% | 2% | 2% |
| 5% | 5% | 5% | 2% | 2% | 2% |
| 5% | 5% | 5% | 2% | 2% | 2% |
| 5% | 5% | 5% | 2% | 2% | 2% |
| 5% | 5% | 5% | 3% | 3% | 3% |
| 5% | 5% | 5% | 3% | 3% | 3% |
| 5% | 5% | 5% | 3% | 3% | 3% |

Annuity Interest Rates
Guarantees: 5% for 3 Years; 1% Thereafter
Credited Rates: 5% for 3 Years; 3% Thereafter

| Calender Year | Annuity Account Value by Year of Purchase | | | | | | | | | | | Total AV |
|---|---|---|---|---|---|---|---|---|---|---|---|---|
| | 2017 | 2018 | 2019 | 2020 | 2021 | 2022 | 2023 | 2024 | 2025 | 2026 | 2027 | |
| 2017 | $1,000.00 | | | | | | | | | | | $1,000.00 |
| 2018 | $1,050.00 | $1,000.00 | | | | | | | | | | $2,050.00 |
| 2019 | $1,102.50 | $1,050.00 | $1,000.00 | | | | | | | | | $3,152.50 |
| 2020 | $1,157.63 | $1,102.50 | $1,050.00 | $1,000.00 | | | | | | | | $4,310.14 |
| 2021 | $1,192.35 | $1,157.63 | $1,102.50 | $1,050.00 | $1,000.00 | | | | | | | $5,502.48 |
| 2022 | $1,228.12 | $1,192.35 | $1,157.63 | $1,102.50 | $1,050.00 | $1,000.00 | | | | | | $6,730.60 |
| 2023 | $1,264.97 | $1,228.12 | $1,192.35 | $1,157.63 | $1,102.50 | $1,050.00 | $1,000.00 | | | | | $7,995.57 |
| 2024 | $1,302.92 | $1,264.97 | $1,228.12 | $1,192.35 | $1,157.63 | $1,102.50 | $1,050.00 | $1,000.00 | | | | $9,298.49 |
| 2025 | $1,342.00 | $1,302.92 | $1,264.97 | $1,228.12 | $1,192.35 | $1,157.63 | $1,102.50 | $1,050.00 | $1,000.00 | | | $10,640.49 |
| 2026 | $1,382.26 | $1,342.00 | $1,302.92 | $1,264.97 | $1,228.12 | $1,192.35 | $1,157.63 | $1,102.50 | $1,050.00 | $1,000.00 | | $12,022.76 |
| 2027 | $1,423.73 | $1,382.26 | $1,342.00 | $1,302.92 | $1,264.97 | $1,228.12 | $1,192.35 | $1,157.63 | $1,102.50 | $1,050.00 | $1,000.00 | $13,446.49 |

FIG. 6

| Future Duration | Prospective Discount Rates for Calculating 7702 and 7702A Definitional Limits at End of 2027 Portfolio of Annuities | | | | | | | | | | | Weighted Avg Disc Rate 12 |
|---|---|---|---|---|---|---|---|---|---|---|---|---|
| | 2017 | 2018 | 2019 | 2020 | 2021 | 2022 | 2023 | 2024 | 2025 | 2026 | 2027 | |
| 1 | 4% | 4% | 4% | 4% | 2% | 2% | 2% | 2% | 5% | 5% | 5% | 3.51% |
| 2 | 4% | 4% | 4% | 4% | 2% | 2% | 2% | 2% | 3% | 5% | 5% | 3.35% |
| 3 | 4% | 4% | 4% | 4% | 2% | 2% | 2% | 2% | 3% | 3% | 5% | 3.19% |
| 4 | 4% | 4% | 4% | 4% | 2% | 2% | 2% | 2% | 3% | 3% | 3% | 3.05% |
| 5 | 4% | 4% | 4% | 4% | 2% | 2% | 2% | 2% | 3% | 3% | 3% | 3.05% |
| 6 | 4% | 4% | 4% | 4% | 2% | 2% | 2% | 2% | 3% | 3% | 3% | 3.05% |
| 7 | 4% | 4% | 4% | 4% | 2% | 2% | 2% | 2% | 3% | 3% | 3% | 3.05% |
| 8 | 4% | 4% | 4% | 4% | 2% | 2% | 2% | 2% | 3% | 3% | 3% | 3.05% |
| 9 | 4% | 4% | 4% | 4% | 2% | 2% | 2% | 2% | 3% | 3% | 3% | 3.05% |
| 10 | 4% | 4% | 4% | 4% | 2% | 2% | 2% | 2% | 3% | 3% | 3% | 3.05% |

FIG. 6 (Cont.)

Face Amount $1,000,000  Yearly Renewal Term Policy
Baseline A: 2020 with IIR = 4% (Static)

MEC 7 PAY LIMIT 39.84 / $ 39,845 — 156
CVAT NSP AT ISSUE $ 247.34 / $247,339 — 160

| | | 2017 CSO Male NS ANB Qx | | | MEC/CVAT/GL | | | Guideline Single | | | Per 1000: 7702A Limit | | Per 1000: 7702 Limit | | at issue | Max CV/1000 |
|---|---|---|---|---|---|---|---|---|---|---|---|---|---|---|---|---|
| Age | Expenses | | tPx | Discount Rate | IPC Factor | PV Factor | Discount Rate | IPC Factor | PV Factor | PV Guar Mort | PV Endow | PV Guar Mort | 7 pay ann | PV Guar Mort | PV Endow | |
| | 144 | 145 | 146 | 147 | 148 | 149 | 150 | 151 | 152 | 153 | 154 | 157 | 155 | 157 | 158 | 159 |
| 45 | $ 120 | 0.00183 | 0.99817 | 4.00% | 1.01987 | 0.96154 | 6.00% | 1.02971 | 0.94340 | $ 233,433 | $ 13,906 | $ 233,433 | $ 6.21 | $ 1,795 | $ 13,906 | $ 247,339 |
| 46 | $ 120 | 0.00191 | 0.99626 | 4.00% | 1.01987 | 0.92456 | 6.00% | 1.02971 | 0.89000 | | | 1,795 | 1.00 | 1,798 | | 255,834 |
| 47 | $ 120 | 0.00197 | 0.99430 | 4.00% | 1.01987 | 0.88900 | 6.00% | 1.02971 | 0.83962 | | | 1,798 | 0.96 | 1,779 | | 264,625 |
| 48 | $ 120 | 0.00205 | 0.99226 | 4.00% | 1.01987 | 0.85480 | 6.00% | 1.02971 | 0.79209 | | | 1,779 | 0.92 | 1,777 | | 273,740 |
| 49 | $ 120 | 0.00214 | 0.99014 | 4.00% | 1.01987 | 0.82193 | 6.00% | 1.02971 | 0.74726 | | | 1,777 | 0.88 | 1,780 | | 283,180 |
| 50 | $ 120 | 0.00225 | 0.98791 | 4.00% | 1.01987 | 0.79031 | 6.00% | 1.02971 | 0.70496 | | | 1,780 | 0.85 | 1,796 | | 292,951 |
| 51 | $ 120 | 0.00242 | 0.98552 | 4.00% | 1.01987 | 0.75992 | 6.00% | 1.02971 | 0.66506 | | | 1,796 | 0.81 | 1,853 | | 303,056 |
| 52 | $ 120 | 0.00263 | 0.98293 | 4.00% | 1.01987 | 0.73069 | 6.00% | 1.02971 | 0.62741 | | | 1,853 | 0.78 | 1,932 | | 313,469 |
| 53 | $ 120 | 0.00288 | 0.98010 | 4.00% | 1.01987 | 0.70259 | 6.00% | 1.02971 | 0.59190 | | | 1,932 | | 2,028 | | 324,178 |
| 54 | $ 120 | 0.00314 | 0.97702 | 4.00% | 1.01987 | 0.67556 | 6.00% | 1.02971 | 0.55839 | | | 2,028 | | 2,120 | | 335,173 |
| 55 | $ 120 | 0.00340 | 0.97370 | 4.00% | 1.01987 | 0.64958 | 6.00% | 1.02971 | 0.52679 | | | 2,120 | | 2,201 | | 346,466 |
| 56 | $ 120 | 0.00364 | 0.97015 | 4.00% | 1.01987 | 0.62460 | 6.00% | 1.02971 | 0.49697 | | | 2,201 | | 2,258 | | 358,074 |
| 57 | $ 120 | 0.00387 | 0.96640 | 4.00% | 1.01987 | 0.60057 | 6.00% | 1.02971 | 0.46884 | | | 2,258 | | 2,300 | | 370,032 |
| 58 | $ 120 | 0.00411 | 0.96243 | 4.00% | 1.01987 | 0.57748 | 6.00% | 1.02971 | 0.44230 | | | 2,300 | | 2,339 | | 382,366 |
| 59 | $ 120 | 0.00439 | 0.95820 | 4.00% | 1.01987 | 0.55526 | 6.00% | 1.02971 | 0.41727 | | | 2,339 | | 2,393 | | 395,093 |
| 60 | $ 120 | 0.00474 | 0.95366 | 4.00% | 1.01987 | 0.53391 | 6.00% | 1.02971 | 0.39365 | | | 2,393 | | 2,473 | | 408,211 |
| 61 | $ 120 | 0.00521 | 0.94869 | 4.00% | 1.01987 | 0.51337 | 6.00% | 1.02971 | 0.37136 | | | 2,473 | | 2,601 | | 421,705 |
| 62 | $ 120 | 0.00579 | 0.94320 | 4.00% | 1.01987 | 0.49363 | 6.00% | 1.02971 | 0.35034 | | | 2,601 | | 2,765 | | 435,528 |
| 63 | $ 120 | 0.00644 | 0.93713 | 4.00% | 1.01987 | 0.47464 | 6.00% | 1.02971 | 0.33051 | | | 2,765 | | 2,940 | | 449,648 |
| 64 | $ 120 | 0.00717 | 0.93041 | 4.00% | 1.01987 | 0.45639 | 6.00% | 1.02971 | 0.31180 | | | 2,940 | | 3,127 | | 464,054 |
| 65 | $ 120 | 0.00796 | 0.92300 | 4.00% | 1.01987 | 0.43883 | 6.00% | 1.02971 | 0.29416 | | | 3,127 | | 3,315 | | 478,737 |

FIG. 15

| Face Amount $1,000,000 | | Yearly Renewal Term Policy<br>Baseline A: 2020 with IIR = 4% (Static) | | | | | | | MEC 7 PAY LIMIT<br>Per 1000: 39.84<br>7702A Limit: $ 39,845 | | | | CVAT NSP AT ISSUE<br>Per 1000: $ 247.34<br>7702 Limit $247,339 at issue | | |
|---|---|---|---|---|---|---|---|---|---|---|---|---|---|---|---|---|
| | | 2017 CSO Male NS ANB Qx | | | MEC/CVAT/GL | | | Guideline Single | | | | | | | | |
| Age | Expenses | 145 | tPx 146 | Discount Rate 147 | IPC Factor 148 | PV Factor 149 | Discount Rate 150 | IPC Factor 151 | PV Factor 152 | PV Guar Mort 153 | PV Endow 154 | 7 pay ann 155 | PV Guar Mort 157 | PV Endow 158 | Max CV/1000 159 |
| 66 | $ 120 | 0.00881 | 0.91487 | 4.00% | 1.01987 | 0.42196 | 6.00% | 1.02971 | 0.27751 | $ 3,499 | | | $ 3,499 | | $ 493,698 |
| 67 | $ 120 | 0.00972 | 0.90598 | 4.00% | 1.01987 | 0.40573 | 6.00% | 1.02971 | 0.26180 | $ 3,680 | | | $ 3,680 | | $ 508,944 |
| 68 | $ 120 | 0.01073 | 0.89625 | 4.00% | 1.01987 | 0.39012 | 6.00% | 1.02971 | 0.24698 | $ 3,868 | | | $ 3,868 | | $ 524,467 |
| 69 | $ 120 | 0.01187 | 0.88562 | 4.00% | 1.01987 | 0.37512 | 6.00% | 1.02971 | 0.23300 | $ 4,070 | | | $ 4,070 | | $ 540,321 |
| 70 | $ 120 | 0.01321 | 0.87392 | 4.00% | 1.01987 | 0.36069 | 6.00% | 1.02971 | 0.21981 | $ 4,304 | | | $ 4,304 | | $ 556,433 |
| 71 | $ 120 | 0.01480 | 0.86098 | 4.00% | 1.01987 | 0.34682 | 6.00% | 1.02971 | 0.20737 | $ 4,575 | | | $ 4,575 | | $ 572,784 |
| 72 | $ 120 | 0.01670 | 0.84660 | 4.00% | 1.01987 | 0.33348 | 6.00% | 1.02971 | 0.19563 | $ 4,890 | | | $ 4,890 | | $ 589,323 |
| 73 | $ 120 | 0.01891 | 0.83060 | 4.00% | 1.01987 | 0.32065 | 6.00% | 1.02971 | 0.18456 | $ 5,235 | | | $ 5,235 | | $ 605,985 |
| 74 | $ 120 | 0.02143 | 0.81280 | 4.00% | 1.01987 | 0.30832 | 6.00% | 1.02971 | 0.17411 | $ 5,597 | | | $ 5,597 | | $ 622,714 |
| 75 | $ 120 | 0.02424 | 0.79309 | 4.00% | 1.01987 | 0.29646 | 6.00% | 1.02971 | 0.16425 | $ 5,957 | | | $ 5,957 | | $ 639,470 |
| 76 | $ 120 | 0.02732 | 0.77143 | 4.00% | 1.01987 | 0.28506 | 6.00% | 1.02971 | 0.15496 | $ 6,299 | | | $ 6,299 | | $ 656,235 |
| 77 | $ 120 | 0.03071 | 0.74774 | 4.00% | 1.01987 | 0.27409 | 6.00% | 1.02971 | 0.14619 | $ 6,622 | | | $ 6,622 | | $ 673,008 |
| 78 | $ 120 | 0.03446 | 0.72197 | 4.00% | 1.01987 | 0.26355 | 6.00% | 1.02971 | 0.13791 | $ 6,926 | | | $ 6,926 | | $ 689,791 |
| 79 | $ 120 | 0.03874 | 0.69400 | 4.00% | 1.01987 | 0.25342 | 6.00% | 1.02971 | 0.13011 | $ 7,229 | | | $ 7,229 | | $ 706,587 |
| 80 | $ 120 | 0.04368 | 0.66369 | 4.00% | 1.01987 | 0.24367 | 6.00% | 1.02971 | 0.12274 | $ 7,533 | | | $ 7,533 | | $ 723,364 |
| 81 | $ 120 | 0.04946 | 0.63086 | 4.00% | 1.01987 | 0.23430 | 6.00% | 1.02971 | 0.11579 | $ 7,844 | | | $ 7,844 | | $ 740,077 |
| 82 | $ 120 | 0.05593 | 0.59558 | 4.00% | 1.01987 | 0.22529 | 6.00% | 1.02971 | 0.10924 | $ 8,107 | | | $ 8,107 | | $ 756,662 |
| 83 | $ 120 | 0.06346 | 0.55778 | 4.00% | 1.01987 | 0.21662 | 6.00% | 1.02971 | 0.10306 | $ 8,350 | | | $ 8,350 | | $ 773,129 |
| 84 | $ 120 | 0.07219 | 0.51751 | 4.00% | 1.01987 | 0.20829 | 6.00% | 1.02971 | 0.09722 | $ 8,554 | | | $ 8,554 | | $ 789,805 |
| 85 | $ 120 | 0.08234 | 0.47490 | 4.00% | 1.01987 | 0.20028 | 6.00% | 1.02971 | 0.09172 | $ 8,704 | | | $ 8,704 | | $ 805,534 |

FIG. 15 (Cont.)

Face Amount $1,000,000    Yearly Renewal Term Policy

Baseline A: 2020 with IIR = 4% (Static)

| | | | | | MEC/CVAT/GL | | | Guideline Single | | | MEC 7 PAY LIMIT | | | CVAT NSP AT ISSUE | |
|---|---|---|---|---|---|---|---|---|---|---|---|---|---|---|---|
| | | | | | | | | | | | Per 1000: 39.84 | | Per 1000: $ 247.34 | at issue | |
| | | | 2017 CSO Male NS ANB Qx | tPx | Discount Rate | IPC Factor | PV Factor | Discount Rate | IPC Factor | PV Factor | 7702A Limit: $ 39,845 | | 7702 Limit $247,339 | | |
| Age | Expenses | | | | | | | | | | PV Guar Mort | PV Endow | PV Guar Mort | PV Endow | Max CV/1000 |
| | 144 | 145 | | 146 | 147 | 148 | 149 | 150 | 151 | 152 | 153 | 154 | 157 | 158 | 159 |
| | | | | | | | | | | | | 7 pay ann 155 | | | |
| 86 | $ 120 | 0.09409 | | 0.43022 | 4.00% | 1.01987 | 0.19257 | 6.00% | 1.02971 | 0.08653 | $ 8,776 | | $ 8,776 | | $ 821,415 |
| 87 | $ 120 | 0.10761 | | 0.38392 | 4.00% | 1.01987 | 0.18517 | 6.00% | 1.02971 | 0.08163 | $ 8,743 | | $ 8,743 | | $ 837,072 |
| 88 | $ 120 | 0.12290 | | 0.33674 | 4.00% | 1.01987 | 0.17805 | 6.00% | 1.02971 | 0.07701 | $ 8,568 | | $ 8,568 | | $ 852,550 |
| 89 | $ 120 | 0.13949 | | 0.28977 | 4.00% | 1.01987 | 0.17120 | 6.00% | 1.02971 | 0.07265 | $ 8,201 | | $ 8,201 | | $ 867,986 |
| 90 | $ 120 | 0.15718 | | 0.24422 | 4.00% | 1.01987 | 0.16461 | 6.00% | 1.02971 | 0.06854 | $ 7,646 | | $ 7,646 | | $ 883,712 |
| 91 | $ 120 | 0.17535 | | 0.20140 | 4.00% | 1.01987 | 0.15828 | 6.00% | 1.02971 | 0.06466 | $ 6,913 | | $ 6,913 | | $ 900,261 |
| 92 | $ 120 | 0.19352 | | 0.16242 | 4.00% | 1.01987 | 0.15219 | 6.00% | 1.02971 | 0.06100 | $ 6,050 | | $ 6,050 | | $ 918,495 |
| 93 | $ 120 | 0.21149 | | 0.12807 | 4.00% | 1.01987 | 0.14634 | 6.00% | 1.02971 | 0.05755 | $ 5,127 | | $ 5,127 | | $ 939,726 |
| 94 | $ 120 | 0.22836 | | 0.09883 | 4.00% | 1.01987 | 0.14071 | 6.00% | 1.02971 | 0.05429 | $ 4,197 | $ 13,906 | $ 4,197 | $ 13,906 | $ 965,901 |
| 95 | $ 120 | 0.24340 | | 0.07477 | 4.00% | 1.01987 | 0.13530 | 6.00% | 1.02971 | 0.05122 | | | | | $ 1,000,000 |

Yearly Renewal Term Policy | Guideline Single Premium | Guidel Level Premium (Level DB) | Guidel Level Premium (Increasing DB)

Baseline A: 2020 with IIR = 4%

Face Amount $1,000,000
Expenses 120

Per 1000: $138.53 / 7702 Limit $138,527 — 162
GLP/K $13.15 / 7702 Limit $13,154 — 166
Per 1000: $30.32 / 7702 Limit $30,325 — 171

| Age | 2017 CSO Male NS ANB Qx | tPx | PV Guar Mort (161) | PV Expenses | PV Endow (163) | Life ann (164) | Exp DB (168) | Expenses (165) | PV Endow (167) | PV Guar Mort (170) | PV Expense | PV Endow | Annuity (173) | Increasing DB Cumulative Guideline Max (175) | Corridor (176) |
|---|---|---|---|---|---|---|---|---|---|---|---|---|---|---|---|
|  |  |  | $131,324 | $1,838 | $5,365 | 19.69 | $242,698 | $2,362 | $13,906 | $453,618 | $2,681 | $140,713 | $22.34 |  |  |
| 45 | 0.00183 | 0.99817 | $1,778 | $120 |  | 1.0000 | $1,795 | $120 |  | $1,795 | $120 |  | 1.00 | $138,527 | 215% |
| 46 | 0.00191 | 0.99626 | $1,747 | $113 |  | 0.9598 | $1,870 | $115 |  | $1,801 | $115 |  | 0.962 | $138,527 | 209% |
| 47 | 0.00197 | 0.99430 | $1,697 | $106 |  | 0.9211 | $1,851 | $111 |  | $1,786 | $111 |  | 0.925 | $138,527 | 203% |
| 48 | 0.00205 | 0.99226 | $1,663 | $100 |  | 0.8839 | $1,848 | $106 |  | $1,787 | $107 |  | 0.889 | $138,527 | 197% |
| 49 | 0.00214 | 0.99014 | $1,634 | $94 |  | 0.8482 | $1,851 | $102 |  | $1,794 | $103 |  | 0.855 | $151,623 | 191% |
| 50 | 0.00225 | 0.98791 | $1,617 | $89 |  | 0.8138 | $1,867 | $98 |  | $1,814 | $99 |  | 0.822 | $181,947 | 185% |
| 51 | 0.00242 | 0.98552 | $1,637 | $84 |  | 0.7808 | $1,927 | $94 |  | $1,876 | $95 |  | 0.790 | $212,272 | 178% |
| 52 | 0.00263 | 0.98293 | $1,675 | $79 |  | 0.7489 | $2,009 | $90 |  | $1,960 | $91 |  | 0.760 | $242,596 | 171% |
| 53 | 0.00288 | 0.98010 | $1,725 | $74 |  | 0.7182 | $2,110 | $86 |  | $2,064 | $88 |  | 0.731 | $272,921 | 164% |
| 54 | 0.00314 | 0.97702 | $1,770 | $70 |  | 0.6886 | $2,205 | $83 |  | $2,163 | $84 |  | 0.703 | $303,245 | 157% |
| 55 | 0.00340 | 0.97370 | $1,802 | $65 |  | 0.6600 | $2,289 | $79 |  | $2,254 | $81 |  | 0.676 | $333,570 | 150% |
| 56 | 0.00364 | 0.97015 | $1,814 | $62 |  | 0.6325 | $2,348 | $76 |  | $2,319 | $78 |  | 0.650 | $363,894 | 146% |
| 57 | 0.00387 | 0.96640 | $1,813 | $58 |  | 0.6060 | $2,392 | $73 |  | $2,370 | $75 |  | 0.625 | $394,219 | 142% |
| 58 | 0.00411 | 0.96243 | $1,809 | $54 |  | 0.5804 | $2,433 | $70 |  | $2,421 | $72 |  | 0.601 | $424,543 | 138% |
| 59 | 0.00439 | 0.95820 | $1,815 | $51 |  | 0.5558 | $2,488 | $67 |  | $2,486 | $69 |  | 0.577 | $454,868 | 134% |
| 60 | 0.00474 | 0.95366 | $1,841 | $48 |  | 0.5321 | $2,572 | $64 |  | $2,581 | $67 |  | 0.555 | $485,192 | 130% |
| 61 | 0.00521 | 0.94869 | $1,900 | $45 |  | 0.5092 | $2,705 | $61 |  | $2,728 | $64 |  | 0.534 | $515,517 | 128% |
| 62 | 0.00579 | 0.94320 | $1,982 | $42 |  | 0.4870 | $2,876 | $58 |  | $2,915 | $62 |  | 0.513 | $545,841 | 126% |
| 63 | 0.00644 | 0.93713 | $2,067 | $40 |  | 0.4656 | $3,058 | $56 |  | $3,117 | $59 |  | 0.494 | $576,166 | 124% |
| 64 | 0.00717 | 0.93041 | $2,157 | $37 |  | 0.4448 | $3,253 | $53 |  | $3,337 | $57 |  | 0.475 | $606,490 | 122% |
| 65 | 0.00796 | 0.92300 | $2,243 | $35 |  | 0.4246 | $3,447 | $51 |  | $3,563 | $55 |  | 0.456 | $636,815 | 120% |

| | Yearly Renewal Term Policy | | | | Guideline Single Premium | | | Guidel Level Premium (Level DB) | | | | Guidel Level Premium (Increasing DB) | | | | |
|---|---|---|---|---|---|---|---|---|---|---|---|---|---|---|---|---|
| | Baseline A: 2020 with IIR = 4% | | | | Per 1000: $ 138.53 | | | GLP/K $ 13.15 | | | | Per 1000: $ 30.32 | | | | |
| | | | | | 7702 Limit $ 138,527 | | | 7702 Limit $ 13,154 | | | | 7702 Limit $ 30,325 | | | | |
| | Face Amount $1,000,000 | 2017 CSO Male NS | | | | | | | Exp DB | | | | | | | Increasing DB Cumulative Guideline Max | Corridor |
| Age | Expenses | ANB Qx | tPx | PV Guar Mort | PV Expenses | PV Endow | Life ann | PV Endow | Expenses | PV Guar Mort | PV Expense | PV Endow | Annuity | | | |
| 66 | $ 120 | 0.00881 | 0.91487 | $ 2,324 | $ 33 | | 0.4050 | $ 3,639 | $ 49 | $ 3,791 | $ 53 | | 0.439 | $ 667,139 | 119% |
| 67 | $ 120 | 0.00972 | 0.90598 | $ 2,397 | $ 30 | | 0.3860 | $ 3,827 | $ 46 | $ 4,022 | $ 51 | | 0.422 | $ 697,464 | 118% |
| 68 | $ 120 | 0.01073 | 0.89625 | $ 2,472 | $ 28 | | 0.3676 | $ 4,022 | $ 44 | $ 4,269 | $ 49 | | 0.406 | $ 727,788 | 117% |
| 69 | $ 120 | 0.01187 | 0.88562 | $ 2,552 | $ 27 | | 0.3496 | $ 4,233 | $ 42 | $ 4,541 | $ 47 | | 0.390 | $ 758,113 | 116% |
| 70 | $ 120 | 0.01321 | 0.87392 | $ 2,648 | $ 25 | | 0.3322 | $ 4,476 | $ 40 | $ 4,859 | $ 45 | | 0.375 | $ 788,437 | 115% |
| 71 | $ 120 | 0.01480 | 0.86098 | $ 2,762 | $ 23 | | 0.3152 | $ 4,758 | $ 38 | $ 5,235 | $ 43 | | 0.361 | $ 818,762 | 113% |
| 72 | $ 120 | 0.01670 | 0.84660 | $ 2,896 | $ 21 | | 0.2986 | $ 5,086 | $ 36 | $ 5,680 | $ 42 | | 0.347 | $ 849,086 | 111% |
| 73 | $ 120 | 0.01891 | 0.83060 | $ 3,042 | $ 20 | | 0.2823 | $ 5,445 | $ 34 | $ 6,184 | $ 40 | | 0.333 | $ 879,411 | 109% |
| 74 | $ 120 | 0.02143 | 0.81280 | $ 3,191 | $ 18 | | 0.2663 | $ 5,821 | $ 32 | $ 6,739 | $ 38 | | 0.321 | $ 909,735 | 107% |
| 75 | $ 120 | 0.02424 | 0.79309 | $ 3,332 | $ 17 | | 0.2506 | $ 6,195 | $ 30 | $ 7,329 | $ 37 | | 0.308 | $ 940,060 | 105% |
| 76 | $ 120 | 0.02732 | 0.77143 | $ 3,457 | $ 16 | | 0.2351 | $ 6,551 | $ 28 | $ 7,943 | $ 36 | | 0.296 | $ 970,384 | 105% |
| 77 | $ 120 | 0.03071 | 0.74774 | $ 3,566 | $ 14 | | 0.2199 | $ 6,887 | $ 26 | $ 8,585 | $ 34 | | 0.285 | $ 1,000,709 | 105% |
| 78 | $ 120 | 0.03446 | 0.72197 | $ 3,659 | $ 13 | | 0.2050 | $ 7,203 | $ 25 | $ 9,262 | $ 33 | | 0.274 | $ 1,031,033 | 105% |
| 79 | $ 120 | 0.03874 | 0.69400 | $ 3,747 | $ 12 | | 0.1903 | $ 7,518 | $ 23 | $ 10,012 | $ 32 | | 0.264 | $ 1,061,358 | 105% |
| 80 | $ 120 | 0.04368 | 0.66369 | $ 3,831 | $ 11 | | 0.1759 | $ 7,835 | $ 21 | $ 10,855 | $ 30 | | 0.253 | $ 1,091,682 | 105% |
| 81 | $ 120 | 0.04946 | 0.63086 | $ 3,914 | $ 10 | | 0.1617 | $ 8,158 | $ 19 | $ 11,819 | $ 29 | | 0.244 | $ 1,122,007 | 105% |
| 82 | $ 120 | 0.05593 | 0.59558 | $ 3,969 | $ 9 | | 0.1478 | $ 8,431 | $ 18 | $ 12,851 | $ 28 | | 0.234 | $ 1,152,331 | 105% |
| 83 | $ 120 | 0.06346 | 0.55778 | $ 4,011 | $ 8 | | 0.1342 | $ 8,684 | $ 16 | $ 14,020 | $ 27 | | 0.225 | $ 1,182,656 | 105% |
| 84 | $ 120 | 0.07219 | 0.51751 | $ 4,031 | $ 7 | | 0.1208 | $ 8,896 | $ 14 | $ 15,335 | $ 26 | | 0.217 | $ 1,212,980 | 105% |
| 85 | $ 120 | 0.08234 | 0.47490 | $ 4,024 | $ 6 | | 0.1078 | $ 9,052 | $ 13 | $ 16,819 | $ 25 | | 0.208 | $ 1,243,305 | 105% |

FIG. 16 (Cont.)

| | Yearly Renewal Term Policy | | | Guideline Single Premium | | | Guidel Level Premium (Level DB) | | | | Guidel Level Premium (Increasing DB) | | | | |
|---|---|---|---|---|---|---|---|---|---|---|---|---|---|---|---|
| Face Amount $1,000,000 | Baseline A: 2020 with IIR = 4% | | | Per 1000: $ 138.53 7702 Limit $ 138,527 | | | GLP/K $ 13.15 7702 Limit $ 13,154 | | | | Per 1000: $ 30.32 7702 Limit $ 30,325 | | | Increasing DB Cumulative Guideline Max | Corridor |
| Age | 2017 CSO Male NS ANB Qx | tPx | PV Guar Mort | PV Expenses | PV Endow | Life ann | Exp DB | Expenses | PV Endow | PV Guar Mort | PV Expense | PV Endow | Annuity | | |
| 86 | 0.09409 0.43022 | $ 13,984 | $ 1,838 | | $ 0.0954 | $ 9,493 $ 2,364 | $ 13,906 | $ 43,478 | $ 2,684 | $ 140,713 | $ 0.200 | $ 1,273,629 | 105% |
| 87 | 0.10761 0.38392 | $ 3,891 | $ 4 | | 0.0828 | $ 9,093 $ 10 | | $ 20,322 | $ 23 | | 0.193 | $ 1,303,954 | 105% |
| 88 | 0.12290 0.33674 | $ 3,742 | $ 4 | | 0.0711 | $ 8,911 $ 9 | | $ 22,317 | $ 22 | | 0.185 | $ 1,334,278 | 105% |
| 89 | 0.13949 0.28977 | $ 3,514 | $ 3 | | 0.0600 | $ 8,529 $ 7 | | $ 24,355 | $ 21 | | 0.178 | $ 1,364,603 | 105% |
| 90 | 0.15718 0.24422 | $ 3,214 | $ 3 | | 0.0496 | $ 7,952 $ 6 | | $ 26,388 | $ 21 | | 0.171 | $ 1,394,927 | 105% |
| 91 | 0.17535 0.20140 | $ 2,851 | $ 2 | | 0.0402 | $ 7,190 $ 5 | | $ 28,306 | $ 20 | | 0.165 | $ 1,425,252 | 104% |
| 92 | 0.19352 0.16242 | $ 2,448 | $ 2 | | 0.0319 | $ 6,292 $ 4 | | $ 30,038 | $ 19 | | 0.158 | $ 1,455,577 | 103% |
| 93 | 0.21149 0.12807 | $ 2,035 | $ 1 | | 0.0247 | $ 5,332 $ 3 | | $ 31,565 | $ 18 | | 0.152 | $ 1,485,901 | 102% |
| 94 | 0.22836 0.09883 | $ 1,635 | $ 1 | | 0.0187 | $ 4,365 $ 2 | | $ 32,772 | $ 18 | | 0.146 | $ 1,516,226 | 101% |
| 95 | 0.24340 0.07477 | $ — | | $ 5,365 | | | | | | | | | |

FIG. 16 (Cont.)

Yearly Renewal Term Policy
Baseline A2: Age 60 Material Change Recognition

| | | | | | MEC/CVAT/GL | | | Guideline Single | | | MEC 7 PAY LIMIT | | | CVAT NSP AT ISSUE | |
|---|---|---|---|---|---|---|---|---|---|---|---|---|---|---|---|
| | | | | | | | | | | | Per 1000: | 94.22 | | Per 1000: | $ 613.30 |
| Face Amount $1,000,000 | | 85% of 2017 CSO Male NS | | | | | | | | | 7702A Limit: | $ 94,218 | | 7702 Limit: | $ 613,301 at issue |
| Age | Expenses | ANB Qx | tPx | Discount Rate | IPC Factor | PV Factor | Discount Rate | IPC Factor | PV Factor | PV Guar Mort | PV Endow | 7 pay ann | PV Guar Mort | PV Endow | Max CV/1000 |
| 60 | $ 120 | 0.00403 | 0.99597 | 2.00% | 1.00997 | 0.98039 | 4.00% | 1.01987 | 0.96154 | $ 539,174 | $ 74,128 | $ 6.51 | $ 539,174 | $ 74,128 | $ 613.301 |
| 61 | $ 120 | 0.00443 | 0.99156 | 2.00% | 1.00997 | 0.96117 | 4.00% | 1.01987 | 0.92456 | | | 1.00 | 3,989 | | $ 624.012 |
| 62 | $ 120 | 0.00492 | 0.98668 | 2.00% | 1.00997 | 0.94232 | 4.00% | 1.01987 | 0.88900 | | | 0.98 | 4,282 | | $ 634.831 |
| 63 | $ 120 | 0.00547 | 0.98128 | 2.00% | 1.00997 | 0.92385 | 4.00% | 1.01987 | 0.85480 | | | 0.95 | 4,644 | | $ 645.735 |
| 64 | $ 120 | 0.00609 | 0.97530 | 2.00% | 1.00997 | 0.90573 | 4.00% | 1.01987 | 0.82193 | | | 0.93 | 5,040 | | $ 656.716 |
| 65 | $ 120 | 0.00677 | 0.96870 | 2.00% | 1.00997 | 0.88797 | 4.00% | 1.01987 | 0.79031 | | | 0.91 | 5,471 | | $ 667.765 |
| 66 | $ 120 | 0.00749 | 0.96145 | 2.00% | 1.00997 | 0.87056 | 4.00% | 1.01987 | 0.75992 | | | 0.88 | 5,918 | | $ 678.880 |
| 67 | $ 120 | 0.00826 | 0.95350 | 2.00% | 1.00997 | 0.85349 | 4.00% | 1.01987 | 0.73069 | | | 0.86 | 6,378 | | $ 690.062 |
| 68 | $ 120 | 0.00912 | 0.94481 | 2.00% | 1.00997 | 0.83676 | 4.00% | 1.01987 | 0.70259 | | | | 6,847 | | $ 701.313 |
| 69 | $ 120 | 0.01009 | 0.93527 | 2.00% | 1.00997 | 0.82035 | 4.00% | 1.01987 | 0.67556 | | | | 7,349 | | $ 712.628 |
| 70 | $ 120 | 0.01123 | 0.92477 | 2.00% | 1.00997 | 0.80426 | 4.00% | 1.01987 | 0.64958 | | | | 7,898 | | $ 723.995 |
| 71 | $ 120 | 0.01258 | 0.91314 | 2.00% | 1.00997 | 0.78849 | 4.00% | 1.01987 | 0.62460 | | | | 8,530 | | $ 735.392 |
| 72 | $ 120 | 0.01420 | 0.90018 | 2.00% | 1.00997 | 0.77303 | 4.00% | 1.01987 | 0.60057 | | | | 9,264 | | $ 746.789 |
| 73 | $ 120 | 0.01607 | 0.88571 | 2.00% | 1.00997 | 0.75788 | 4.00% | 1.01987 | 0.57748 | | | | 10,120 | | $ 758.150 |
| 74 | $ 120 | 0.01822 | 0.86957 | 2.00% | 1.00997 | 0.74301 | 4.00% | 1.01987 | 0.55526 | | | | 11,075 | | $ 769.447 |
| 75 | $ 120 | 0.02060 | 0.85166 | 2.00% | 1.00997 | 0.72845 | 4.00% | 1.01987 | 0.53391 | | | | 12,107 | | $ 780.659 |
| 76 | $ 120 | 0.02322 | 0.83188 | 2.00% | 1.00997 | 0.71416 | 4.00% | 1.01987 | 0.51337 | | | | 13,181 | | $ 791.777 |
| 77 | $ 120 | 0.02610 | 0.81016 | 2.00% | 1.00997 | 0.70016 | 4.00% | 1.01987 | 0.49363 | | | | 14,265 | | $ 802.801 |
| 78 | $ 120 | 0.02929 | 0.78643 | 2.00% | 1.00997 | 0.68643 | 4.00% | 1.01987 | 0.47464 | | | | 15,355 | | $ 813.735 |
| 79 | $ 120 | 0.03293 | 0.76054 | 2.00% | 1.00997 | 0.67297 | 4.00% | 1.01987 | 0.45639 | | | | 16,452 | | $ 824.580 |
| 80 | $ 120 | 0.03713 | 0.73230 | 2.00% | 1.00997 | 0.65978 | 4.00% | 1.01987 | 0.43883 | | | | 17,601 | | $ 835.320 |
| | | | | | | | | | | | | | 18,816 | | |

FIG. 17

Yearly Renewal Term Policy
Baseline A2: Age 60 Material Change Recognition

| | | | | | MEC/CVAT/GL | | | Guideline Single | | | | | | | |
|---|---|---|---|---|---|---|---|---|---|---|---|---|---|---|---|
| Age | Face Amount $1,000,000 Expenses | 85% of 2017 CSO Male NS ANB Qx | tPx | Discount Rate | IPC Factor | PV Factor | Discount Rate | IPC Factor | PV Factor | PV Guar Mort | PV Endow | PV Guar Mort | PV Endow | 7 pay ann | Max CV/1000 |
| 81 | $ 120 | 0.04204 | 0.70151 | 2.00% | 1.00997 | 0.64684 | 4.00% | 1.01987 | 0.42196 | $ 20,112 | | $ 20,112 | | | $ 845.937 |
| 82 | $ 120 | 0.04754 | 0.66816 | 2.00% | 1.00997 | 0.63416 | 4.00% | 1.01987 | 0.40573 | $ 21,360 | | $ 21,360 | | | $ 856.399 |
| 83 | $ 120 | 0.05394 | 0.63212 | 2.00% | 1.00997 | 0.62172 | 4.00% | 1.01987 | 0.39012 | $ 22,631 | | $ 22,631 | | | $ 866.717 |
| 84 | $ 120 | 0.06136 | 0.59333 | 2.00% | 1.00997 | 0.60953 | 4.00% | 1.01987 | 0.37512 | $ 23,878 | | $ 23,878 | | | $ 876.872 |
| 85 | $ 120 | 0.06999 | 0.55181 | 2.00% | 1.00997 | 0.59758 | 4.00% | 1.01987 | 0.36069 | $ 25,063 | | $ 25,063 | | | $ 886.855 |
| 86 | $ 120 | 0.07998 | 0.50768 | 2.00% | 1.00997 | 0.58586 | 4.00% | 1.01987 | 0.34682 | $ 26,113 | | $ 26,113 | | | $ 896.662 |
| 87 | $ 120 | 0.09147 | 0.46124 | 2.00% | 1.00997 | 0.57437 | 4.00% | 1.01987 | 0.33348 | $ 26,938 | | $ 26,938 | | | $ 906.305 |
| 88 | $ 120 | 0.10447 | 0.41306 | 2.00% | 1.00997 | 0.56311 | 4.00% | 1.01987 | 0.32065 | $ 27,403 | | $ 27,403 | | | $ 915.819 |
| 89 | $ 120 | 0.11857 | 0.36408 | 2.00% | 1.00997 | 0.55207 | 4.00% | 1.01987 | 0.30832 | $ 27,307 | | $ 27,307 | | | $ 925.290 |
| 90 | $ 120 | 0.13360 | 0.31544 | 2.00% | 1.00997 | 0.54125 | 4.00% | 1.01987 | 0.29646 | $ 26,590 | | $ 26,590 | | | $ 934.895 |
| 91 | $ 120 | 0.14905 | 0.26842 | 2.00% | 1.00997 | 0.53063 | 4.00% | 1.01987 | 0.28506 | $ 25,197 | | $ 25,197 | | | $ 944.900 |
| 92 | $ 120 | 0.16449 | 0.22427 | 2.00% | 1.00997 | 0.52023 | 4.00% | 1.01987 | 0.27409 | $ 23,199 | | $ 23,199 | | | $ 955.711 |
| 93 | $ 120 | 0.17977 | 0.18395 | 2.00% | 1.00997 | 0.51003 | 4.00% | 1.01987 | 0.26355 | $ 20,767 | | $ 20,767 | | | $ 967.906 |
| 94 | $ 120 | 0.19411 | 0.14825 | 2.00% | 1.00997 | 0.50003 | 4.00% | 1.01987 | 0.25342 | $ 18,032 | $ 74,128 | $ 18,032 | $ 74,128 | | $ 982.289 |
| 95 | $ 120 | 0.20689 | 0.11758 | 2.00% | 1.00997 | 0.49022 | 4.00% | 1.01987 | 0.24367 | | | | | | $ 1,000.000 |

MEC 7 PAY LIMIT
Per 1000: 94.22
7702A Limit: $ 94,218

CVAT NSP AT ISSUE
Per 1000: 613.30
7702 Limit: $ 613,301 at issue

FIG. 17 (Cont.)

Yearly Renewal Term Policy | Guideline Single Premium | Guidel Level Premium (Level DB) | Guidel Level Premium (Increasing DB)

Baseline A2: Age 60 Material Chan
Per 1000: $393.44 — 181
7702 Limit $393,437

GLP/K $31.33 — 182A
7702 Limit $31,331

Per 1000: $78.24 — 182B
7702 Limit $78,239

Face Amount $1,000,000
85% of 2017 CSO Male NS

| Age | Expenses | ANB Qx | tPx | PV Guar Mort | PV Expenses | PV Endow | Life ann | Exp DB | Expenses | PV Endow | PV Guar Mort | PV Expense | PV Endow | Annuity | Increasing DB Cumulative Guideline Max | Corridor |
|---|---|---|---|---|---|---|---|---|---|---|---|---|---|---|---|---|
|  |  |  |  | $ 353,949 | $ 1,920 | $ 37,568 | 19.99 | $549,877 | $ 2,399 | $ 74,128 | $ 1,061,151 | $ 3,060 | $500,028 | 25.50 |  | 183A |
| 60 | $ 120 | 0.00403 | 0.99597 | $ 3,951 | $ 120 |  | 1.0000 | $ 3,989 | $ 120 |  | $ 3,989 | $ 120 |  | 1.00 | $ 393,437 | 130% |
| 61 | $ 120 | 0.00443 | 0.99156 | $ 4,159 | $ 115 |  | 0.9764 | $ 4,367 | $ 117 |  | $ 4,299 | $ 118 |  | 0.980 | $ 393,437 | 128% |
| 62 | $ 120 | 0.00492 | 0.98668 | $ 4,424 | $ 110 |  | 0.9531 | $ 4,737 | $ 114 |  | $ 4,684 | $ 115 |  | 0.961 | $ 393,437 | 126% |
| 63 | $ 120 | 0.00547 | 0.98128 | $ 4,709 | $ 105 |  | 0.9298 | $ 5,140 | $ 112 |  | $ 5,108 | $ 113 |  | 0.942 | $ 393,437 | 124% |
| 64 | $ 120 | 0.00609 | 0.97530 | $ 5,013 | $ 101 |  | 0.9066 | $ 5,580 | $ 109 |  | $ 5,575 | $ 111 |  | 0.924 | $ 393,437 | 122% |
| 65 | $ 120 | 0.00677 | 0.96870 | $ 5,319 | $ 96 |  | 0.8834 | $ 6,036 | $ 106 |  | $ 6,068 | $ 109 |  | 0.906 | $ 469,436 | 120% |
| 66 | $ 120 | 0.00749 | 0.96145 | $ 5,622 | $ 92 |  | 0.8602 | $ 6,506 | $ 103 |  | $ 6,584 | $ 107 |  | 0.888 | $ 547,675 | 119% |
| 67 | $ 120 | 0.00826 | 0.95350 | $ 5,920 | $ 88 |  | 0.8370 | $ 6,984 | $ 100 |  | $ 7,122 | $ 104 |  | 0.871 | $ 625,914 | 118% |
| 68 | $ 120 | 0.00912 | 0.94481 | $ 6,231 | $ 84 |  | 0.8138 | $ 7,496 | $ 98 |  | $ 7,708 | $ 102 |  | 0.853 | $ 704,153 | 117% |
| 69 | $ 120 | 0.01009 | 0.93527 | $ 6,568 | $ 80 |  | 0.7906 | $ 8,056 | $ 95 |  | $ 8,359 | $ 100 |  | 0.837 | $ 782,393 | 116% |
| 70 | $ 120 | 0.01123 | 0.92477 | $ 6,957 | $ 76 |  | 0.7672 | $ 8,701 | $ 92 |  | $ 9,121 | $ 98 |  | 0.820 | $ 860,632 | 115% |
| 71 | $ 120 | 0.01258 | 0.91314 | $ 7,411 | $ 72 |  | 0.7438 | $ 9,450 | $ 89 |  | $ 10,018 | $ 97 |  | 0.804 | $ 938,871 | 113% |
| 72 | $ 120 | 0.01420 | 0.90018 | $ 7,929 | $ 68 |  | 0.7200 | $ 10,322 | $ 86 |  | $ 11,083 | $ 95 |  | 0.788 | $ 1,017,111 | 111% |
| 73 | $ 120 | 0.01607 | 0.88571 | $ 8,521 | $ 65 |  | 0.6959 | $ 11,296 | $ 84 |  | $ 12,303 | $ 93 |  | 0.773 | $ 1,095,350 | 109% |
| 74 | $ 120 | 0.01822 | 0.86957 | $ 9,136 | $ 61 |  | 0.6713 | $ 12,349 | $ 81 |  | $ 13,669 | $ 91 |  | 0.758 | $ 1,173,589 | 107% |
| 75 | $ 120 | 0.02060 | 0.85166 | $ 9,756 | $ 58 |  | 0.6461 | $ 13,445 | $ 78 |  | $ 15,158 | $ 89 |  | 0.743 | $ 1,251,828 | 105% |
| 76 | $ 120 | 0.02322 | 0.83188 | $ 10,355 | $ 55 |  | 0.6204 | $ 14,550 | $ 74 |  | $ 16,750 | $ 87 |  | 0.728 | $ 1,330,068 | 105% |
| 77 | $ 120 | 0.02610 | 0.81016 | $ 10,932 | $ 51 |  | 0.5941 | $ 15,663 | $ 71 |  | $ 18,459 | $ 86 |  | 0.714 | $ 1,408,307 | 105% |
| 78 | $ 120 | 0.02929 | 0.78643 | $ 11,487 | $ 48 |  | 0.5672 | $ 16,781 | $ 68 |  | $ 20,307 | $ 84 |  | 0.700 | $ 1,486,546 | 105% |
| 79 | $ 120 | 0.03293 | 0.76054 | $ 12,054 | $ 45 |  | 0.5398 | $ 17,953 | $ 65 |  | $ 22,381 | $ 82 |  | 0.686 | $ 1,564,786 | 105% |
| 80 | $ 120 | 0.03713 | 0.73230 | $ 12,638 | $ 42 |  | 0.5118 | $ 19,192 | $ 61 |  | $ 24,740 | $ 81 |  | 0.673 | $ 1,643,025 | 105% |

FIG. 18

Yearly Renewal Term Policy | Guideline Single Premium | Guidel Level Premium (Level DB) | Guidel Level Premium (Increasing DB)

Baseline A2: Age 60 Material Chan    Per 1000: $ 393.44 — 181    GLP/K $ 31.33 — 182A    Per 1000: $ 78.24 — 182B
                                     7702 Limit $ 393,437         7702 Limit $ 31,331        7702 Limit $ 78,239

Face Amount $1,000,000
85% of 2017 CSO Male NS

| Age | Expenses | ANB Qx | tPx | PV Guar Mort | PV Expenses | PV Endow | Life ann | Exp DB | Expenses | PV Endow | PV Guar Mort | PV Expense | PV Endow | Annuity | Increasing DB Cumulative Guideline Max — 183 | Corridor |
|---|---|---|---|---|---|---|---|---|---|---|---|---|---|---|---|---|
| 81 | $ 120 | 0.04204 | 0.70151 | $ 13,249 | $ 39 | | 0.4832 | $20,515 | $ 58 | | $ 27,465 | $ 79 | | 0.660 | $ 1,721,264 | 105% |
| 82 | $ 120 | 0.04754 | 0.66816 | $ 13,800 | $ 36 | | 0.4538 | $21,787 | $ 54 | | $ 30,449 | $ 78 | | 0.647 | $ 1,799,503 | 105% |
| 83 | $ 120 | 0.05394 | 0.63212 | $ 14,340 | $ 33 | | 0.4237 | $23,084 | $ 51 | | $ 33,871 | $ 76 | | 0.634 | $ 1,877,743 | 105% |
| 84 | $ 120 | 0.06136 | 0.59333 | $ 14,839 | $ 30 | | 0.3930 | $24,356 | $ 47 | | $ 37,775 | $ 75 | | 0.622 | $ 1,955,982 | 105% |
| 85 | $ 120 | 0.06909 | 0.55181 | $ 15,276 | $ 27 | | 0.3617 | $25,564 | $ 43 | | $ 42,241 | $ 73 | | 0.610 | $ 2,034,221 | 105% |
| 86 | $ 120 | 0.07998 | 0.50768 | $ 15,610 | $ 24 | | 0.3297 | $26,635 | $ 40 | | $ 47,322 | $ 72 | | 0.598 | $ 2,112,460 | 105% |
| 87 | $ 120 | 0.09147 | 0.46124 | $ 15,793 | $ 21 | | 0.2974 | $27,476 | $ 36 | | $ 53,061 | $ 70 | | 0.586 | $ 2,190,700 | 105% |
| 88 | $ 120 | 0.10447 | 0.41306 | $ 15,757 | $ 18 | | 0.2649 | $27,951 | $ 32 | | $ 59,412 | $ 69 | | 0.574 | $ 2,268,939 | 105% |
| 89 | $ 120 | 0.11857 | 0.36408 | $ 15,400 | $ 16 | | 0.2326 | $27,853 | $ 28 | | $ 66,110 | $ 68 | | 0.563 | $ 2,347,178 | 105% |
| 90 | $ 120 | 0.13360 | 0.31544 | $ 14,707 | $ 13 | | 0.2010 | $27,122 | $ 24 | | $ 73,033 | $ 66 | | 0.552 | $ 2,425,418 | 105% |
| 91 | $ 120 | 0.14905 | 0.26842 | $ 13,668 | $ 11 | | 0.1707 | $25,701 | $ 20 | | $ 79,878 | $ 65 | | 0.541 | $ 2,503,657 | 104% |
| 92 | $ 120 | 0.16449 | 0.22427 | $ 12,343 | $ 9 | | 0.1424 | $23,663 | $ 17 | | $ 86,426 | $ 64 | | 0.531 | $ 2,581,896 | 103% |
| 93 | $ 120 | 0.17977 | 0.18395 | $ 10,837 | $ 7 | | 0.1167 | $21,183 | $ 14 | | $ 92,600 | $ 62 | | 0.520 | $ 2,660,135 | 102% |
| 94 | $ 120 | 0.19411 | 0.14825 | $ 9,228 | $ 6 | $37,568 | 0.0938 | $18,393 | $ 11 | $ 74,128 | $ 98,026 | $ 61 | $ 500,028 | 0.510 | $ 2,738,375 | 101% |
| 95 | $ 120 | 0.20689 | 0.11758 | | | | | | | | | | | | | |

FIG. 18 (Cont.)

Face Amount $1,000,000    30 Year Term
Baseline: 2020 with IIR 4% (Static)

|  |  |  | 2017 CSO Male NS |  | MEC/CVAT/GL | | | | Guideline Single | | | MEC 7 PAY LIMIT | | | | CVAT NSP AT ISSUE | | |
|---|---|---|---|---|---|---|---|---|---|---|---|---|---|---|---|---|---|---|
|  |  |  |  |  |  |  |  |  |  |  |  | Per 1000: | 31.65 | | | Per 1000: | $ 196.47 | |
|  |  |  |  |  |  |  |  |  |  |  |  | 7702A Limit: | $31,651 | | | 7702 Limit | $196,474 | |
|  | Guaranteed |  | ANB Qx | tPx | Discount Rate | IPC Factor | PV Factor | Discount Rate | IPC Factor | PV Factor | PV Guar Mort | PV Endow | 7 pay ann | PV Guar Mort | PV Endow | Max | CV/1000 |
| Age | Term Prm | Expenses |  |  |  |  |  |  |  |  |  |  |  |  |  |  |  |
|  | 184 |  |  |  |  |  |  |  |  |  |  |  |  |  |  | 186 | 186 |
| 45 | $ 2,200 | $ 120 | 0.00183 | 0.99817 | 4.00% | 0.01987 | 0.96154 | 6.00% | 1.02971 | 0.94340 | $ 182,568 | $ 13,906 | $ 6.21 | $ 182,568 | $ 13,906 | $ 196.47 | $ 196,474 |
| 46 | $ 2,200 | $ 120 | 0.00191 | 0.99626 | 4.00% | 0.01987 | 0.92456 | 6.00% | 1.02971 | 0.89000 | $ 1,795 | | 1.00 | $ 1,795 | | | $ 202,838 |
| 47 | $ 2,200 | $ 120 | 0.00197 | 0.99430 | 4.00% | 0.01987 | 0.88900 | 6.00% | 1.02971 | 0.83962 | $ 1,798 | | 0.96 | $ 1,798 | | | $ 209,403 |
| 48 | $ 2,200 | $ 120 | 0.00205 | 0.99226 | 4.00% | 0.01987 | 0.85480 | 6.00% | 1.02971 | 0.79209 | $ 1,779 | | 0.92 | $ 1,779 | | | $ 216,196 |
| 49 | $ 2,200 | $ 120 | 0.00214 | 0.99014 | 4.00% | 0.01987 | 0.82193 | 6.00% | 1.02971 | 0.74726 | $ 1,777 | | 0.88 | $ 1,777 | | | $ 223,221 |
| 50 | $ 2,200 | $ 120 | 0.00225 | 0.98791 | 4.00% | 0.01987 | 0.79031 | 6.00% | 1.02971 | 0.70496 | $ 1,780 | | 0.85 | $ 1,780 | | | $ 230,450 |
| 51 | $ 2,200 | $ 120 | 0.00242 | 0.98552 | 4.00% | 0.01987 | 0.75992 | 6.00% | 1.02971 | 0.66506 | $ 1,756 | | 0.81 | $ 1,756 | | | $ 237,960 |
| 52 | $ 2,200 | $ 120 | 0.00263 | 0.98293 | 4.00% | 0.01987 | 0.73069 | 6.00% | 1.02971 | 0.62741 | $ 1,684 | | 0.78 | $ 1,684 | | | $ 245,829 |
| 53 | $ 2,200 | $ 120 | 0.00288 | 0.98010 | 4.00% | 0.01987 | 0.70259 | 6.00% | 1.02971 | 0.59190 | $ 1,616 | | | $ 1,616 | | | $ 254,087 |
| 54 | $ 2,200 | $ 120 | 0.00314 | 0.97702 | 4.00% | 0.01987 | 0.67556 | 6.00% | 1.02971 | 0.55839 | $ 1,549 | | | $ 1,549 | | | $ 262,763 |
| 55 | $ 2,200 | $ 120 | 0.00340 | 0.97370 | 4.00% | 0.01987 | 0.64958 | 6.00% | 1.02971 | 0.52679 | $ 1,486 | | | $ 1,486 | | | $ 271,894 |
| 56 | $ 2,200 | $ 120 | 0.00364 | 0.97015 | 4.00% | 0.01987 | 0.62460 | 6.00% | 1.02971 | 0.49697 | $ 1,424 | | | $ 1,424 | | | $ 281,473 |
| 57 | $ 2,200 | $ 120 | 0.00387 | 0.96640 | 4.00% | 0.01987 | 0.60057 | 6.00% | 1.02971 | 0.46884 | $ 1,365 | | | $ 1,365 | | | $ 291,549 |
| 58 | $ 2,200 | $ 120 | 0.00411 | 0.96243 | 4.00% | 0.01987 | 0.57748 | 6.00% | 1.02971 | 0.44230 | $ 1,307 | | | $ 1,307 | | | $ 302,137 |
| 59 | $ 2,200 | $ 120 | 0.00439 | 0.95820 | 4.00% | 0.01987 | 0.55526 | 6.00% | 1.02971 | 0.41727 | $ 1,252 | | | $ 1,252 | | | $ 313,266 |
| 60 | $ 2,200 | $ 120 | 0.00474 | 0.95366 | 4.00% | 0.01987 | 0.53391 | 6.00% | 1.02971 | 0.39365 | $ 1,199 | | | $ 1,199 | | | $ 324,979 |
| 61 | $ 2,200 | $ 120 | 0.00521 | 0.94869 | 4.00% | 0.01987 | 0.51337 | 6.00% | 1.02971 | 0.37136 | $ 1,148 | | | $ 1,148 | | | $ 337,334 |
| 62 | $ 2,200 | $ 120 | 0.00579 | 0.94320 | 4.00% | 0.01987 | 0.49363 | 6.00% | 1.02971 | 0.35034 | $ 1,098 | | | $ 1,098 | | | $ 350,409 |
| 63 | $ 2,200 | $ 120 | 0.00644 | 0.93713 | 4.00% | 0.01987 | 0.47464 | 6.00% | 1.02971 | 0.33051 | $ 1,051 | | | $ 1,051 | | | $ 364,291 |
| 64 | $ 2,200 | $ 120 | 0.00717 | 0.93041 | 4.00% | 0.01987 | 0.45639 | 6.00% | 1.02971 | 0.31180 | $ 1,004 | | | $ 1,004 | | | $ 379,060 |
| 65 | $ 2,200 | $ 120 | 0.00796 | 0.92300 | 4.00% | 0.01987 | 0.43883 | 6.00% | 1.02971 | 0.29416 | $ 960 | | | $ 960 | | | $ 394,810 |
| 66 | $ 2,200 | $ 120 | 0.00881 | 0.91487 | 4.00% | 0.01987 | 0.42196 | 6.00% | 1.02971 | 0.27751 | $ 916 | | | $ 916 | | | $ 411,635 |
| 67 | $ 2,200 | $ 120 | 0.00972 | 0.90598 | 4.00% | 0.01987 | 0.40573 | 6.00% | 1.02971 | 0.26180 | $ 874 | | | $ 874 | | | $ 429,642 |
| 68 | $ 2,200 | $ 120 | 0.01073 | 0.89625 | 4.00% | 0.01987 | 0.39012 | 6.00% | 1.02971 | 0.24698 | $ 833 | | | $ 833 | | | $ 448,948 |
| 69 | $ 2,200 | $ 120 | 0.01187 | 0.88562 | 4.00% | 0.01987 | 0.37512 | 6.00% | 1.02971 | 0.23300 | $ 793 | | | $ 793 | | | $ 469,702 |
| 70 | $ 2,200 | $ 120 | 0.01321 | 0.87392 | 4.00% | 0.01987 | 0.36069 | 6.00% | 1.02971 | 0.21981 | $ 754 | | | $ 754 | | | $ 492,087 |
|  |  |  |  |  |  |  |  |  |  |  | $ 717 | | | $ 717 | | | |

FIG. 19

Face Amount $1,000,000   30 Year Term
Baseline: 2020 with IIR -4% (Static)

| | | 2017 CSO Male NS | | | MEC/CVAT/GL | | | Guideline Single | | | MEC 7 PAY LIMIT Per 1000: 31.65 7702A Limit: $31,651 ~185 | | | CVAT NSP AT ISSUE Per 1000: $196.47 7702 Limit: $196,474 ~186 | | |
|---|---|---|---|---|---|---|---|---|---|---|---|---|---|---|---|---|
| Age | Guaranteed Term Prm | Expenses | ANB Qx | tPx | Discount Rate | IPC Factor | PV Factor | Discount Rate | IPC Factor | PV Factor | PV Guar Mort | PV Endow | 7 pay ann | PV Guar Mort | PV Endow | Max CV/1000 ~186 |
| 71 | $ 2,200 | $ 120 | 0.01480 | 0.86098 | 4.00% | 0.01987 | 0.34682 | 6.00% | 1.02971 | 0.20737 | | | | | | $ 516,346 |
| 72 | $ 2,200 | $ 120 | 0.01670 | 0.84660 | 4.00% | 0.01987 | 0.33348 | 6.00% | 1.02971 | 0.19563 | | | | | | $ 542,791 |
| 73 | $ 2,200 | $ 120 | 0.01891 | 0.83060 | 4.00% | 0.01987 | 0.32065 | 6.00% | 1.02971 | 0.19456 | | | | | | $ 571,808 |
| 74 | $ 2,200 | $ 120 | 0.02143 | 0.81280 | 4.00% | 0.01987 | 0.30832 | 6.00% | 1.02971 | 0.17411 | | | | | | $ 603,856 |
| 75 | | $ 120 | 0.02424 | 0.79309 | 4.00% | 0.01987 | 0.29646 | 6.00% | 1.02971 | 0.16425 | $ 5,957 | | | $ 5,957 | | $ 639,470 |
| 76 | | $ 120 | 0.02732 | 0.77143 | 4.00% | 0.01987 | 0.28506 | 6.00% | 1.02971 | 0.15496 | $ 6,299 | | | $ 6,299 | | $ 656,235 |
| 77 | | $ 120 | 0.03071 | 0.74774 | 4.00% | 0.01987 | 0.27409 | 6.00% | 1.02971 | 0.14619 | $ 6,622 | | | $ 6,622 | | $ 673,008 |
| 78 | | $ 120 | 0.03446 | 0.72197 | 4.00% | 0.01987 | 0.26355 | 6.00% | 1.02971 | 0.13791 | $ 6,926 | | | $ 6,926 | | $ 689,791 |
| 79 | | $ 120 | 0.03874 | 0.69400 | 4.00% | 0.01987 | 0.25342 | 6.00% | 1.02971 | 0.13011 | $ 7,229 | | | $ 7,229 | | $ 706,587 |
| 80 | | $ 120 | 0.04368 | 0.66369 | 4.00% | 0.01987 | 0.24367 | 6.00% | 1.02971 | 0.12274 | $ 7,533 | | | $ 7,533 | | $ 723,364 |
| 81 | | $ 120 | 0.04946 | 0.63086 | 4.00% | 0.01987 | 0.23430 | 6.00% | 1.02971 | 0.11579 | $ 7,844 | | | $ 7,844 | | $ 740,077 |
| 82 | | $ 120 | 0.05593 | 0.59558 | 4.00% | 0.01987 | 0.22529 | 6.00% | 1.02971 | 0.10924 | $ 8,107 | | | $ 8,107 | | $ 756,662 |
| 83 | | $ 120 | 0.06346 | 0.55778 | 4.00% | 0.01987 | 0.21662 | 6.00% | 1.02971 | 0.10306 | $ 8,350 | | | $ 8,350 | | $ 773,129 |
| 84 | | $ 120 | 0.07219 | 0.51751 | 4.00% | 0.01987 | 0.20829 | 6.00% | 1.02971 | 0.09722 | $ 8,554 | | | $ 8,554 | | $ 789,430 |
| 85 | | $ 120 | 0.08234 | 0.47490 | 4.00% | 0.01987 | 0.20028 | 6.00% | 1.02971 | 0.09172 | $ 8,704 | | | $ 8,704 | | $ 805,534 |
| 86 | | $ 120 | 0.09409 | 0.43022 | 4.00% | 0.01987 | 0.19257 | 6.00% | 1.02971 | 0.08653 | $ 8,776 | | | $ 8,776 | | $ 821,415 |
| 87 | | $ 120 | 0.10761 | 0.38392 | 4.00% | 0.01987 | 0.18517 | 6.00% | 1.02971 | 0.08163 | $ 8,743 | | | $ 8,743 | | $ 837,072 |
| 88 | | $ 120 | 0.12290 | 0.33674 | 4.00% | 0.01987 | 0.17805 | 6.00% | 1.02971 | 0.07701 | $ 8,568 | | | $ 8,568 | | $ 852,550 |
| 89 | | $ 120 | 0.13949 | 0.28977 | 4.00% | 0.01987 | 0.17120 | 6.00% | 1.02971 | 0.07265 | $ 8,201 | | | $ 8,201 | | $ 867,986 |
| 90 | | $ 120 | 0.15718 | 0.24422 | 4.00% | 0.01987 | 0.16461 | 6.00% | 1.02971 | 0.06854 | $ 7,646 | | | $ 7,646 | | $ 883,712 |
| 91 | | $ 120 | 0.17535 | 0.20140 | 4.00% | 0.01987 | 0.15828 | 6.00% | 1.02971 | 0.06466 | $ 6,913 | | | $ 6,913 | | $ 900,261 |
| 92 | | $ 120 | 0.19352 | 0.16242 | 4.00% | 0.01987 | 0.15219 | 6.00% | 1.02971 | 0.06100 | $ 6,050 | | | $ 6,050 | | $ 918,495 |
| 93 | | $ 120 | 0.21149 | 0.12807 | 4.00% | 0.01987 | 0.14634 | 6.00% | 1.02971 | 0.05755 | $ 5,127 | | | $ 5,127 | | $ 939,726 |
| 94 | | $ 120 | 0.22836 | 0.09883 | 4.00% | 0.01987 | 0.14071 | 6.00% | 1.02971 | 0.05429 | $ 4,197 | $ 13,906 | | $ 4,197 | $ 13,906 | $ 965,901 |
| 95 | | $ 120 | 0.24340 | 0.07477 | 4.00% | 0.01987 | 0.13530 | 6.00% | 1.02971 | 0.05122 | | | | | | $ 1,000,000 |

FIG. 19 (Cont.)

| | | | | | | | Guideline Single Premium | | | | Guidel Level Premium (Level DB) | | | | Guidel Level Premium (Increasing DB) | | | | | |
|---|---|---|---|---|---|---|---|---|---|---|---|---|---|---|---|---|---|---|---|---|
| 30 Year Term | | | | | | | Per 1000: | $ 106.21 | | | GLP/K | $ 10.47 | | | Per 1000: | $ 27.51 | | | | |
| Baseline: 2020 with IIR- 4% (Static) | | | | | | | 7702 Limit | $106,209 | ~187 | | 7702 Limit | $10,467 | ~188 | | 7702 Limit | 27,509 | ~189 | | | |
| Face Amount | $1,000,000 | 2017 CSO | | | | | | | | | | | | | | | | | | Increasing DB |
| Guaranteed | | Male NS | | | | | | | | | | | | | | | | | | Cumulative |
| | | | | | | | | | | | | | | | | | | | | Guideline |
| Age | Term Prm | Expenses | ANB Qx | tPx | PV Guar Mort | PV Expenses | PV Endow | Life ann | Exp DB | Expenses | PV Endow | PV Guar Mort | PV Expenses | PV Endow | Annuity | Max | Corridor |
|---|---|---|---|---|---|---|---|---|---|---|---|---|---|---|---|---|---|
| 45 | $ 2,200 | $ 120 | 0.00183 | 0.99817 | $ 97,986 | $ 2,858 | $ 5,365 | 19.69 | $189,799 | $ 2,362 | $13,906.00 | $ 397,143 | $ 3,727 | $140,713 | $ 22.34 | | |
| 46 | $ 2,200 | $ 120 | 0.00191 | 0.99626 | $ 1,778 | $ 490 | | 1.0000 | $ 1,795 | $ 120 | | $ 1,795 | $ 490 | | 1.00 | $ 106,209 | 215% |
| 47 | $ 2,200 | $ 120 | 0.00197 | 0.99430 | $ 1,747 | $ 386 | | 0.9598 | $ 1,870 | $ 115 | | $ 1,801 | $ 394 | | 0.962 | $ 106,209 | 209% |
| 48 | $ 2,200 | $ 120 | 0.00205 | 0.99226 | $ 1,697 | $ 310 | | 0.9211 | $ 1,851 | $ 111 | | $ 1,786 | $ 324 | | 0.925 | $ 106,209 | 203% |
| 49 | $ 2,200 | $ 120 | 0.00214 | 0.99014 | $ 1,663 | $ 225 | | 0.8839 | $ 1,848 | $ 106 | | $ 1,787 | $ 240 | | 0.889 | $ 110,036 | 197% |
| 50 | $ 2,200 | $ 120 | 0.00225 | 0.98791 | $ 1,634 | $ 141 | | 0.8482 | $ 1,851 | $ 102 | | $ 1,794 | $ 154 | | 0.855 | $ 137,545 | 191% |
| | $ 2,200 | $ 120 | | | $ 1,581 | $ 89 | | 0.8138 | $ 1,826 | $ 98 | | $ 1,773 | $ 99 | | 0.822 | $ 165,054 | 185% |
| 51 | $ 2,200 | $ 120 | 0.00242 | 0.98552 | $ 1,488 | $ 84 | | 0.7808 | $ 1,752 | $ 94 | | $ 1,705 | $ 95 | | 0.790 | $ 192,563 | 178% |
| 52 | $ 2,200 | $ 120 | 0.00263 | 0.98293 | $ 1,401 | $ 79 | | 0.7489 | $ 1,680 | $ 90 | | $ 1,639 | $ 91 | | 0.760 | $ 220,072 | 171% |
| 53 | $ 2,200 | $ 120 | 0.00288 | 0.98010 | $ 1,318 | $ 74 | | 0.7182 | $ 1,611 | $ 86 | | $ 1,576 | $ 88 | | 0.731 | $ 247,581 | 164% |
| 54 | $ 2,200 | $ 120 | 0.00314 | 0.97702 | $ 1,240 | $ 70 | | 0.6886 | $ 1,545 | $ 83 | | $ 1,516 | $ 84 | | 0.703 | $ 275,090 | 157% |
| 55 | $ 2,200 | $ 120 | 0.00340 | 0.97370 | $ 1,166 | $ 65 | | 0.6600 | $ 1,481 | $ 79 | | $ 1,457 | $ 81 | | 0.676 | $ 302,599 | 150% |
| 56 | $ 2,200 | $ 120 | 0.00364 | 0.97015 | $ 1,096 | $ 62 | | 0.6325 | $ 1,419 | $ 76 | | $ 1,404 | $ 78 | | 0.650 | $ 330,108 | 146% |
| 57 | $ 2,200 | $ 120 | 0.00387 | 0.96640 | $ 1,030 | $ 58 | | 0.6060 | $ 1,360 | $ 73 | | $ 1,348 | $ 75 | | 0.625 | $ 357,617 | 142% |
| 58 | $ 2,200 | $ 120 | 0.00411 | 0.96243 | $ 968 | $ 54 | | 0.5804 | $ 1,302 | $ 70 | | $ 1,296 | $ 72 | | 0.601 | $ 385,127 | 139% |
| 59 | $ 2,200 | $ 120 | 0.00439 | 0.95820 | $ 910 | $ 51 | | 0.5558 | $ 1,247 | $ 67 | | $ 1,246 | $ 69 | | 0.577 | $ 412,636 | 134% |
| 60 | $ 2,200 | $ 120 | 0.00474 | 0.95366 | $ 854 | $ 48 | | 0.5321 | $ 1,194 | $ 64 | | $ 1,198 | $ 67 | | 0.555 | $ 440,145 | 130% |
| 61 | $ 2,200 | $ 120 | 0.00521 | 0.94869 | $ 802 | $ 45 | | 0.5092 | $ 1,142 | $ 61 | | $ 1,152 | $ 64 | | 0.534 | $ 467,654 | 128% |
| 62 | $ 2,200 | $ 120 | 0.00579 | 0.94320 | $ 753 | $ 42 | | 0.4870 | $ 1,093 | $ 58 | | $ 1,108 | $ 62 | | 0.513 | $ 495,163 | 126% |
| 63 | $ 2,200 | $ 120 | 0.00644 | 0.93713 | $ 706 | $ 40 | | 0.4656 | $ 1,045 | $ 56 | | $ 1,065 | $ 59 | | 0.494 | $ 522,672 | 124% |
| 64 | $ 2,200 | $ 120 | 0.00717 | 0.93041 | $ 662 | $ 37 | | 0.4448 | $ 998 | $ 53 | | $ 1,024 | $ 57 | | 0.475 | $ 550,181 | 122% |
| 65 | $ 2,200 | $ 120 | 0.00796 | 0.92300 | $ 620 | $ 35 | | 0.4246 | $ 953 | $ 51 | | $ 985 | $ 55 | | 0.456 | $ 577,690 | 120% |
| 66 | $ 2,200 | $ 120 | 0.00881 | 0.91487 | $ 580 | $ 33 | | 0.4050 | $ 909 | $ 49 | | $ 947 | $ 53 | | 0.439 | $ 605,199 | 119% |
| 67 | $ 2,200 | $ 120 | 0.00972 | 0.90598 | $ 543 | $ 30 | | 0.3860 | $ 866 | $ 46 | | $ 910 | $ 51 | | 0.422 | $ 632,708 | 118% |
| 68 | $ 2,200 | $ 120 | 0.01073 | 0.89625 | $ 507 | $ 28 | | 0.3676 | $ 825 | $ 44 | | $ 875 | $ 49 | | 0.406 | $ 660,217 | 117% |
| 69 | $ 2,200 | $ 120 | 0.01187 | 0.88562 | $ 473 | $ 27 | | 0.3496 | $ 785 | $ 42 | | $ 842 | $ 47 | | 0.390 | $ 687,726 | 116% |
| 70 | $ 2,200 | $ 120 | 0.01321 | 0.87392 | $ 441 | $ 25 | | 0.3322 | $ 745 | $ 40 | | $ 809 | $ 45 | | 0.375 | $ 715,235 | 115% |

FIG. 20

30 Year Term
Baseline: 2020 with IIR- 4% (Static)
Face Amount $1,000,000  2017 CSO
Guaranteed  Male NS

| | | Guideline Single Premium | | Guidel Level Premium (Level DB) | | Guidel Level Premium (Increasing DB) | | Increasing DB Cumulative Guideline | |
|---|---|---|---|---|---|---|---|---|---|
| | | Per 1000: $ 106.21 | | GLP/K $ 10.47 | | Per 1000: $ 27.51 | | | |
| | | 7702 Limit $106,209 ~187 | | 7702 Limit $10,467 ~188 | | 7702 Limit $ 27,509 ~189 | | | ~190 |

| Age | Term Prm | Expenses | ANB Qx | 2017 CSO Male NS | tPx | PV Guar Mort | PV Expenses | PV Endow | Life ann | Exp DB | Expenses | PV Endow | PV Guar Mort | PV Expenses | PV Endow | Annuity | Max | Corridor |
|---|---|---|---|---|---|---|---|---|---|---|---|---|---|---|---|---|---|---|
| 71 | $ 2,200 | $ 120 | 0.01480 | 0.86098 | $ 411 | $ 23 | | 0.3152 | $ 707 | $ 38 | | $ 778 | $ 43 | | 0.361 | $ 742,744 | 113% |
| 72 | $ 2,200 | $ 120 | 0.01670 | 0.84660 | $ 382 | $ 21 | | 0.2986 | $ 670 | $ 36 | | $ 748 | $ 42 | | 0.347 | $ 770,253 | 111% |
| 73 | $ 2,200 | $ 120 | 0.01891 | 0.83060 | $ 354 | $ 20 | | 0.2823 | $ 633 | $ 34 | | $ 719 | $ 40 | | 0.333 | $ 797,762 | 109% |
| 74 | $ 2,200 | $ 120 | 0.02143 | 0.81280 | $ 328 | $ 18 | | 0.2663 | $ 598 | $ 32 | | $ 692 | $ 38 | | 0.321 | $ 825,271 | 107% |
| 75 | | $ 120 | 0.02424 | 0.79309 | $ 3,332 | $ 17 | | 0.2506 | $ 6,195 | $ 30 | | $ 7,329 | $ 37 | | 0.308 | $ 852,780 | 105% |
| 76 | | $ 120 | 0.02732 | 0.77143 | $ 3,457 | $ 16 | | 0.2351 | $ 6,551 | $ 28 | | $ 7,943 | $ 36 | | 0.296 | $ 880,289 | 105% |
| 77 | | $ 120 | 0.03071 | 0.74774 | $ 3,566 | $ 14 | | 0.2199 | $ 6,887 | $ 26 | | $ 8,585 | $ 34 | | 0.285 | $ 907,798 | 105% |
| 78 | | $ 120 | 0.03446 | 0.72197 | $ 3,659 | $ 13 | | 0.2050 | $ 7,203 | $ 25 | | $ 9,262 | $ 33 | | 0.274 | $ 935,307 | 105% |
| 79 | | $ 120 | 0.03874 | 0.69400 | $ 3,747 | $ 12 | | 0.1903 | $ 7,518 | $ 23 | | $ 10,012 | $ 32 | | 0.267 | $ 962,816 | 105% |
| 80 | | $ 120 | 0.04368 | 0.66369 | $ 3,831 | $ 11 | | 0.1759 | $ 7,835 | $ 21 | | $ 10,855 | $ 30 | | 0.253 | $ 990,325 | 105% |
| 81 | | $ 120 | 0.04946 | 0.63086 | $ 3,914 | $ 10 | | 0.1617 | $ 8,158 | $ 19 | | $ 11,819 | $ 29 | | 0.244 | $ 1,017,834 | 105% |
| 82 | | $ 120 | 0.05593 | 0.59558 | $ 3,969 | $ 9 | | 0.1478 | $ 8,431 | $ 18 | | $ 12,851 | $ 28 | | 0.234 | $ 1,045,343 | 105% |
| 83 | | $ 120 | 0.06346 | 0.55778 | $ 4,011 | $ 8 | | 0.1342 | $ 8,684 | $ 16 | | $ 14,020 | $ 27 | | 0.225 | $ 1,072,852 | 105% |
| 84 | | $ 120 | 0.07219 | 0.51751 | $ 4,031 | $ 7 | | 0.1208 | $ 8,896 | $ 14 | | $ 15,335 | $ 26 | | 0.217 | $ 1,100,361 | 105% |
| 85 | | $ 120 | 0.08234 | 0.47490 | $ 4,024 | $ 6 | | 0.1078 | $ 9,052 | $ 13 | | $ 16,819 | $ 25 | | 0.208 | $ 1,127,870 | 105% |
| 86 | | $ 120 | 0.09409 | 0.43022 | $ 3,981 | $ 5 | | 0.0951 | $ 9,127 | $ 11 | | $ 18,479 | $ 24 | | 0.200 | $ 1,155,380 | 105% |
| 87 | | $ 120 | 0.10761 | 0.38392 | $ 3,891 | $ 4 | | 0.0828 | $ 9,093 | $ 10 | | $ 20,322 | $ 23 | | 0.193 | $ 1,182,889 | 105% |
| 88 | | $ 120 | 0.12290 | 0.33674 | $ 3,742 | $ 4 | | 0.0711 | $ 8,911 | $ 9 | | $ 22,317 | $ 22 | | 0.185 | $ 1,210,398 | 105% |
| 89 | | $ 120 | 0.13949 | 0.28977 | $ 3,514 | $ 3 | | 0.0600 | $ 8,529 | $ 7 | | $ 24,355 | $ 21 | | 0.178 | $ 1,237,907 | 105% |
| 90 | | $ 120 | 0.15718 | 0.24422 | $ 3,214 | $ 3 | | 0.0496 | $ 7,952 | $ 6 | | $ 26,388 | $ 21 | | 0.171 | $ 1,265,416 | 105% |
| 91 | | $ 120 | 0.17535 | 0.20140 | $ 2,851 | $ 2 | | 0.0402 | $ 7,190 | $ 5 | | $ 28,306 | $ 20 | | 0.165 | $ 1,292,925 | 104% |
| 92 | | $ 120 | 0.19352 | 0.16242 | $ 2,448 | $ 2 | | 0.0319 | $ 6,292 | $ 4 | | $ 30,038 | $ 19 | | 0.158 | $ 1,320,434 | 103% |
| 93 | | $ 120 | 0.21149 | 0.12807 | $ 2,035 | $ 1 | | 0.0247 | $ 5,332 | $ 3 | | $ 31,565 | $ 18 | | 0.152 | $ 1,347,943 | 102% |
| 94 | | $ 120 | 0.22836 | 0.09883 | $ 1,635 | $ 1 | $ 5,365 | 0.0187 | $ 4,365 | $ 2 | $ 13,906 | $ 32,772 | $ 18 | $140,713 | 0.146 | $ 1,375,452 | 101% |

FIG. 20 (Cont.)

Calculating 7702 and 7702A Discount Rates for Hypothetical Age 45 Case

Static IIR Method: Contract Purchased 2020 | Dynamic IIR Method

Annuity #1 - Purchased 2020 (year of policy purchase) when IIR = 4%

191

| | Interest Rates by Prospective Years | | | | |
|---|---|---|---|---|---|
| | 1 | 2 | 3 | 4 | 5+ |
| Guarantee | 5% | 3% | 3% | 3% | 3% |
| IIR | 4% | 4% | 4% | 4% | 4% |
| MEC, CVAT, GL | 5% | 4% | 4% | 4% | 4% |
| Guideline Single | 6% | 6% | 6% | 6% | 6% |
| Current AV | $30,000 | $30,000 | $30,000 | $30,000 | $30,000 |

193C

| | Interest Rates by Prospective Years | | | | |
|---|---|---|---|---|---|
| | 1 | 2 | 3 | 4 | 5+ |
| Guarantee | 5% | 3% | 3% | 3% | 3% |
| IIR | 4% | 4% | 4% | 4% | 4% |
| MEC, CVAT, GL | 5% | 4% | 4% | 4% | 4% |
| Guideline Single | 6% | 6% | 6% | 6% | 6% 193B |
| Current AV | $30,000 | $30,000 | $30,000 | $30,000 | $30,000 193B |

Annuity #2 - Purchased 2021; IIR decreased to 2%

| | Interest Rates by Prospective Years | | | | |
|---|---|---|---|---|---|
| | 1 | 2 | 3 | 4 | 5+ |
| Guarantee | 7% | 5% | 5% | 1% | 1% |
| IIR | 4% | 4% | 4% | 4% | 4% |
| MEC, CVAT, GL | 7% | 5% | 5% | 2% 192 | 2% |
| Guideline Single | 7% | 6% | 6% | 6% | 6% |
| Current AV | $30,000 | $30,000 | $30,000 | $30,000 | $30,000 |

194C

| | Interest Rates by Prospective Years | | | | |
|---|---|---|---|---|---|
| | 1 | 2 | 3 | 4 | 5+ |
| Guarantee | 7% | 5% | 5% | 1% | 1% |
| IIR | 2% | 2% | 2% | 2% | 2% |
| MEC, CVAT, GL | 7% | 5% | 5% | 2% | 2% |
| Guideline Single | 7% | 5% | 5% | 4% | 4% 194B |
| Current AV | $30,000 | $30,000 | $30,000 | $30,000 | $30,000 194B |

Weighted Average (195)
MEC, CVAT, GL: 6.00% 4.50% 4.50% 4.00% 4.00%
Guideline Single: 6.50% 6.00% 6.00% 6.00% 6.00%

Weighted Average (196)
MEC, CVAT, GL: 6.00% 4.50% 4.50% 3.00% 3.00%
Guideline Single: 6.50% 5.50% 5.50% 5.00% 5.00%

FIG. 21

30 Year Term
Static IIR Method
Face Amount $1,000,000
Guaranteed

| | | | 2017 CSO Male NS | | | | | | MEC/CVAT/GL | | | MEC 7 PAY LIMIT Per 1000: 7702A Limit | 31.44 $31,443 | | CVAT NSP AT ISSUE Per 1000: 7702 Limit | $190.98 $190,977 | at issue |
|---|---|---|---|---|---|---|---|---|---|---|---|---|---|---|---|---|---|
| | | | | | | | | | | | Guideline Single | | | | | | |
| Age | Term Prm | Expenses | ANB Qx | tPx | Discount Rate | IPC Factor | PV Factor | Discount Rate | IPC Factor | PV Factor | PV Guar Mort | PV Endow | 7 Pay Ann | PV Guar Mort | PV Endow | Max CV/1000 |
| 45 | $2,200 | $120 | 0.00183 | 0.99817 | 6.00% | 1.02971 | 0.94340 | 6.50% | 1.03216 | 0.93897 | $177,464 | $13,513 | $6.07 | $177,464 | $13,513 | $190,977 |
| 46 | $2,200 | $120 | 0.00191 | 0.99626 | 4.50% | 1.02233 | 0.90277 | 6.00% | 1.02971 | 0.88582 | 1,778 | | 1.00 | 1,778 | | 200,919 |
| 47 | $2,200 | $120 | 0.00197 | 0.99430 | 4.50% | 1.02233 | 0.86390 | 6.00% | 1.02971 | 0.83568 | 1,760 | | 0.94 | 1,760 | | 208,406 |
| 48 | $2,200 | $120 | 0.00205 | 0.99226 | 4.00% | 1.01987 | 0.83067 | 6.00% | 1.02971 | 0.78837 | 1,733 | | 0.90 | 1,733 | | 216,196 |
| 49 | $2,200 | $120 | 0.00214 | 0.99014 | 4.00% | 1.01987 | 0.79872 | 6.00% | 1.02971 | 0.74375 | 1,727 | | 0.86 | 1,727 | | 223,211 |
| 50 | $2,200 | $120 | 0.00225 | 0.98791 | 4.00% | 1.01987 | 0.76800 | 6.00% | 1.02971 | 0.70165 | 1,730 | | 0.82 | 1,730 | | 230,450 |
| | | | | | | | | | | | 1,706 | | 0.79 | 1,706 | | |
| 51 | $2,200 | $120 | 0.00242 | 0.98552 | 4.00% | 1.01987 | 0.73846 | 6.00% | 1.02971 | 0.66193 | 1,637 | | 0.76 | 1,637 | | 237,960 |
| 52 | $2,200 | $120 | 0.00263 | 0.98293 | 4.00% | 1.01987 | 0.71006 | 6.00% | 1.02971 | 0.62447 | 1,570 | | | 1,570 | | 245,829 |
| 53 | $2,200 | $120 | 0.00288 | 0.98010 | 4.00% | 1.01987 | 0.68275 | 6.00% | 1.02971 | 0.58912 | 1,506 | | | 1,506 | | 254,087 |
| 54 | $2,200 | $120 | 0.00314 | 0.97702 | 4.00% | 1.01987 | 0.65649 | 6.00% | 1.02971 | 0.55577 | 1,444 | | | 1,444 | | 262,763 |
| 55 | $2,200 | $120 | 0.00340 | 0.97370 | 4.00% | 1.01987 | 0.63124 | 6.00% | 1.02971 | 0.52431 | 1,384 | | | 1,384 | | 271,884 |
| 56 | $2,200 | $120 | 0.00364 | 0.97015 | 4.00% | 1.01987 | 0.60696 | 6.00% | 1.02971 | 0.49464 | 1,326 | | | 1,326 | | 281,473 |
| 57 | $2,200 | $120 | 0.00387 | 0.96640 | 4.00% | 1.01987 | 0.58362 | 6.00% | 1.02971 | 0.46664 | 1,270 | | | 1,270 | | 291,549 |
| 58 | $2,200 | $120 | 0.00411 | 0.96243 | 4.00% | 1.01987 | 0.56117 | 6.00% | 1.02971 | 0.44022 | 1,217 | | | 1,217 | | 302,137 |
| 59 | $2,200 | $120 | 0.00439 | 0.95820 | 4.00% | 1.01987 | 0.53959 | 6.00% | 1.02971 | 0.41531 | 1,165 | | | 1,165 | | 313,266 |
| 60 | $2,200 | $120 | 0.00474 | 0.95366 | 4.00% | 1.01987 | 0.51883 | 6.00% | 1.02971 | 0.39180 | 1,115 | | | 1,115 | | 324,979 |
| 61 | $2,200 | $120 | 0.00521 | 0.94869 | 4.00% | 1.01987 | 0.49888 | 6.00% | 1.02971 | 0.36962 | 1,067 | | | 1,067 | | 337,334 |
| 62 | $2,200 | $120 | 0.00579 | 0.94320 | 4.00% | 1.01987 | 0.47969 | 6.00% | 1.02971 | 0.34870 | 1,021 | | | 1,021 | | 350,409 |
| 63 | $2,200 | $120 | 0.00644 | 0.93713 | 4.00% | 1.01987 | 0.46124 | 6.00% | 1.02971 | 0.32896 | 976 | | | 976 | | 364,291 |
| 64 | $2,200 | $120 | 0.00717 | 0.93041 | 4.00% | 1.01987 | 0.44350 | 6.00% | 1.02971 | 0.31034 | 933 | | | 933 | | 379,060 |
| 65 | $2,200 | $120 | 0.00796 | 0.92300 | 4.00% | 1.01987 | 0.42644 | 6.00% | 1.02971 | 0.29277 | 890 | | | 890 | | 394,810 |

FIG. 22

30 Year Term
Static IIR Method
Face Amount $1,000,000
Guaranteed

2017 CSO Male NS

MEC/CVAT/GL | Guideline Single

MEC 7 PAY LIMIT
Per 1000: 31.44
7702A Limit: $ 31,443 — 198

CVAT NSP AT ISSUE
Per 1000: $ 190.98
7702 Limit: $ 190,977 at issue — 199

| Age | Term Prm | Expenses | ANB Qx | tPx | Discount Rate | IPC Factor | PV Factor | Discount Rate | IPC Factor | PV Factor | Guar Mort | PV Endow | 7 Pay Ann | PV Guar Mort | PV Endow | Max CV/1000 |
|---|---|---|---|---|---|---|---|---|---|---|---|---|---|---|---|---|
| 66 | $ 2,200 | $ 120 | 0.00881 | 0.91467 | 4.00% | 1.01987 | 0.41004 | 6.00% | 1.02971 | 0.27620 | $ | | | $ 849 | | $ 411,635 |
| 67 | $ 2,200 | $ 120 | 0.00972 | 0.90598 | 4.00% | 1.01987 | 0.39427 | 6.00% | 1.02971 | 0.26057 | | | | 809 | | 429,642 |
| 68 | $ 2,200 | $ 120 | 0.01073 | 0.89625 | 4.00% | 1.01987 | 0.37911 | 6.00% | 1.02971 | 0.24582 | | | | 771 | | 448,948 |
| 69 | $ 2,200 | $ 120 | 0.01187 | 0.88562 | 4.00% | 1.01987 | 0.36453 | 6.00% | 1.02971 | 0.23190 | | | | 733 | | 469,702 |
| 70 | $ 2,200 | $ 120 | 0.01321 | 0.87392 | 4.00% | 1.01987 | 0.35051 | 6.00% | 1.02971 | 0.21878 | | | | 696 | | 492,087 |
| 71 | $ 2,200 | $ 120 | 0.01480 | 0.86098 | 4.00% | 1.01987 | 0.33702 | 6.00% | 1.02971 | 0.20639 | | | | 661 | | 516,348 |
| 72 | $ 2,200 | $ 120 | 0.01670 | 0.84660 | 4.00% | 1.01987 | 0.32406 | 6.00% | 1.02971 | 0.19471 | | | | 626 | | 542,791 |
| 73 | $ 2,200 | $ 120 | 0.01891 | 0.83060 | 4.00% | 1.01987 | 0.31160 | 6.00% | 1.02971 | 0.18369 | | | | 592 | | 571,808 |
| 74 | $ 2,200 | $ 120 | 0.02143 | 0.81280 | 4.00% | 1.01987 | 0.29961 | 6.00% | 1.02971 | 0.17329 | | | | 558 | | 603,856 |
| 75 | $ 120 | | 0.02424 | 0.79309 | 4.00% | 1.01987 | 0.28809 | 6.00% | 1.02971 | 0.16348 | $ 5,789 | | | $ 5,789 | | $ 639,470 |

FIG. 22 (Cont.)

30 Year Term
Static IIR Method

| | | Guideline Single Premium | | | Guidel Level Premium (Level DB) | | Guidel Level Premium (Increasing DB) | |
|---|---|---|---|---|---|---|---|---|
| Face Amount $1,000,000 | | Per 1000: | $ 105.72 — 201 | | GLP/K | $ 10.45 — 202 | Per 1000: | $ 27.45 — 203 |
| Guaranteed | | 7702 Limit | $ 105,717 | | 7702 Limit | $ 10,448 | 7702 Limit | $ 27,453 |
| 2017 CSO | | | | | | | | Increasing DB Cumulative Guideline — 204 |
| | | Male NS | | PV Guar | PV | PV | Life | | Exp DB | PV Expenses | PV Endow | PV Guar Mort | PV Expenses | PV Endow | Annuity | Max | Corridor |

| Age | Term Prm | Expenses | ANB Qx | tPx | PV Guar Mort | PV Expenses | PV Endow | GLP/K | Life Ann | Exp DB | Expenses | PV Endow | PV Guar Mort | PV Expenses | PV Endow Annuity | Max | Corridor |
|---|---|---|---|---|---|---|---|---|---|---|---|---|---|---|---|---|---|
| | | | | | $ 97,530 | $ 2,847 | $ 5,340 | $19.17 | | $184,509 | $2,301 | $13,513.37 | $385,980 | $3,641 | $136,740 $ 21.75 | | |
| 45 | $ 2,200 | $ 120 | 0.00163 | 0.99817 | $ 1,774 | $ 490 | | 1.0000 | | $ 1,778 | $ 120 | | $ 1,778 | $ 490 | 1.00 | $105,717 | 215% |
| 46 | $ 2,200 | $ 120 | 0.00191 | 0.99626 | $ 1,739 | $ 384 | | 0.9417 | | $ 1,839 | $ 113 | | $ 1,763 | $ 387 | 0.943 | $105,717 | 209% |
| 47 | $ 2,200 | $ 120 | 0.00197 | 0.99430 | $ 1,689 | $ 309 | | 0.8994 | | $ 1,811 | $ 108 | | $ 1,740 | $ 316 | 0.903 | $105,717 | 203% |
| 48 | $ 2,200 | $ 120 | 0.00205 | 0.99226 | $ 1,655 | $ 224 | | 0.8590 | | $ 1,796 | $ 103 | | $ 1,737 | $ 233 | 0.864 | $109,812 | 197% |
| 49 | $ 2,200 | $ 120 | 0.00214 | 0.99014 | $ 1,626 | $ 141 | | 0.8242 | | $ 1,799 | $ 99 | | $ 1,743 | $ 150 | 0.831 | $137,265 | 191% |
| 50 | $ 2,200 | $ 120 | 0.00225 | 0.98791 | $ 1,574 | $ 88 | | 0.7908 | | $ 1,774 | $ 95 | | $ 1,723 | $ 96 | 0.799 | $164,719 | 185% |
| 51 | $ 2,200 | $ 120 | 0.00242 | 0.98552 | $ 1,481 | $ 83 | | 0.7587 | | $ 1,702 | $ 91 | | $ 1,657 | $ 92 | 0.768 | $192,172 | 178% |
| 52 | $ 2,200 | $ 120 | 0.00263 | 0.98293 | $ 1,394 | $ 78 | | 0.7278 | | $ 1,633 | $ 87 | | $ 1,593 | $ 89 | 0.738 | $219,625 | 171% |
| 53 | $ 2,200 | $ 120 | 0.00288 | 0.98010 | $ 1,312 | $ 74 | | 0.6979 | | $ 1,566 | $ 84 | | $ 1,532 | $ 85 | 0.710 | $247,078 | 164% |
| 54 | $ 2,200 | $ 120 | 0.00314 | 0.97702 | $ 1,234 | $ 69 | | 0.6692 | | $ 1,501 | $ 80 | | $ 1,473 | $ 82 | 0.683 | $274,531 | 157% |
| 55 | $ 2,200 | $ 120 | 0.00340 | 0.97370 | $ 1,160 | $ 65 | | 0.6414 | | $ 1,439 | $ 77 | | $ 1,416 | $ 79 | 0.656 | $301,984 | 150% |
| 56 | $ 2,200 | $ 120 | 0.00364 | 0.97015 | $ 1,091 | $ 61 | | 0.6146 | | $ 1,379 | $ 74 | | $ 1,362 | $ 76 | 0.631 | $329,437 | 146% |
| 57 | $ 2,200 | $ 120 | 0.00387 | 0.96640 | $ 1,026 | $ 58 | | 0.5888 | | $ 1,321 | $ 71 | | $ 1,309 | $ 73 | 0.607 | $356,890 | 142% |
| 58 | $ 2,200 | $ 120 | 0.00411 | 0.96243 | $ 964 | $ 54 | | 0.5640 | | $ 1,265 | $ 68 | | $ 1,259 | $ 70 | 0.584 | $384,343 | 138% |
| 59 | $ 2,200 | $ 120 | 0.00439 | 0.95820 | $ 905 | $ 51 | | 0.5401 | | $ 1,212 | $ 65 | | $ 1,211 | $ 67 | 0.561 | $411,796 | 134% |
| 60 | $ 2,200 | $ 120 | 0.00474 | 0.95366 | $ 850 | $ 48 | | 0.5170 | | $ 1,160 | $ 62 | | $ 1,164 | $ 65 | 0.540 | $439,249 | 130% |
| 61 | $ 2,200 | $ 120 | 0.00521 | 0.94869 | $ 799 | $ 45 | | 0.4948 | | $ 1,110 | $ 59 | | $ 1,119 | $ 62 | 0.519 | $466,703 | 128% |
| 62 | $ 2,200 | $ 120 | 0.00579 | 0.94320 | $ 749 | $ 42 | | 0.4733 | | $ 1,062 | $ 57 | | $ 1,076 | $ 60 | 0.499 | $494,156 | 126% |
| 63 | $ 2,200 | $ 120 | 0.00644 | 0.93713 | $ 703 | $ 39 | | 0.4524 | | $ 1,015 | $ 54 | | $ 1,035 | $ 58 | 0.480 | $521,609 | 124% |
| 64 | $ 2,200 | $ 120 | 0.00717 | 0.93041 | $ 659 | $ 37 | | 0.4322 | | $ 970 | $ 52 | | $ 995 | $ 55 | 0.461 | $549,062 | 122% |
| 65 | $ 2,200 | $ 120 | 0.00796 | 0.92300 | $ 617 | $ 35 | | 0.4126 | | $ 926 | $ 50 | | $ 957 | $ 53 | 0.444 | $576,515 | 120% |

30 Year Term
Static IIR Method

Face Amount $1,000,000
Guaranteed 2017 CSO Male NS

| | | | | | Guideline Single Premium | | | | Guidel Level Premium (Level DB) | | | | | Guidel Level Premium (Increasing DB) | | | |
|---|---|---|---|---|---|---|---|---|---|---|---|---|---|---|---|---|---|
| | | | | | Per 1000: 7702 Limit | 105.72 105,717 ~201 | | | Per 1000: 7702 Limit | GLP/K 7702 Limit | 10.45 10,448 ~202 | | | Per 1000: 7702 Limit | 27.45 27,453 ~203 | Increasing DB Cumulative Guideline | 204 |
| Term Age | Prm | Expenses | ANB Qx | tPx | PV Guar Mort | PV Expenses | PV Endow | | Life Ann | GLP/K | Exp DB Expenses | PV Expenses | PV Endow | PV Guar Mort | PV Expenses | PV Endow Annuity | Max Corridor |
| 66 | $2,200 | $120 | 0.00881 | 0.91487 | $578 | $32 | | | 0.3936 | $883 | $47 | $920 | $51 | | | 0.426 | $603,968 119% |
| 67 | $2,200 | $120 | 0.00972 | 0.90598 | $540 | $30 | | | 0.3751 | $842 | $45 | $885 | $49 | | | 0.410 | $631,421 118% |
| 68 | $2,200 | $120 | 0.01073 | 0.89625 | $505 | $28 | | | 0.3572 | $801 | $43 | $851 | $47 | | | 0.394 | $658,874 117% |
| 69 | $2,200 | $120 | 0.01187 | 0.88562 | $471 | $26 | | | 0.3398 | $762 | $41 | $818 | $45 | | | 0.379 | $686,327 116% |
| 70 | $2,200 | $120 | 0.01321 | 0.87392 | $439 | $25 | | | 0.3228 | $724 | $39 | $786 | $44 | | | 0.365 | $713,780 115% |
| 71 | $2,200 | $120 | 0.01480 | 0.86098 | $409 | $23 | | | 0.3063 | $687 | $37 | $756 | $42 | | | 0.351 | $741,233 113% |
| 72 | $2,200 | $120 | 0.01670 | 0.84660 | $380 | $21 | | | 0.2902 | $651 | $35 | $727 | $40 | | | 0.337 | $768,686 111% |
| 73 | $2,200 | $120 | 0.01891 | 0.83060 | $352 | $20 | | | 0.2744 | $616 | $33 | $699 | $39 | | | 0.324 | $796,140 109% |
| 74 | $2,200 | $120 | 0.02143 | 0.81280 | $326 | $18 | | | 0.2588 | $581 | $31 | $672 | $37 | | | 0.312 | $823,593 107% |
| | | | | | $3,317 | | | | | $6,020 | | $7,122 | | | | | |
| 75 | $120 | | 0.02424 | 0.79309 | | $17 | | | 0.2435 | | $29 | | $36 | | | 0.300 | $851,046 105% |

FIG. 23 (Cont.)

30 Year Term
Dynamic IIR Method

| | | MEC/CVAT/GL | | Guideline Single | | | MEC 7 PAY LIMIT | | | | CVAT NSP AT ISSUE | | |
|---|---|---|---|---|---|---|---|---|---|---|---|---|---|
| Face Amount $1,000,000 | | | | | | | Per 1000: 43.02 | | | | Per 1000: $263.26 | | |
| | | | | | | | 7702A Limit: $43,019 | | | | 7702 Limit: $263,258 at issue | | |

| Age | Guaranteed Term Prm | Expenses | 2017 CSO Male NS ANB Qx | tPx | Discount Rate | IPC Factor | PV Factor | Discount Rate | IPC Factor | PV Factor | PV Guar Mort | PV Endow | 7 pay ann | PV Guar Mort | PV Endow | Max CV/1000 |
|---|---|---|---|---|---|---|---|---|---|---|---|---|---|---|---|---|
| 45 | $ 2,200 | $ 120 | 0.00183 | 0.99817 | 6.00% | 1.02971 | 0.94340 | 6.50% | 1.03216 | 0.93897 | $ 241,977 | $ 21,280 | $ 6.12 | $ 241,977 | $ 21,280 | $ 263,258 |
| 46 | $ 2,200 | $ 120 | 0.00191 | 0.99626 | 4.50% | 1.02233 | 0.90277 | 5.50% | 1.02725 | 0.89002 | $ 1,778 | | 1.00 | $ 1,778 | | $ 277,677 |
| 47 | $ 2,200 | $ 120 | 0.00197 | 0.99430 | 4.50% | 1.02233 | 0.86390 | 5.50% | 1.02725 | 0.84362 | $ 1,760 | | 0.94 | $ 1,760 | | $ 288,771 |
| 48 | $ 2,200 | $ 120 | 0.00205 | 0.99226 | 3.00% | 1.01493 | 0.83873 | 5.00% | 1.02480 | 0.80345 | $ 1,733 | | 0.90 | $ 1,733 | | $ 300,344 |
| 49 | $ 2,200 | $ 120 | 0.00214 | 0.99014 | 3.00% | 1.01493 | 0.81431 | 5.00% | 1.02480 | 0.76519 | $ 1,735 | | 0.86 | $ 1,735 | | $ 307,905 |
| 50 | $ 2,200 | $ 120 | 0.00225 | 0.98791 | 3.00% | 1.01493 | 0.79059 | 5.00% | 1.02480 | 0.72875 | $ 1,755 | | 0.83 | $ 1,755 | | $ 315,645 |
| 51 | $ 2,200 | $ 120 | 0.00242 | 0.98552 | 3.00% | 1.01493 | 0.76756 | 5.00% | 1.02480 | 0.69405 | $ 1,748 | | 0.81 | $ 1,748 | | $ 323,610 |
| 52 | $ 2,200 | $ 120 | 0.00263 | 0.98293 | 3.00% | 1.01493 | 0.74520 | 5.00% | 1.02480 | 0.66100 | $ 1,693 | | 0.78 | $ 1,693 | | $ 331,889 |
| 53 | $ 2,200 | $ 120 | 0.00288 | 0.98010 | 3.00% | 1.01493 | 0.72350 | 5.00% | 1.02480 | 0.62952 | $ 1,640 | | | $ 1,640 | | $ 340,508 |
| 54 | $ 2,200 | $ 120 | 0.00314 | 0.97702 | 3.00% | 1.01493 | 0.70243 | 5.00% | 1.02480 | 0.59954 | $ 1,588 | | | $ 1,588 | | $ 349,497 |
| 55 | $ 2,200 | $ 120 | 0.00340 | 0.97370 | 3.00% | 1.01493 | 0.68197 | 5.00% | 1.02480 | 0.57099 | $ 1,537 | | | $ 1,537 | | $ 358,876 |
| 56 | $ 2,200 | $ 120 | 0.00364 | 0.97015 | 3.00% | 1.01493 | 0.66210 | 5.00% | 1.02480 | 0.54380 | $ 1,488 | | | $ 1,488 | | $ 368,663 |
| 57 | $ 2,200 | $ 120 | 0.00387 | 0.96640 | 3.00% | 1.01493 | 0.64282 | 5.00% | 1.02480 | 0.51791 | $ 1,439 | | | $ 1,439 | | $ 378,869 |
| 58 | $ 2,200 | $ 120 | 0.00411 | 0.96243 | 3.00% | 1.01493 | 0.62410 | 5.00% | 1.02480 | 0.49325 | $ 1,392 | | | $ 1,392 | | $ 389,509 |
| 59 | $ 2,200 | $ 120 | 0.00439 | 0.95820 | 3.00% | 1.01493 | 0.60592 | 5.00% | 1.02480 | 0.46976 | $ 1,347 | | | $ 1,347 | | $ 400,606 |
| 60 | $ 2,200 | $ 120 | 0.00474 | 0.95366 | 3.00% | 1.01493 | 0.58827 | 5.00% | 1.02480 | 0.44739 | $ 1,302 | | | $ 1,302 | | $ 412,203 |
| 61 | $ 2,200 | $ 120 | 0.00521 | 0.94869 | 3.00% | 1.01493 | 0.57114 | 5.00% | 1.02480 | 0.42608 | $ 1,259 | | | $ 1,259 | | $ 424,348 |
| 62 | $ 2,200 | $ 120 | 0.00579 | 0.94320 | 3.00% | 1.01493 | 0.55450 | 5.00% | 1.02480 | 0.40579 | $ 1,216 | | | $ 1,216 | | $ 437,123 |
| 63 | $ 2,200 | $ 120 | 0.00644 | 0.93713 | 3.00% | 1.01493 | 0.53835 | 5.00% | 1.02480 | 0.38647 | $ 1,175 | | | $ 1,175 | | $ 450,613 |
| 64 | $ 2,200 | $ 120 | 0.00717 | 0.93041 | 3.00% | 1.01493 | 0.52267 | 5.00% | 1.02480 | 0.36807 | $ 1,134 | | | $ 1,134 | | $ 464,892 |
| 65 | $ 2,200 | $ 120 | 0.00796 | 0.92300 | 3.00% | 1.01493 | 0.50745 | 5.00% | 1.02480 | 0.35054 | $ 1,094 | | | $ 1,094 | | $ 480,048 |
| | | | | | | | | | | | $ 1,054 | | | $ 1,054 | | |

FIG. 24

30 Year Term
Dynamic IIR Method
Face Amount $1,000,000

| | | | MEC 7 PAY LIMIT | | | | | | CVAT NSP AT ISSUE | | |
|---|---|---|---|---|---|---|---|---|---|---|---|
| | | | Per 1000: 43.02 | | | | | | Per 1000: $ 263.26 | | |
| | | | 7702A Limit: $ 43,019 | | | | | | 7702A Limit: $263,258 at issue | | |
| | | | | | | | | 206 | | | 207 |
| | | | MEC/CVAT/GL | | | Guideline Single | | | | | |
| | Guaranteed | 2017 CSO Male NS | | Discount | IPC | PV | Discount | IPC | PV | | |
| Age | Term Prm | ANB Qx | tPx | Rate | Factor | Factor | Rate | Factor | Factor | PV Guar Mort | PV Endow | 7 pay ann | PV Guar Mort | PV Endow | Max CV/1000 |

| Age | Guaranteed Term Prm | 2017 CSO Male NS ANB Qx | tPx | Discount Rate | IPC Factor | PV Factor | Discount Rate | IPC Factor | PV Factor | PV Guar Mort | PV Endow | 7 pay ann | PV Guar Mort | PV Endow | Max CV/1000 |
|---|---|---|---|---|---|---|---|---|---|---|---|---|---|---|---|
| 66 | $ 2,200 | 0.00881 | 0.91487 | 3.00% | 1.01493 | 0.49267 | 5.00% | 1.02480 | 0.33385 | | | | $ 1,015 | | $ 496.166 |
| 67 | $ 2,200 | 0.00972 | 0.90598 | 3.00% | 1.01493 | 0.47832 | 5.00% | 1.02480 | 0.31795 | | | | 977 | | $ 513.341 |
| 68 | $ 2,200 | 0.01073 | 0.89625 | 3.00% | 1.01493 | 0.46439 | 5.00% | 1.02480 | 0.30281 | | | | 939 | | $ 531.676 |
| 69 | $ 2,200 | 0.01187 | 0.88562 | 3.00% | 1.01493 | 0.45086 | 5.00% | 1.02480 | 0.28839 | | | | 902 | | $ 551.309 |
| 70 | $ 2,200 | 0.01321 | 0.87392 | 3.00% | 1.01493 | 0.43773 | 5.00% | 1.02480 | 0.27466 | | | | 866 | | $ 572.410 |
| 71 | $ 2,200 | 0.01480 | 0.86098 | 3.00% | 1.01493 | 0.42498 | 5.00% | 1.02480 | 0.26158 | | | | 829 | | $ 595.213 |
| 72 | $ 2,200 | 0.01670 | 0.84660 | 3.00% | 1.01493 | 0.41260 | 5.00% | 1.02480 | 0.24912 | | | | 793 | | $ 620.012 |
| 73 | $ 2,200 | 0.01891 | 0.83060 | 3.00% | 1.01493 | 0.40058 | 5.00% | 1.02480 | 0.23726 | | | | 757 | | $ 647.188 |
| 74 | $ 2,200 | 0.02143 | 0.81280 | 3.00% | 1.01493 | 0.38892 | 5.00% | 1.02480 | 0.22596 | | | | 721 | | $ 677.176 |
| 75 | $ | 0.02424 | 0.79309 | 3.00% | 1.01493 | 0.37759 | 5.00% | 1.02480 | 0.21520 | | | | $ 7,550 | | $ 710.484 |

FIG. 24 (Cont.)

30 Year Term
Dynamic IIR Method

| | | | Guideline Single Premium | | | Guide Level Premium (Level DB) | | | Guide Level Premium (Increasing DB) | | | | |
|---|---|---|---|---|---|---|---|---|---|---|---|---|---|
| | | | Per 1000: $ 140.85 — 209 | | | GLP/K $ 12.66 — 210 | | | Per 1000: $ 35.81 — 211 | | | | |
| | | | 7702 Limit: $ 140,854 | | | 7702 Limit: $ 12,660 | | | 7702 Limit: $ 35,813 | | | | |

Face Amount $1,000,000

| Age | Guaranteed Term Prm | Expenses | PV Guar Mort | PV Expenses | PV Endow | Life ann | Exp DB | Expenses | PV Endow | PV Guar Mort | PV Expenses | PV Endow | Annuity | Increasing DB Cumulative Guideline | Corridor |
|---|---|---|---|---|---|---|---|---|---|---|---|---|---|---|---|
| | | | $ 129,391 | $ 3,047 | $ 8,416 | $ 21.57 | $ 249,263 | $ 2,589 | $ 21,280.47 | $ 553,280 | $ 4,045 | $ 215,334 | $ 25.11 | | 212 |
| 45 | $ 2,200 | $ 120 | $ 1,774 | $ 490 | | 1.0000 | $ 1,778 | $ 120 | | $ 1,778 | $ 490 | | 1.000 | $ 140,854 | 215% |
| 46 | $ 2,200 | $ 120 | $ 1,743 | $ 384 | | 0.9417 | $ 1,839 | $ 113 | | $ 1,763 | $ 387 | | 0.943 | $ 140,854 | 209% |
| 47 | $ 2,200 | $ 120 | $ 1,701 | $ 310 | | 0.8994 | $ 1,811 | $ 108 | | $ 1,740 | $ 316 | | 0.903 | $ 140,854 | 203% |
| 48 | $ 2,200 | $ 120 | $ 1,678 | $ 226 | | 0.8590 | $ 1,787 | $ 103 | | $ 1,745 | $ 233 | | 0.864 | $ 143,253 | 197% |
| 49 | $ 2,200 | $ 120 | $ 1,665 | $ 144 | | 0.8322 | $ 1,808 | $ 100 | | $ 1,769 | $ 151 | | 0.839 | $ 179,066 | 191% |
| 50 | $ 2,200 | $ 120 | $ 1,627 | $ 91 | | 0.8063 | $ 1,800 | $ 97 | | $ 1,765 | $ 98 | | 0.814 | $ 214,880 | 185% |
| 51 | $ 2,200 | $ 120 | $ 1,546 | $ 86 | | 0.7810 | $ 1,744 | $ 94 | | $ 1,714 | $ 95 | | 0.791 | $ 250,693 | 178% |
| 52 | $ 2,200 | $ 120 | $ 1,469 | $ 82 | | 0.7564 | $ 1,689 | $ 91 | | $ 1,664 | $ 92 | | 0.768 | $ 286,506 | 171% |
| 53 | $ 2,200 | $ 120 | $ 1,395 | $ 78 | | 0.7325 | $ 1,636 | $ 88 | | $ 1,615 | $ 89 | | 0.745 | $ 322,320 | 164% |
| 54 | $ 2,200 | $ 120 | $ 1,325 | $ 74 | | 0.7091 | $ 1,583 | $ 85 | | $ 1,568 | $ 87 | | 0.723 | $ 358,133 | 157% |
| 55 | $ 2,200 | $ 120 | $ 1,258 | $ 70 | | 0.6863 | $ 1,532 | $ 82 | | $ 1,523 | $ 84 | | 0.702 | $ 393,946 | 150% |
| 56 | $ 2,200 | $ 120 | $ 1,194 | $ 67 | | 0.6640 | $ 1,483 | $ 80 | | $ 1,478 | $ 82 | | 0.682 | $ 429,759 | 146% |
| 57 | $ 2,200 | $ 120 | $ 1,133 | $ 63 | | 0.6423 | $ 1,434 | $ 77 | | $ 1,435 | $ 79 | | 0.662 | $ 465,573 | 142% |
| 58 | $ 2,200 | $ 120 | $ 1,075 | $ 60 | | 0.6212 | $ 1,387 | $ 75 | | $ 1,394 | $ 77 | | 0.643 | $ 501,386 | 138% |
| 59 | $ 2,200 | $ 120 | $ 1,019 | $ 57 | | 0.6006 | $ 1,341 | $ 72 | | $ 1,353 | $ 75 | | 0.624 | $ 537,199 | 134% |
| 60 | $ 2,200 | $ 120 | $ 967 | $ 54 | | 0.5806 | $ 1,296 | $ 70 | | $ 1,314 | $ 73 | | 0.606 | $ 573,012 | 130% |
| 61 | $ 2,200 | $ 120 | $ 916 | $ 51 | | 0.5610 | $ 1,253 | $ 67 | | $ 1,275 | $ 71 | | 0.588 | $ 608,826 | 128% |
| 62 | $ 2,200 | $ 120 | $ 868 | $ 49 | | 0.5418 | $ 1,210 | $ 65 | | $ 1,238 | $ 69 | | 0.571 | $ 644,639 | 126% |
| 63 | $ 2,200 | $ 120 | $ 822 | $ 46 | | 0.5230 | $ 1,168 | $ 63 | | $ 1,202 | $ 67 | | 0.555 | $ 680,452 | 124% |
| 64 | $ 2,200 | $ 120 | $ 778 | $ 43 | | 0.5045 | $ 1,126 | $ 61 | | $ 1,167 | $ 65 | | 0.538 | $ 716,266 | 122% |
| 65 | $ 2,200 | $ 120 | $ 735 | $ 41 | | 0.4863 | $ 1,086 | $ 58 | | $ 1,133 | $ 63 | | 0.523 | $ 752,079 | 120% |

30 Year Term
Dynamic IIR Method

Face Amount $1,000,000

| | | | Guideline Single Premium 209 | | | | Guidel Level Premium (lLevel DB) 210 | | | | Guide Level Premium (Increasing DB) 211 | | | | 212 |
|---|---|---|---|---|---|---|---|---|---|---|---|---|---|---|---|---|
| | | | Per 1000: $ 140.85 | | | | GLP/K $ 12.66 | | | | Per 1000: $ 35.81 | | | | Increasing DB Cumulative | |
| | | | 7702 Limit: $140,854 | | | | 7702 Limit: $12,660 | | | | 7702 Limit: $35,813 | | | | Guideline | Corridor |
| Age | Guaranteed Term Prm | Expenses | PV Gaur Mort | PV Expenses | PV Endow | Life ann | Exp DB | Expenses | PV Endow | PV Guar Mort | PV Expenses | PV Endow | Annuity | | |
| 66 | $ 2,200 | $ 120 | $ 695 | $ 39 | | 0.4684 | $ 1,046 | $ 56 | | $ 1,100 | $ 61 | | 0.507 | $787,892 | 119% |
| 67 | $ 2,200 | $ 120 | $ 656 | $ 37 | | 0.4507 | $ 1,006 | $ 54 | | $ 1,068 | $ 59 | | 0.493 | $823,705 | 118% |
| 68 | $ 2,200 | $ 120 | $ 619 | $ 35 | | 0.4333 | $ 968 | $ 52 | | $ 1,037 | $ 57 | | 0.478 | $859,519 | 117% |
| 69 | $ 2,200 | $ 120 | $ 583 | $ 33 | | 0.4162 | $ 929 | $ 50 | | $ 1,007 | $ 56 | | 0.464 | $895,332 | 116% |
| 70 | $ 2,200 | $ 120 | $ 548 | $ 31 | | 0.3993 | $ 892 | $ 48 | | $ 977 | $ 54 | | 0.451 | $931,145 | 115% |
| 71 | $ 2,200 | $ 120 | $ 515 | $ 29 | | 0.3825 | $ 854 | $ 46 | | $ 949 | $ 53 | | 0.438 | $966,959 | 113% |
| 72 | $ 2,200 | $ 120 | $ 484 | $ 27 | | 0.3659 | $ 817 | $ 44 | | $ 921 | $ 51 | | 0.425 | $1,002,772 | 111% |
| 73 | $ 2,200 | $ 120 | $ 453 | $ 25 | | 0.3493 | $ 780 | $ 42 | | $ 894 | $ 50 | | 0.413 | $1,038,585 | 109% |
| 74 | $ 2,200 | $ 120 | $ 423 | $ 24 | | 0.3327 | $ 743 | $ 40 | | $ 868 | $ 48 | | 0.401 | $1,074,398 | 107% |
| 75 | $ | $ 120 | $ 4,345 | $ 22 | | 0.3161 | $ 7,777 | $ 38 | | $ 9,289 | $ 47 | | 0.389 | $1,110,212 | 105% |

FIG. 25 (Cont.)

Calculating 7702 and 7702A Discount Rates for Hypothetical Age 65 Compliance Test

| Static IIR Method: Contract Purchased 2020 | Dynamic IIR Method |
|---|---|

Annuity #3 - 1035 Exchange & New Premium into New Annuity with Strong Guarantee (3 Yrs)

213 →

| Guarantee | Interest Rates by Prospective Years | | | | |
|---|---|---|---|---|---|
| | 1 | 2 | 3 | 4 | 5+ |
| 213A → 8% | 8% | 8% | 2% | 2% |
| IIR | 4% | 4% | 4% | 4% | 4% |
| MEC, CVAT, GL | 8% | 8% | 8% | 4% | 4% |
| Guideline Single | 8% | 8% | 8% | 6% | 6% |
| Current AV | $400,000 | $400,000 | $400,000 | $400,000 | $400,000 |

214 →

| Guarantee | Interest Rates by Prospective Years | | | | |
|---|---|---|---|---|---|
| | 1 | 2 | 3 | 4 | 5+ |
| | 8% | 8% | 8% | 2% | 2% |
| IIR | 2% | 2% | 2% | 2% | 2% |
| MEC, CVAT, GL | 8% | 8% | 8% | 2% | 2% |
| Guideline Single | 8% | 8% | 8% | 4% | 4% |
| Current AV | $400,000 | $400,000 | $400,000 | $400,000 | $400,000 |

Annuity #4 - 1035 Exchange & Additional Premium into New Deferred Annuity with GMWB

213 →

| Guarantee | Interest Rates by Prospective Years | | | | |
|---|---|---|---|---|---|
| | 1 | 2 | 3 | 4 | 5+ |
| | 1% | 1% | 1% | 1% | 1% |
| IIR | 4% | 4% | 4% | 4% | 4% |
| MEC, CVAT, GL | 4% | 4% | 4% | 4% | 4% |
| Guideline Single | 6% | 6% | 6% | 6% | 6% |
| Current AV | $100,000 | $100,000 | $100,000 | $100,000 | $100,000 |

215

Weighted Average
MEC, CVAT, GL  6.00%  6.00%  6.00%  4.00%  4.00%
Guideline Single  7.00%  7.00%  7.00%  6.00%  6.00%

214 →

| Guarantee | Interest Rates by Prospective Years | | | | |
|---|---|---|---|---|---|
| | 1 | 2 | 3 | 4 | 5+ |
| | 1% | 1% | 1% | 1% | 1% |
| IIR | 2% | 2% | 2% | 2% | 2% |
| MEC, CVAT, GL | 2% | 2% | 2% | 2% | 2% |
| Guideline Single | 4% | 4% | 4% | 4% | 4% |
| Current AV | $100,000 | $100,000 | $100,000 | $100,000 | $100,000 |

216

Weighted Average
MEC, CVAT, GL  5.00%  5.00%  5.00%  2.00%  2.00%
Guideline Single  6.00%  6.00%  6.00%  4.00%  4.00%

FIG. 26

30 Year Term
Static IR - Exchange Annuities @ 65

| | | MEC/CVAT/GL | Guideline Single | | MEC 7 PAY LIMIT | | CVAT NSP AT ISSUE | |
|---|---|---|---|---|---|---|---|---|
| Face Amount $1,000,000 Guaranteed | | | | | Per 1000: 29.96 | | Per 1000: 182.00 | |
| | | | | | 7702A Limit $29,965 | | 7702 Limit $182,000 at Issue | |

| Age | Term Prm | Expenses | 2017 CSO Male NS ANB Qx | tPx | Discount Rate | IPC Factor | PV Factor | Discount Rate | IPC Factor | PV Factor | PV Guar Mort | PV Endow | 7 Pay Ann | PV Guar Mort | PV Endow | Max CV/1000 |
|---|---|---|---|---|---|---|---|---|---|---|---|---|---|---|---|---|
| | | | | | | | | | | | $ 169,238 | $ 12,763 | 60.7 | $ 169,238 | $ 12,763 | |
| 45 | $ 2,200 | $ 120 | 0.00183 | 0.99817 | 6.00% | 1.02971 | 0.94340 | 6.50% | 1.03216 | 0.93897 | $ 1,778 | | 1.00 | $ 1,778 | | $ 182,000 |
| 46 | $ 2,200 | $ 120 | 0.00191 | 0.99626 | 4.50% | 1.02233 | 0.90277 | 6.00% | 1.02971 | 0.88582 | $ 1,760 | | 0.94 | $ 1,760 | | $ 191,386 |
| 47 | $ 2,200 | $ 120 | 0.00197 | 0.99430 | 4.50% | 1.02233 | 0.86390 | 6.00% | 1.02971 | 0.83568 | $ 1,733 | | 0.90 | $ 1,733 | | $ 198,425 |
| 48 | $ 2,200 | $ 120 | 0.00205 | 0.99226 | 4.00% | 1.01987 | 0.83067 | 6.00% | 1.02971 | 0.78637 | $ 1,727 | | 0.86 | $ 1,727 | | $ 205,746 |
| 49 | $ 2,200 | $ 120 | 0.00214 | 0.99014 | 4.00% | 1.01987 | 0.79872 | 6.00% | 1.02971 | 0.74375 | $ 1,730 | | 0.82 | $ 1,730 | | $ 212,320 |
| 50 | $ 2,200 | $ 120 | 0.00225 | 0.98791 | 4.00% | 1.01987 | 0.76800 | 6.00% | 1.02971 | 0.70165 | $ 1,706 | | 0.79 | $ 1,706 | | $ 219,099 |
| 51 | $ 2,200 | $ 120 | 0.00242 | 0.98552 | 4.00% | 1.01987 | 0.73846 | 6.00% | 1.02971 | 0.66193 | $ 1,637 | | 0.76 | $ 1,637 | | $ 226,128 |
| 52 | $ 2,200 | $ 120 | 0.00263 | 0.98293 | 4.00% | 1.01987 | 0.71006 | 6.00% | 1.02971 | 0.62447 | $ 1,570 | | | $ 1,570 | | $ 233,495 |
| 53 | $ 2,200 | $ 120 | 0.00288 | 0.98010 | 4.00% | 1.01987 | 0.68275 | 6.00% | 1.02971 | 0.58912 | $ 1,506 | | | $ 1,506 | | $ 241,225 |
| 54 | $ 2,200 | $ 120 | 0.00314 | 0.97702 | 4.00% | 1.01987 | 0.65649 | 6.00% | 1.02971 | 0.55577 | $ 1,444 | | | $ 1,444 | | $ 249,348 |
| 55 | $ 2,200 | $ 120 | 0.00340 | 0.97370 | 4.00% | 1.01987 | 0.63124 | 6.00% | 1.02971 | 0.52431 | $ 1,384 | | | $ 1,384 | | $ 257,888 |
| 56 | $ 2,200 | $ 120 | 0.00364 | 0.97015 | 4.00% | 1.01987 | 0.60696 | 6.00% | 1.02971 | 0.49464 | $ 1,326 | | | $ 1,326 | | $ 266,868 |
| 57 | $ 2,200 | $ 120 | 0.00387 | 0.96640 | 4.00% | 1.01987 | 0.58362 | 6.00% | 1.02971 | 0.46664 | $ 1,270 | | | $ 1,270 | | $ 276,304 |
| 58 | $ 2,200 | $ 120 | 0.00411 | 0.96243 | 4.00% | 1.01987 | 0.56117 | 6.00% | 1.02971 | 0.44022 | $ 1,217 | | | $ 1,217 | | $ 286,220 |
| 59 | $ 2,200 | $ 120 | 0.00439 | 0.95820 | 4.00% | 1.01987 | 0.53959 | 6.00% | 1.02971 | 0.41531 | $ 1,165 | | | $ 1,165 | | $ 296,645 |
| 60 | $ 2,200 | $ 120 | 0.00474 | 0.95366 | 4.00% | 1.01987 | 0.51883 | 6.00% | 1.02971 | 0.39180 | $ 1,115 | | | $ 1,115 | | $ 307,617 |
| 61 | $ 2,200 | $ 120 | 0.00521 | 0.94869 | 4.00% | 1.01987 | 0.49888 | 6.00% | 1.02971 | 0.36962 | $ 1,067 | | | $ 1,067 | | $ 319,191 |
| 62 | $ 2,200 | $ 120 | 0.00579 | 0.94320 | 4.00% | 1.01987 | 0.47969 | 6.00% | 1.02971 | 0.34870 | $ 1,021 | | | $ 1,021 | | $ 331,442 |
| 63 | $ 2,200 | $ 120 | 0.00644 | 0.93713 | 4.00% | 1.01987 | 0.46124 | 6.00% | 1.02971 | 0.32896 | $ 976 | | | $ 976 | | $ 344,450 |
| 64 | $ 2,200 | $ 120 | 0.00717 | 0.93041 | 4.00% | 1.01987 | 0.44350 | 6.00% | 1.02971 | 0.31034 | $ 933 | | | $ 933 | | $ 358,292 |
| 65 | $ 2,200 | $ 120 | 0.00796 | 0.92300 | 6.00% | 1.02971 | 0.41840 | 7.00% | 1.03461 | 0.29004 | $ 882 | | | $ 882 | | $ 373,055 |

FIG. 27

30 Year Term
Static IIR - Exchange Annuities @ 65

Face Amount $1,000,000
Guaranteed

| | | 2017 CSO Male NS | | | MEC/CVAT/GL | | | Guideline Single | | | | MEC 7 PAY LIMIT | | CVAT NSP AT ISSUE | |
|---|---|---|---|---|---|---|---|---|---|---|---|---|---|---|---|
| | | | | | | | | | | | | Per 1000: 29.96 | Per 1000: $182.00 | | |
| | | | | | | | | | | | | 7702A Limit $29,965 | 7702 Limit $182,000 at issue | | |
| Term Age | Term Prm | Expenses | ANB Qx | tPx | Discount Rate | IPC Factor | PV Factor | Discount Rate | IPC Factor | PV Factor | PV Guar Mort | PV Endow | 7 Pay Ann PV Guar Mort | PV Endow | Max CV/1000 |
| 66 | $ 2,200 | $ 120 | 0.00881 | 0.91487 | 6.00% | 1.02971 | 0.39471 | 7.00% | 1.03461 | 0.27106 | $ 825 | | $ 825 | | $ 396,328 |
| 67 | $ 2,200 | $ 120 | 0.00972 | 0.90598 | 6.00% | 1.02971 | 0.37237 | 7.00% | 1.03461 | 0.25333 | 772 | | $ 772 | | $ 421,556 |
| 68 | $ 2,200 | $ 120 | 0.01073 | 0.89625 | 4.00% | 1.01987 | 0.35805 | 6.00% | 1.02971 | 0.23899 | 728 | | $ 728 | | $ 448,948 |
| 69 | $ 2,200 | $ 120 | 0.01187 | 0.88662 | 4.00% | 1.01987 | 0.34428 | 6.00% | 1.02971 | 0.22546 | 692 | | $ 692 | | $ 469,702 |
| 70 | $ 2,200 | $ 120 | 0.01321 | 0.87392 | 4.00% | 1.01987 | 0.33104 | 6.00% | 1.02971 | 0.21270 | 658 | | $ 658 | | $ 492,087 |
| 71 | $ 2,200 | $ 120 | 0.01480 | 0.86098 | 4.00% | 1.01987 | 0.31831 | 6.00% | 1.02971 | 0.20086 | 624 | | $ 624 | | $ 516,348 |
| 72 | $ 2,200 | $ 120 | 0.01670 | 0.84660 | 4.00% | 1.01987 | 0.30606 | 6.00% | 1.02971 | 0.18930 | 591 | | $ 591 | | $ 542,791 |
| 73 | $ 2,200 | $ 120 | 0.01891 | 0.83060 | 4.00% | 1.01987 | 0.29429 | 6.00% | 1.02971 | 0.17859 | 559 | | $ 559 | | $ 571,808 |
| 74 | $ 2,200 | $ 120 | 0.02143 | 0.81280 | 4.00% | 1.01987 | 0.28297 | 6.00% | 1.02971 | 0.16848 | 527 | | $ 527 | | $ 603,856 |
| 75 | $ | $ 120 | 0.02424 | 0.79309 | 4.00% | 1.01987 | 0.27209 | 6.00% | 1.02971 | 0.15894 | 5,467 | | $ 5,467 | | $ 639,470 |

| | | | | | Guideline Single Premium | | | | Guidel Level Premium (Level DB) | | | | Guidel Level Premium (Increasing DB) | | | | Increasing DB Cumulative Guideline | |
|---|---|---|---|---|---|---|---|---|---|---|---|---|---|---|---|---|---|---|
| 30 Year Term | | | | | Per 1000: | $ 103.55 | | | GLP/K | $ 10.11 | | | Per 1000: | $ 26.40 | | | | |
| Static IIR - Exchange Annuities @ 65 | | | | | 7702 Limit | $103,552 | | | 7702 Limit | $10,107 | | | 7702 Limit | 26,997 | | | | |
| Face Amount $1,000,000 2017 CSO | | | | | | | | | | | | | | | | | | |
| Guaranteed Male NS | | | | | | | | | | | | | | | | | | |
| Age | Term Prm | Expenses | ANB Qx | tPx | PV Guar Mort | PV Expenses | PV Endow | Life ann | Exp DB | Expenses | PV Endow | PV Guar Mort | PV Expenses | PV Endow | Annuity | | Max | Corridor |
| 45 | $ 2,200 | $ 120 | 0.00183 | 0.99817 | $ 95,323 | $ 2,837 | $ 5,192 | $ 18.90 | $176,003 | $ 2,268 | $12,762.81 | $ 366,213 | $ 3,393 | $140,713 | $ 21.36 | | | |
| 46 | $ 2,200 | $ 120 | 0.00191 | 0.99626 | 1,774 | 490 | | 1.0000 | 1,778 | 120 | | 1,778 | 490 | | 1.00 | | $ 103,552 | 215% |
| 47 | $ 2,200 | $ 120 | 0.00197 | 0.99430 | 1,739 | 384 | | 0.9417 | 1,839 | 113 | | 1,763 | 387 | | 0.943 | | $ 103,552 | 209% |
| 48 | $ 2,200 | $ 120 | 0.00205 | 0.99226 | 1,689 | 309 | | 0.8994 | 1,811 | 108 | | 1,740 | 316 | | 0.903 | | $ 103,552 | 203% |
| 49 | $ 2,200 | $ 120 | 0.00214 | 0.99014 | 1,655 | 224 | | 0.8590 | 1,796 | 103 | | 1,737 | 233 | | 0.864 | | $ 105,590 | 197% |
| 50 | $ 2,200 | $ 120 | 0.00225 | 0.98791 | 1,626 | 141 | | 0.8242 | 1,799 | 99 | | 1,743 | 150 | | 0.831 | | $ 131,987 | 191% |
| 51 | $ 2,200 | $ 120 | 0.00242 | 0.98552 | 1,574 | 88 | | 0.7908 | 1,774 | 95 | | 1,723 | 96 | | 0.799 | | $ 158,385 | 185% |
| 52 | $ 2,200 | $ 120 | 0.00263 | 0.98293 | 1,481 | 83 | | 0.7587 | 1,702 | 91 | | 1,657 | 92 | | 0.768 | | $ 184,782 | 178% |
| 53 | $ 2,200 | $ 120 | 0.00288 | 0.98010 | 1,394 | 78 | | 0.7278 | 1,633 | 87 | | 1,593 | 89 | | 0.738 | | $ 211,180 | 171% |
| 54 | $ 2,200 | $ 120 | 0.00314 | 0.97702 | 1,312 | 74 | | 0.6979 | 1,566 | 84 | | 1,532 | 85 | | 0.710 | | $ 237,577 | 164% |
| 55 | $ 2,200 | $ 120 | 0.00340 | 0.97370 | 1,234 | 69 | | 0.6692 | 1,501 | 80 | | 1,473 | 82 | | 0.683 | | $ 263,975 | 157% |
| 56 | $ 2,200 | $ 120 | 0.00364 | 0.97015 | 1,160 | 65 | | 0.6414 | 1,439 | 77 | | 1,416 | 79 | | 0.656 | | $ 290,372 | 150% |
| 57 | $ 2,200 | $ 120 | 0.00387 | 0.96640 | 1,091 | 61 | | 0.6146 | 1,379 | 74 | | 1,362 | 76 | | 0.631 | | $ 316,770 | 146% |
| 58 | $ 2,200 | $ 120 | 0.00411 | 0.96243 | 1,026 | 58 | | 0.5888 | 1,321 | 71 | | 1,309 | 73 | | 0.607 | | $ 343,167 | 142% |
| 59 | $ 2,200 | $ 120 | 0.00439 | 0.95820 | 964 | 54 | | 0.5640 | 1,265 | 68 | | 1,259 | 70 | | 0.584 | | $ 369,564 | 138% |
| 60 | $ 2,200 | $ 120 | 0.00474 | 0.95366 | 905 | 51 | | 0.5401 | 1,212 | 65 | | 1,211 | 67 | | 0.561 | | $ 495,962 | 134% |
| 61 | $ 2,200 | $ 120 | 0.00521 | 0.94869 | 850 | 48 | | 0.5170 | 1,160 | 62 | | 1,164 | 65 | | 0.540 | | $ 422,359 | 130% |
| 62 | $ 2,200 | $ 120 | 0.00579 | 0.94320 | 799 | 45 | | 0.4948 | 1,110 | 59 | | 1,119 | 62 | | 0.519 | | $ 448,757 | 128% |
| 63 | $ 2,200 | $ 120 | 0.00644 | 0.93713 | 749 | 42 | | 0.4733 | 1,062 | 57 | | 1,076 | 60 | | 0.499 | | $ 475,154 | 126% |
| 64 | $ 2,200 | $ 120 | 0.00717 | 0.93041 | 703 | 39 | | 0.4524 | 1,015 | 54 | | 1,035 | 58 | | 0.480 | | $ 501,552 | 124% |
| 65 | $ 2,200 | $ 120 | 0.00796 | 0.92300 | 659 | 37 | | 0.4322 | 970 | 52 | | 995 | 55 | | 0.461 | | $ 527,949 | 122% |
| 66 | $ 2,200 | $ 120 | 0.00881 | 0.91487 | 614 | 35 | | 0.4126 | 935 | 50 | | 948 | 53 | | 0.444 | 219 | $ 554,347 | 120% |
| 67 | $ 2,200 | $ 120 | 0.00972 | 0.90598 | 569 | 32 | | 0.3862 | 875 | 46 | | 894 | 50 | | 0.418 | | $ 580,744 | 119% |
| 68 | $ 2,200 | $ 120 | 0.01073 | 0.89625 | 528 | 30 | | 0.3611 | 818 | 43 | | 844 | 47 | | 0.395 | | $ 607,142 | 118% |
| 69 | $ 2,200 | $ 120 | 0.01187 | 0.88562 | 490 | 28 | | 0.3374 | 757 | 40 | | 803 | 45 | | 0.372 | | $ 633,539 | 117% |
| 70 | $ 2,200 | $ 120 | 0.01321 | 0.87392 | 458 | 26 | | 0.3209 | 720 | 39 | | 772 | 43 | | 0.358 | | $ 659,937 | 116% |
| 70 | $ 2,200 | $ 120 | 0.01321 | 0.87392 | 427 | 24 | | 0.3049 | 684 | 37 | | 743 | 41 | | 0.344 | | $ 686,334 | 115% |

FIG. 28

30 Year Term
Static IIR - Exchange Annuities @ 65
Face Amount $1,000,000  2017 CSO
Guaranteed  Male NS

| | | | | | | Guideline Single Premium | | | | Guidel Level Premium (Level DB) | | | | | Guidel Level Premium (Increasing DB) | | | | | |
|---|---|---|---|---|---|---|---|---|---|---|---|---|---|---|---|---|---|---|---|---|
| | | | | | | Per 1000: $ 103.55 | | | | GLP/K $ 10.11 | | | | | Per 1000: $ 26.40 | | | | | Increasing DB Cumulative Guideline |
| | | | | | | 7702 Limit $ 103,552 | | | | 7702 Limit $10,107 | | | | | 7702 Limit $ 26,397 | | | | | |
| Age | Term Prm | Expenses | ANB Qx | tPx | PV Guar Mort | PV Expenses | PV Endow | Life ann | Exp DB | Expenses | PV Endow | PV Guar Mort | PV Expenses | PV Endow | Annuity | Max | Corridor |
| 71 | $ 2,200 | $ 120 | 0.01480 | 0.86098 | $ 397 | $ 22 | | 0.2893 | $ 649 | $ 35 | | $ 714 | $ 40 | | 0.331 | $ 712,731 | 113% |
| 72 | $ 2,200 | $ 120 | 0.01670 | 0.84660 | $ 369 | $ 21 | | 0.2741 | $ 615 | $ 33 | | $ 687 | $ 38 | | 0.318 | $ 739,129 | 111% |
| 73 | $ 2,200 | $ 120 | 0.01891 | 0.83060 | $ 343 | $ 19 | | 0.2591 | $ 581 | $ 31 | | $ 660 | $ 37 | | 0.306 | $ 765,526 | 109% |
| 74 | $ 2,200 | $ 120 | 0.02143 | 0.81280 | $ 317 | $ 18 | | 0.2444 | $ 548 | $ 29 | | $ 635 | $ 35 | | 0.294 | $ 791,924 | 107% |
| 75 | $ 2,200 | $ 120 | 0.02424 | 0.79309 | $ 3,335 | $ 16 | | 0.2300 | $ 5,686 | $ 28 | | $ 6,726 | $ 34 | | 0.283 | $ 818,321 | 105% |

FIG. 28 (Cont.)

30 Year Term
Dynamic IIR - Exchange Annuities @ 65
Face Amount $1,000,000
Guaranteed

| | | | MEC/CVAT/GL | | Guideline Single | | | | | MEC 7 PAY LIMIT | | | CVAT NSP AT ISSUE | |
|---|---|---|---|---|---|---|---|---|---|---|---|---|---|---|
| | | | | | | | | | | Per 1000: | 47.67 | | Per 1000: | $ 291.70 |
| | | | | | | | | | | 7702A Limit | $ 47,667 | | 7702 Limit | $ 291,704 at Issue |

| Term Age | Prm | Expenses | 2017 CSO Male NS ANB Qx | tPx | Discount Rate | IPC Factor | PV Factor | Discount Rate | IPC Factor | PV Factor | PV Guar Mort | PV Endow | 7 Pay Ann PV Guar Mort | PV Endow | Max CV/1000 |
|---|---|---|---|---|---|---|---|---|---|---|---|---|---|---|---|
| | | | | | | | | | | | $ 265,563 | $ 26,141 | $ 265,563 | $ 26,141 | |
| 45 | $ 2,200 | $ 120 | 0.00183 | 0.99817 | 6.00% | 1.02971 | 0.94340 | 6.50% | 1.03216 | 0.93897 | 1,778 | | 1,778 | $ 6.12 | $ 291,704 |
| 46 | $ 2,200 | $ 120 | 0.00191 | 0.99626 | 4.50% | 1.02233 | 0.90277 | 5.50% | 1.02725 | 0.89002 | 1,760 | | 1,760 | 1.00 | $ 307,885 |
| 47 | $ 2,200 | $ 120 | 0.00197 | 0.99430 | 4.50% | 1.02233 | 0.86390 | 5.50% | 1.02725 | 0.84362 | 1,733 | | 1,733 | 0.94 | $ 320,399 |
| 48 | $ 2,200 | $ 120 | 0.00205 | 0.99226 | 3.00% | 1.01493 | 0.83873 | 5.00% | 1.02480 | 0.80345 | 1,735 | | 1,735 | 0.90 | $ 333,460 |
| 49 | $ 2,200 | $ 120 | 0.00214 | 0.99014 | 3.00% | 1.01493 | 0.81431 | 5.00% | 1.02480 | 0.76519 | 1,755 | | 1,755 | 0.86 | $ 342,085 |
| 50 | $ 2,200 | $ 120 | 0.00225 | 0.98791 | 3.00% | 1.01493 | 0.79059 | 5.00% | 1.02480 | 0.72875 | 1,748 | | 1,748 | 0.83 | $ 350,926 |
| 51 | $ 2,200 | $ 120 | 0.00242 | 0.98552 | 3.00% | 1.01493 | 0.76756 | 5.00% | 1.02480 | 0.69405 | 1,693 | | 1,693 | 0.81 | $ 360,031 |
| 52 | $ 2,200 | $ 120 | 0.00263 | 0.98293 | 3.00% | 1.01493 | 0.74520 | 5.00% | 1.02480 | 0.66100 | 1,640 | | 1,640 | 0.78 | $ 369,494 |
| 53 | $ 2,200 | $ 120 | 0.00288 | 0.98010 | 3.00% | 1.01493 | 0.72350 | 5.00% | 1.02480 | 0.62952 | 1,588 | | 1,588 | | $ 379,343 |
| 54 | $ 2,200 | $ 120 | 0.00314 | 0.97702 | 3.00% | 1.01493 | 0.70243 | 5.00% | 1.02480 | 0.59954 | 1,537 | | 1,537 | | $ 389,613 |
| 55 | $ 2,200 | $ 120 | 0.00340 | 0.97370 | 3.00% | 1.01493 | 0.68197 | 5.00% | 1.02480 | 0.57099 | 1,488 | | 1,488 | | $ 400,325 |
| 56 | $ 2,200 | $ 120 | 0.00364 | 0.97015 | 3.00% | 1.01493 | 0.66210 | 5.00% | 1.02480 | 0.54380 | 1,439 | | 1,439 | | $ 411,501 |
| 57 | $ 2,200 | $ 120 | 0.00387 | 0.96640 | 3.00% | 1.01493 | 0.64282 | 5.00% | 1.02480 | 0.51791 | 1,392 | | 1,392 | | $ 423,154 |
| 58 | $ 2,200 | $ 120 | 0.00411 | 0.96243 | 3.00% | 1.01493 | 0.62410 | 5.00% | 1.02480 | 0.49325 | 1,347 | | 1,347 | | $ 435,300 |
| 59 | $ 2,200 | $ 120 | 0.00439 | 0.95820 | 3.00% | 1.01493 | 0.60592 | 5.00% | 1.02480 | 0.46976 | 1,302 | | 1,302 | | $ 447,968 |
| 60 | $ 2,200 | $ 120 | 0.00474 | 0.95366 | 3.00% | 1.01493 | 0.58827 | 5.00% | 1.02480 | 0.44739 | 1,259 | | 1,259 | | $ 461,198 |
| 61 | $ 2,200 | $ 120 | 0.00521 | 0.94869 | 3.00% | 1.01493 | 0.57114 | 5.00% | 1.02480 | 0.42608 | 1,216 | | 1,216 | | $ 475,053 |
| 62 | $ 2,200 | $ 120 | 0.00579 | 0.94320 | 3.00% | 1.01493 | 0.55450 | 5.00% | 1.02480 | 0.40579 | 1,175 | | 1,175 | | $ 489,623 |
| 63 | $ 2,200 | $ 120 | 0.00644 | 0.93713 | 3.00% | 1.01493 | 0.53835 | 5.00% | 1.02480 | 0.38647 | 1,134 | | 1,134 | | $ 505,003 |
| 64 | $ 2,200 | $ 120 | 0.00717 | 0.93041 | 3.00% | 1.01493 | 0.52267 | 5.00% | 1.02480 | 0.36807 | 1,094 | | 1,094 | | $ 521,277 |
| 65 | $ 2,200 | $ 120 | 0.00796 | 0.92300 | 5.00% | 1.02480 | 0.49778 | 6.00% | 1.02971 | 0.34723 | 1,044 | | 1,044 | | $ 538,544 |

FIG. 29

30 Year Term
Dynamic IIR - Exchange Annuities @ 65
Face Amount $1,000,000
Guaranteed

| | | | 2017 CSO Male NS | | | | MEC/CVAT/GL | | Guideline Single | | | MEC 7 PAY LIMIT | | CVAT NSP AT ISSUE | |
|---|---|---|---|---|---|---|---|---|---|---|---|---|---|---|---|
| | | | | | | | | | | | | Per 1000: 47.67 | | Per 1000: $291.70 | |
| | | | | | | | | | | | | 7702A Limit $47,667 | | 7702 Limit $291,704 at issue | |
| Term Age | Prm | Expenses | ANB Qx | tPx | Discount Rate | IPC Factor | PV Factor | Discount Rate | IPC Factor | PV Factor | PV Guar Mort | PV Endow | 7 Pay Ann PV Guar Mort | PV Endow | Max CV/1000 |
| 66 | $2,200 | 120 | 0.00881 | 0.91487 | 5.00% | 1.02480 | 0.47408 | 6.00% | 1.02971 | 0.32758 | $ 987 | | $ 987 | | $ 567.736 |
| 67 | $2,200 | 120 | 0.00972 | 0.90598 | 5.00% | 1.02480 | 0.45150 | 6.00% | 1.02971 | 0.30904 | $ 931 | | $ 931 | | $ 599.147 |
| 68 | $2,200 | 120 | 0.01073 | 0.89625 | 2.00% | 1.00997 | 0.44265 | 4.00% | 1.01987 | 0.29715 | $ 891 | | $ 891 | | $ 633.092 |
| 69 | $2,200 | 120 | 0.01187 | 0.88562 | 2.00% | 1.00997 | 0.43397 | 4.00% | 1.01987 | 0.28572 | $ 864 | | $ 864 | | $ 650.419 |
| 70 | $2,200 | 120 | 0.01321 | 0.87392 | 2.00% | 1.00997 | 0.42546 | 4.00% | 1.01987 | 0.27473 | $ 837 | | $ 837 | | $ 669.148 |
| 71 | $2,200 | 120 | 0.01480 | 0.86098 | 2.00% | 1.00997 | 0.41712 | 4.00% | 1.01987 | 0.26417 | $ 810 | | $ 810 | | $ 689.417 |
| 72 | $2,200 | 120 | 0.01670 | 0.84660 | 2.00% | 1.00997 | 0.40894 | 4.00% | 1.01987 | 0.25401 | $ 782 | | $ 782 | | $ 711.513 |
| 73 | $2,200 | 120 | 0.01891 | 0.83060 | 2.00% | 1.00997 | 0.40092 | 4.00% | 1.01987 | 0.24424 | $ 754 | | $ 754 | | $ 735.810 |
| 74 | $2,200 | 120 | 0.02143 | 0.81280 | 2.00% | 1.00997 | 0.39306 | 4.00% | 1.01987 | 0.23484 | $ 725 | | $ 725 | | $ 762.727 |
| 75 | $ | 120 | 0.02424 | 0.79309 | 2.00% | 1.00997 | 0.38535 | 4.00% | 1.01987 | 0.22581 | $ 7,668 | | $ 7,668 | | $ 792.749 |

FIG. 29 (Cont.)

30 Year Term
Dynamic IIR - Exchange

| | Guideline Single Premium | | Guidel Level Premium (Level DB) | | Guidel Level Premium (Increasing DB) | |
|---|---|---|---|---|---|---|
| | Per 1000: 7702 Limit | $ 156.77 $ 156,769 | GLP/K 7702 Limit | $ 13.82 $ 13,816 | Per 1000: 7702 Limit | $ 41.31 $ 41,321 |

Face Amount $1,000,000
Guaranteed

| Age | Term Prm | Expenses | PV Guar Mort | PV Expenses | PV Endow | Life Ann | Exp DB | Expenses | PV Endow | PV Guar Mort | PV Expense | PV Endow | Annuity | Increasing DB Cumulative Guideline Max Corridor |
|---|---|---|---|---|---|---|---|---|---|---|---|---|---|---|
| | | | $ 143,112 | $ 3,066 | $ 10,592 | $ 21.71 | $ 271,260 | $ 2,606 | $ 26,141 | $ 628,621 | $ 4,102 | $ 264,519 | $ 25.59 | |
| 45 | $ 2,200 | $ 120 | $ 1,774 | $ 490 | | 1.0000 | $ 1,778 | $ 120 | | $ 1,778 | $ 490 | | 1.00 | $ 156,769 215% |
| 46 | $ 2,200 | $ 120 | $ 1,743 | $ 384 | | 0.9417 | $ 1,839 | $ 113 | | $ 1,763 | $ 387 | | 0.943 | $ 156,769 209% |
| 47 | $ 2,200 | $ 120 | $ 1,701 | $ 310 | | 0.8994 | $ 1,811 | $ 108 | | $ 1,740 | $ 316 | | 0.903 | $ 156,769 203% |
| 48 | $ 2,200 | $ 120 | $ 1,678 | $ 226 | | 0.8590 | $ 1,787 | $ 103 | | $ 1,745 | $ 233 | | 0.864 | $ 165,284 197% |
| 49 | $ 2,200 | $ 120 | $ 1,665 | $ 144 | | 0.8322 | $ 1,808 | $ 100 | | $ 1,769 | $ 151 | | 0.839 | $ 206,605 191% |
| 50 | $ 2,200 | $ 120 | $ 1,627 | $ 91 | | 0.8063 | $ 1,800 | $ 97 | | $ 1,765 | $ 98 | | 0.814 | $ 247,926 185% |
| 51 | $ 2,200 | $ 120 | $ 1,546 | $ 86 | | 0.7810 | $ 1,744 | $ 94 | | $ 1,714 | $ 95 | | 0.791 | $ 289,246 178% |
| 52 | $ 2,200 | $ 120 | $ 1,469 | $ 82 | | 0.7564 | $ 1,689 | $ 91 | | $ 1,664 | $ 92 | | 0.768 | $ 330,567 171% |
| 53 | $ 2,200 | $ 120 | $ 1,395 | $ 78 | | 0.7325 | $ 1,636 | $ 88 | | $ 1,615 | $ 89 | | 0.745 | $ 371,888 164% |
| 54 | $ 2,200 | $ 120 | $ 1,325 | $ 74 | | 0.7091 | $ 1,583 | $ 85 | | $ 1,568 | $ 87 | | 0.723 | $ 413,209 157% |
| 55 | $ 2,200 | $ 120 | $ 1,258 | $ 70 | | 0.6863 | $ 1,532 | $ 82 | | $ 1,523 | $ 84 | | 0.702 | $ 454,530 150% |
| 56 | $ 2,200 | $ 120 | $ 1,194 | $ 67 | | 0.6640 | $ 1,483 | $ 80 | | $ 1,478 | $ 82 | | 0.682 | $ 495,851 146% |
| 57 | $ 2,200 | $ 120 | $ 1,133 | $ 63 | | 0.6423 | $ 1,434 | $ 77 | | $ 1,435 | $ 79 | | 0.662 | $ 537,172 142% |
| 58 | $ 2,200 | $ 120 | $ 1,075 | $ 60 | | 0.6212 | $ 1,387 | $ 75 | | $ 1,394 | $ 77 | | 0.643 | $ 578,493 138% |
| 59 | $ 2,200 | $ 120 | $ 1,019 | $ 57 | | 0.6006 | $ 1,341 | $ 72 | | $ 1,353 | $ 75 | | 0.624 | $ 619,814 134% |
| 60 | $ 2,200 | $ 120 | $ 967 | $ 54 | | 0.5806 | $ 1,296 | $ 70 | | $ 1,314 | $ 73 | | 0.606 | $ 661,135 130% |
| 61 | $ 2,200 | $ 120 | $ 916 | $ 51 | | 0.5610 | $ 1,253 | $ 67 | | $ 1,275 | $ 71 | | 0.588 | $ 702,456 128% |
| 62 | $ 2,200 | $ 120 | $ 868 | $ 49 | | 0.5418 | $ 1,210 | $ 65 | | $ 1,238 | $ 69 | | 0.571 | $ 743,777 126% |
| 63 | $ 2,200 | $ 120 | $ 822 | $ 46 | | 0.5230 | $ 1,168 | $ 63 | | $ 1,202 | $ 67 | | 0.555 | $ 785,098 124% |
| 64 | $ 2,200 | $ 120 | $ 778 | $ 43 | | 0.5045 | $ 1,126 | $ 61 | | $ 1,167 | $ 65 | | 0.538 | $ 826,419 122% |
| 65 | $ 2,200 | $ 120 | $ 732 | $ 41 | | 0.4863 | $ 1,096 | $ 58 | | $ 1,122 | $ 63 | | 0.523 | $ 867,739 120% |

FIG. 30

30 Year Term
Dynamic IIR - Exchange | Guideline Single Premium | | Guidel Level Premium (Level DB) | | Guidel Level Premium (Increasing DB) | |
| --- | --- | --- | --- |
| | Per 1000: $ 156.77 | GLP/K $ 13.82 | Per 1000: $ 41.31 |
| | 7702 Limit 156,769 | 7702 Limit 13,816 | 7702 Limit 41,321 |

Face Amount $1,000,000
Guaranteed

| Age | Term Prm | Expenses | PV Guar Mort | PV Expenses | PV Endow | Life Ann | Exp DB | Expenses | PV Endow | PV Guar Mort | PV Expense | PV Endow | Increasing DB Cumulative Guideline Annuity | Max Corridor |
|---|---|---|---|---|---|---|---|---|---|---|---|---|---|---|
| 66 | $ 2,200 | $ 120 | $ 685 | $ 38 | | 0.4595 | $ 1,036 | $ 55 | | $ 1,069 | $ 60 | | 0.498 $ 909,060 | 119% |
| 67 | $ 2,200 | $ 120 | $ 640 | $ 36 | | 0.4337 | $ 978 | $ 52 | | $ 1,018 | $ 57 | | 0.474 $ 950,381 | 118% |
| 68 | $ 2,200 | $ 120 | $ 604 | $ 34 | | 0.4091 | $ 909 | $ 49 | | $ 984 | $ 54 | | 0.452 $ 991,702 | 117% |
| 69 | $ 2,200 | $ 120 | $ 575 | $ 32 | | 0.3967 | $ 881 | $ 48 | | $ 964 | $ 53 | | 0.443 $1,033,023 | 116% |
| 70 | $ 2,200 | $ 120 | $ 546 | $ 30 | | 0.3843 | $ 854 | $ 46 | | $ 945 | $ 52 | | 0.434 $1,074,344 | 115% |
| 71 | $ 2,200 | $ 120 | $ 518 | $ 29 | | 0.3718 | $ 826 | $ 45 | | $ 927 | $ 51 | | 0.425 $1,115,665 | 113% |
| 72 | $ 2,200 | $ 120 | $ 491 | $ 27 | | 0.3591 | $ 798 | $ 43 | | $ 909 | $ 50 | | 0.417 $1,156,986 | 111% |
| 73 | $ 2,200 | $ 120 | $ 464 | $ 26 | | 0.3462 | $ 769 | $ 42 | | $ 891 | $ 49 | | 0.409 $1,198,307 | 109% |
| 74 | $ 2,200 | $ 120 | $ 438 | $ 24 | | 0.3330 | $ 740 | $ 40 | | $ 873 | $ 48 | | 0.401 $1,239,628 | 107% |
| 75 | | $ 120 | $ 4,537 | $ 13 | | 0.3195 | $ 7,821 | $ 38 | | $ 9,434 | $ 47 | | 0.393 $1,280,949 | 105% |

FIG. 30 (Cont.)

Yearly Renewal Term Policy - Purchase Age 60
Static IR Method - Exchange Annuities @ 65

| | | MEC/CVAT/GL | | | Guideline Single | | | | MEC 7 PAY LIMIT | | CVAT NSP AT ISSUE | |
|---|---|---|---|---|---|---|---|---|---|---|---|---|
| | | | | | | | | | Per 1000: 66.45 | | Per 1000: $408.21 | |
| | | | | | | | | | 7702A Limit $33,227 | | 7702 Limit $204,106 at issue | |

Face Amount $500,000

| Age | Expenses | Male NS ANB Qx | tPx | Discount Rate | IPC Factor | PV Factor | Discount Rate | IPC Factor | PV Factor | PV Guar Mort | PV Endow | 7 Pay Ann | PV Guar Mort | PV Endow | Max CV/1000 |
|---|---|---|---|---|---|---|---|---|---|---|---|---|---|---|---|
| 60 | $ 120 | 0.00474 | 0.99526 | 4.00% | 1.01987 | 0.96154 | 6.00% | 1.02971 | 0.94340 | $ 191,038 | $ 13,068 | 6.14 | $ 191,038 | $ 13,068 | |
| 61 | $ 120 | 0.00521 | 0.99007 | 4.00% | 1.01987 | 0.92456 | 6.00% | 1.02971 | 0.89000 | 2,324 | | 1.00 | 2,324 | | $ 204.106 |
| 62 | $ 120 | 0.00579 | 0.98434 | 4.00% | 1.01987 | 0.88900 | 6.00% | 1.02971 | 0.83962 | 2,445 | | 0.96 | 2,445 | | $ 210.852 |
| 63 | $ 120 | 0.00644 | 0.97800 | 4.00% | 1.01987 | 0.85480 | 6.00% | 1.02971 | 0.79209 | 2,599 | | 0.92 | 2,599 | | $ 217.764 |
| 64 | $ 120 | 0.00717 | 0.97099 | 4.00% | 1.01987 | 0.82193 | 6.00% | 1.02971 | 0.74726 | 2,763 | | 0.88 | 2,763 | | $ 224.824 |
| 65 | $ 120 | 0.00796 | 0.96326 | 4.00% | 1.01987 | 0.79031 | 6.00% | 1.02971 | 0.70496 | 2,939 | | 0.84 | 2,939 | | $ 232.027 |
| | | | | | | | | | | 3,115 | | 0.80 | 3,115 | | $ 239.368 |
| 66 | $ 120 | 0.00881 | 0.95478 | 4.00% | 1.01987 | 0.75992 | 6.00% | 1.02971 | 0.66506 | 3,289 | | 0.76 | 3,289 | | $ 246.849 |
| 67 | $ 120 | 0.00972 | 0.94549 | 4.00% | 1.01987 | 0.73069 | 6.00% | 1.02971 | 0.62741 | 3,458 | | | 3,458 | | $ 254.472 |
| 68 | $ 120 | 0.01073 | 0.93535 | 4.00% | 1.01987 | 0.70259 | 6.00% | 1.02971 | 0.59190 | 3,635 | | | 3,635 | | $ 262.244 |
| 69 | $ 120 | 0.01187 | 0.92425 | 4.00% | 1.01987 | 0.67556 | 6.00% | 1.02971 | 0.55839 | 3,825 | | | 3,825 | | $ 270.161 |
| 70 | $ 120 | 0.01321 | 0.91204 | 4.00% | 1.01987 | 0.64958 | 6.00% | 1.02971 | 0.52679 | 4,044 | | | 4,044 | | $ 278.216 |
| 71 | $ 120 | 0.01480 | 0.89854 | 4.00% | 1.01987 | 0.62460 | 6.00% | 1.02971 | 0.49697 | 4,299 | | | 4,299 | | $ 286.392 |
| 72 | $ 120 | 0.01670 | 0.88353 | 4.00% | 1.01987 | 0.60057 | 6.00% | 1.02971 | 0.46884 | 4,596 | | | 4,596 | | $ 294.662 |
| 73 | $ 120 | 0.01891 | 0.86683 | 4.00% | 1.01987 | 0.57748 | 6.00% | 1.02971 | 0.44230 | 4,920 | | | 4,920 | | $ 302.992 |
| 74 | $ 120 | 0.02143 | 0.84825 | 4.00% | 1.01987 | 0.55526 | 6.00% | 1.02971 | 0.41727 | 5,260 | | | 5,260 | | $ 311.357 |
| 75 | $ 120 | 0.02424 | 0.82769 | 4.00% | 1.01987 | 0.53391 | 6.00% | 1.02971 | 0.39365 | 5,598 | | | 5,598 | | $ 319.735 |
| 76 | $ 120 | 0.02732 | 0.80508 | 4.00% | 1.01987 | 0.51337 | 6.00% | 1.02971 | 0.37136 | 5,920 | | | 5,920 | | $ 328.117 |
| 77 | $ 120 | 0.03071 | 0.78035 | 4.00% | 1.01987 | 0.49363 | 6.00% | 1.02971 | 0.35034 | 6,223 | | | 6,223 | | $ 336.504 |
| 78 | $ 120 | 0.03446 | 0.75346 | 4.00% | 1.01987 | 0.47464 | 6.00% | 1.02971 | 0.33051 | 6,509 | | | 6,509 | | $ 344.896 |
| 79 | $ 120 | 0.03874 | 0.72427 | 4.00% | 1.01987 | 0.45639 | 6.00% | 1.02971 | 0.31180 | 6,793 | | | 6,793 | | $ 353.294 |
| 80 | $ 120 | 0.04368 | 0.69264 | 4.00% | 1.01987 | 0.43883 | 6.00% | 1.02971 | 0.29416 | 7,079 | | | 7,079 | | $ 361.682 |

FIG. 31

Yearly Renewal Term Policy - Purchase Age 60
Static IIR Method - Exchange Annuities @ 65

| | | | | | | | MEC/CVAT/GL | | | | | Guideline Single | | MEC 7 PAY LIMIT | | CVAT NSP AT ISSUE | |
|---|---|---|---|---|---|---|---|---|---|---|---|---|---|---|---|---|---|
| 223 | Face Amount<br>$ 500,000 | 2017 CSO<br>Male NS | | | Discount<br>Rate | IPC<br>Factor | PV<br>Factor | | Discount<br>Rate | IPC<br>Factor | PV<br>Factor | | | Per 1000:<br>7702A Limit | 66.45<br>$ 33,227 | Per 1000:<br>7702 Limit | $ 408.21<br>$ 204,106 at issue |
| Age | Expenses | ANB | Qx | tPx | | | | PV Guar Mort | | | | PV Endow | 7 Pay Ann | PV Guar Mort | PV Endow | | Max CV/1000 |
| 81 | $ | 120 | 0.04946 | 0.65838 | 4.00% | 1.01987 | 0.42196 | | 6.00% | 1.02971 | 0.27751 | | | $ 7,371 | | $ | 370,039 |
| 82 | $ | 120 | 0.05593 | 0.62156 | 4.00% | 1.01987 | 0.40573 | | 6.00% | 1.02971 | 0.26180 | | | $ 7,618 | | $ | 378,331 |
| 83 | $ | 120 | 0.06346 | 0.58211 | 4.00% | 1.01987 | 0.39012 | | 6.00% | 1.02971 | 0.24698 | | | $ 7,847 | | $ | 386,564 |
| 84 | $ | 120 | 0.07219 | 0.54009 | 4.00% | 1.01987 | 0.37512 | | 6.00% | 1.02971 | 0.23300 | | | $ 8,038 | | $ | 394,715 |
| 85 | $ | 120 | 0.08234 | 0.49562 | 4.00% | 1.01987 | 0.36069 | | 6.00% | 1.02971 | 0.21981 | | | $ 8,179 | | $ | 402,767 |

223B arrows point to IPC Factor / PV Factor columns

FIG. 31 (Cont.)

Yearly Ren Static IIR - Exchange

Face Amount $500,000

| Age | Expenses | Guideline Single Premium Per 1000: $279.96 / 7702 Limit $139,978 PV Guar Mort | PV Expenses | PV Endow | Guidel Level Premium (Level DB) GLP/K $15.58 / 7702 Limit $6,709 Life Ann | Exp DB | Expenses | PV Endow | Guidel Level Premium (Increasing DB) Per 1000: $65.45 / 7702 Limit $32,726 PV Guar Mort | PV Expense | PV Endow | Increasing DB Cumulative Guideline Annuity | Max Corridor | |
|---|---|---|---|---|---|---|---|---|---|---|---|---|---|---|
| | | | | $ 1,549 | | | | $ 6,709 | $ 380,838 | $ 2,329 | $ 126,708 | $ 19.41 | | |
| 60 | $ 120 | $ 131,720 | | | $ 1.0000 | $ 2,324 | $ 120 | $ 198,586 | $ 2,324 | $ 120 | | 1.00 | $ 139,978 | 130% |
| 61 | $ 120 | $ 2,302 | $ 120 | | 0.9570 | 2,542 | 115 | | 2,456 | 115 | | 0.962 | $ 139,978 | 128% |
| 62 | $ 120 | $ 2,376 | 113 | | 0.9154 | 2,703 | 110 | | 2,625 | 111 | | 0.925 | $ 139,978 | 126% |
| 63 | $ 120 | $ 2,478 | 106 | | 0.8751 | 2,874 | 105 | | 2,807 | 107 | | 0.889 | $ 139,978 | 124% |
| 64 | $ 120 | $ 2,585 | 99 | | 0.8360 | 3,057 | 100 | | 3,005 | 103 | | 0.855 | $ 163,631 | 122% |
| 65 | $ 120 | $ 2,698 | 93 | | 0.7981 | 3,239 | 96 | | 3,208 | 99 | | 0.822 | $ 196,357 | 120% |
| 66 | $ 120 | $ 2,805 | 87 | | 0.7613 | 3,420 | 91 | | 3,414 | 95 | | 0.790 | $ 229,083 | 119% |
| 67 | $ 120 | $ 2,906 | 81 | | 0.7256 | 3,596 | 87 | | 3,622 | 91 | | 0.760 | $ 261,809 | 118% |
| 68 | $ 120 | $ 2,998 | 76 | | 0.6909 | 3,780 | 83 | | 3,844 | 88 | | 0.731 | $ 294,535 | 117% |
| 69 | $ 120 | $ 3,092 | 71 | | 0.6572 | 3,978 | 79 | | 4,089 | 84 | | 0.703 | $ 327,262 | 116% |
| 70 | $ 120 | $ 3,192 | 66 | | 0.6244 | 4,206 | 75 | | 4,376 | 81 | | 0.676 | $ 359,988 | 115% |
| 71 | $ 120 | $ 3,311 | 62 | | 0.5924 | 4,471 | 71 | | 4,714 | 78 | | 0.650 | $ 392,714 | 113% |
| 72 | $ 120 | $ 3,454 | 58 | | 0.5612 | 4,779 | 67 | | 5,114 | 75 | | 0.625 | $ 425,440 | 111% |
| 73 | $ 120 | $ 3,622 | 54 | | 0.5306 | 5,117 | 64 | | 5,569 | 72 | | 0.601 | $ 458,166 | 109% |
| 74 | $ 120 | $ 3,805 | 50 | | 0.5006 | 5,470 | 60 | | 6,068 | 69 | | 0.577 | $ 490,892 | 107% |
| 75 | $ 120 | $ 3,991 | 46 | | 0.4710 | 5,822 | 57 | | 6,600 | 67 | | 0.555 | $ 523,618 | 105% |
| 76 | $ 120 | $ 4,167 | 42 | | 0.4419 | 6,156 | 53 | | 7,152 | 64 | | 0.534 | $ 556,345 | 105% |
| 77 | $ 120 | $ 4,323 | 39 | | 0.4133 | 6,472 | 50 | | 7,730 | 62 | | 0.513 | $ 589,071 | 105% |
| 78 | $ 120 | $ 4,460 | 36 | | 0.3852 | 6,769 | 46 | | 8,341 | 59 | | 0.494 | $ 621,797 | 105% |
| 79 | $ 120 | $ 4,576 | 33 | | 0.3576 | 7,065 | 43 | | 9,016 | 57 | | 0.475 | $ 654,523 | 105% |
| 80 | $ 120 | $ 4,686 | 30 | | 0.3305 | 7,363 | 40 | | 9,775 | 55 | | 0.456 | $ 687,249 | 105% |
| | | $ 4,791 | 27 | | | | | | | | | | | |

FIG. 32

Yearly Ren
Static IIR - Exchange

| | | Guideline Single Premium | | | Guidel Level Premium (Level DB) | | | Guidel Level Premium (Increasing DB) | | | | Increasing DB Cumulative Guideline | |
|---|---|---|---|---|---|---|---|---|---|---|---|---|---|
| Face Amount $500,000 | | Per 1000: 7702 Limit | $ 279.96 $ 139,978 | | GLP/K 7702 Limit | $ 27.41 $ 13,705 | | Per 1000: 7702 Limit | $ 65.45 $ 32,726 | | | | |
| | | PV Expenses | | | Life Ann | Expenses | | | PV Guar Mort | PV Expense | | | |
| Age | Expenses | PV Guar Mort | | PV Endow | GLP/K | Exp DB | Expenses | PV Endow | | | | Annuity | Max Corridor |
| 81 | $ 120 | $ 4,895 | $ 24 | | 0.3040 | $ 7,666 | $ 36 | | $ 10,642 | $ 53 | | 0.439 | $ 719,975 | 105% |
| 82 | $ 120 | $ 4,963 | $ 22 | | 0.2778 | $ 7,923 | $ 33 | | $ 11,572 | $ 51 | | 0.422 | $ 752,702 | 105% |
| 83 | $ 120 | $ 5,016 | $ 20 | | 0.2522 | $ 8,161 | $ 30 | | $ 12,625 | $ 49 | | 0.406 | $ 785,428 | 105% |
| 84 | $ 120 | $ 5,041 | $ 17 | | 0.2271 | $ 8,360 | $ 27 | | $ 13,809 | $ 47 | | 0.390 | $ 818,154 | 105% |
| 85 | $ 120 | $ 5,033 | $ 15 | | 0.2026 | $ 8,507 | $ 24 | | $ 15,145 | $ 45 | | 0.375 | $ 850,880 | 105% |

Yearly Renewal Term Policy
Dynamic IIR Method - Exchange Annuities @ 65

| | | | | MEC/CVAT/GL | | | | Guideline Single | | | | MEC 7 PAY LIMIT | | CVAT NSP AT ISSUE | |
|---|---|---|---|---|---|---|---|---|---|---|---|---|---|---|---|
| Face Amount | 2017 CSO | | | | | | | | | | | Per 1000: | 87.41 | Per 1000: | $550.55 |
| $500,000 | Male NS | | | | | | | | | | | 7702A Limit | $43,707 | 7702 Limit | $275,276 at issue |
| Expenses | ANB | Qx | tPx | Discount Rate | IPC Factor | PV Factor | Discount Rate | IPC Factor | PV Factor | PV Guar Mort | PV Endow | 7 Pay Ann | PV Guar Mort | PV Endow | Max CV/1000 |
| Age | | | | | | | | | | | | | | | |
| 60 | 120 | 0.00474 | 0.99526 | 3.00% | 1.01493 | 0.97087 | 5.00% | 1.02480 | 0.95238 | $252,764 | $22,512 | 6.30 | $252,764 | $22,512 | $275,276 |
| 61 | 120 | 0.00521 | 0.99007 | 3.00% | 1.01493 | 0.94260 | 5.00% | 1.02480 | 0.90703 | 2,335 | | 1.00 | 2,335 | | 282,468 |
| 62 | 120 | 0.00579 | 0.98434 | 3.00% | 1.01493 | 0.91514 | 5.00% | 1.02480 | 0.86384 | 2,480 | | 0.97 | 2,480 | | 289,808 |
| 63 | 120 | 0.00644 | 0.97800 | 3.00% | 1.01493 | 0.88849 | 5.00% | 1.02480 | 0.82270 | 2,662 | | 0.93 | 2,662 | | 297,808 |
| 64 | 120 | 0.00717 | 0.97099 | 3.00% | 1.01493 | 0.86261 | 5.00% | 1.02480 | 0.78353 | 2,858 | | 0.90 | 2,858 | | 304,899 |
| 65 | 120 | 0.00796 | 0.96326 | 5.00% | 1.02480 | 0.82153 | 6.00% | 1.02971 | 0.73918 | 3,254 | | 0.87 | 3,070 | | 312,649 |
| 66 | 120 | 0.00881 | 0.95478 | 5.00% | 1.02480 | 0.78241 | 6.00% | 1.02971 | 0.69734 | 3,402 | | 0.84 | 3,254 | | 326,805 |
| 67 | 120 | 0.00972 | 0.94549 | 5.00% | 1.02480 | 0.74515 | 6.00% | 1.02971 | 0.65786 | 3,543 | | 0.79 | 3,402 | | 341,640 |
| 68 | 120 | 0.01073 | 0.93535 | 2.00% | 1.00997 | 0.73054 | 4.00% | 1.01987 | 0.63256 | 3,743 | | | 3,543 | | 357,214 |
| 69 | 120 | 0.01187 | 0.92425 | 2.00% | 1.00997 | 0.71622 | 4.00% | 1.01987 | 0.60823 | 4,016 | | | 3,743 | | 362,833 |
| 70 | 120 | 0.01321 | 0.91204 | 2.00% | 1.00997 | 0.70218 | 4.00% | 1.01987 | 0.58484 | 4,329 | | | 4,016 | | 368,469 |
| 71 | 120 | 0.01480 | 0.89854 | 2.00% | 1.00997 | 0.68841 | 4.00% | 1.01987 | 0.56234 | 4,692 | | | 4,329 | | 374,110 |
| 72 | 120 | 0.01670 | 0.88353 | 2.00% | 1.00997 | 0.67491 | 4.00% | 1.01987 | 0.54072 | 5,114 | | | 4,692 | | 379,738 |
| 73 | 120 | 0.01891 | 0.86683 | 2.00% | 1.00997 | 0.66168 | 4.00% | 1.01987 | 0.51992 | 5,583 | | | 5,114 | | 385,335 |
| 74 | 120 | 0.02143 | 0.84825 | 2.00% | 1.00997 | 0.64870 | 4.00% | 1.01987 | 0.49992 | 6,085 | | | 5,583 | | 390,884 |
| 75 | 120 | 0.02424 | 0.82769 | 2.00% | 1.00997 | 0.63598 | 4.00% | 1.01987 | 0.48069 | 6,604 | | | 6,085 | | 396,374 |
| 76 | 120 | 0.02732 | 0.80508 | 2.00% | 1.00997 | 0.62351 | 4.00% | 1.01987 | 0.46221 | 7,120 | | | 6,604 | | 401,801 |
| 77 | 120 | 0.03071 | 0.78035 | 2.00% | 1.00997 | 0.61129 | 4.00% | 1.01987 | 0.44443 | 7,632 | | | 7,120 | | 407,164 |
| 78 | 120 | 0.03446 | 0.75346 | 2.00% | 1.00997 | 0.59930 | 4.00% | 1.01987 | 0.42734 | 8,138 | | | 7,632 | | 412,466 |
| 79 | 120 | 0.03874 | 0.72427 | 2.00% | 1.00997 | 0.58755 | 4.00% | 1.01987 | 0.41090 | 8,660 | | | 8,138 | | 417,708 |
| 80 | 120 | 0.04368 | 0.69264 | 2.00% | 1.00997 | 0.57603 | 4.00% | 1.01987 | 0.39510 | 9,202 | | | 8,660 | | 422,882 |

Yearly Renewal Term Policy
Dynamic IIR Method - Exchange Annuities @ 65

| | | | | | MEC/CVAT/GL | | | | Guideline Single | | | MEC 7 PAY LIMIT | | CVAT NSP AT ISSUE | |
|---|---|---|---|---|---|---|---|---|---|---|---|---|---|---|---|
| Face Amount 500,000 | | Male NS 2017 CSO | | | Discount Rate | IPC Factor | PV Factor | Discount Rate | IPC Factor | PV Factor | PV Guar Mort | Per 1000: 7702A Limit | 87.41 $43,707 | Per 1000: 7702 Limit | $ 550.55 $275,276 at issue |
| Age | $ Expenses | ANB Qx | tPx | | | | | | | | PV Endow | 7 Pay Ann PV Guar Mort | PV Endow | Max CV/1000 |
| 81 | $ | 120 | 0.04946 | 0.65838 | 2.00% | 1.00997 | 0.56473 | 4.00% | 1.01987 | 0.37990 | $ 9,770 | | $ 9,770 | $ 427,976 |
| 82 | $ | 120 | 0.05593 | 0.62156 | 2.00% | 1.00997 | 0.55366 | 4.00% | 1.01987 | 0.36529 | $ 10,295 | | $ 10,295 | $ 432,973 |
| 83 | $ | 120 | 0.06346 | 0.58211 | 2.00% | 1.00997 | 0.54280 | 4.00% | 1.01987 | 0.35124 | $ 10,812 | | $ 10,812 | $ 437,880 |
| 84 | $ | 120 | 0.07219 | 0.54009 | 2.00% | 1.00997 | 0.53216 | 4.00% | 1.01987 | 0.33773 | $ 11,293 | | $ 11,293 | $ 442,664 |
| 85 | $ | 120 | 0.08234 | 0.49562 | 2.00% | 1.00997 | 0.52173 | 4.00% | 1.01987 | 0.32474 | $ 11,716 | | $ 11,716 | $ 447,379 |

FIG. 33 (Cont.)

| Age | Yearly Ren Dynamic IIR. Face Amount $500,000 Expenses | Guideline Single Premium Per 1000: 7702 Limit $ 373.47 / 186,735 PV Guar Mort | PV Expenses | PV Endow | Guidel Level Premium (Level DB) GLP/K 7702 Limit $ 17.54 Life Ann | Exp DB | Expenses | PV Endow | Guidel Level Premium (Increasing DB) Per 1000: 7702 Limit $ 87.57 / 43,785 PV Guar Mort | PV Expense | PV Endow | Increasing DB Cumulative Guideline Annuity | Max Corridor |
|---|---|---|---|---|---|---|---|---|---|---|---|---|---|
| | | | | $ 11,766 | $ 17.54 | $ 258,189 | $ 2,104 | $ 22,512 | $ 546,823 | $ 2,751 | $ 218,279 | $ 22.92 | |
| 60 | $ 120 | $ 173,231 | $ 1,738 | | 1.0000 | $ 2,335 | 120 | | $ 2,335 | 120 | | 1.00 | $ 186,735 130% |
| 61 | $ 120 | $ 2,313 | 114 | | 0.9663 | 2,555 | 116 | | 2,492 | 117 | | 0.971 | $ 186,735 128% |
| 62 | $ 120 | $ 2,410 | 108 | | 0.9332 | 2,742 | 112 | | 2,689 | 113 | | 0.943 | $ 186,735 126% |
| 63 | $ 120 | $ 2,537 | 102 | | 0.9008 | 2,944 | 108 | | 2,904 | 110 | | 0.915 | $ 186,735 124% |
| 64 | $ 120 | $ 2,672 | 97 | | 0.8689 | 3,162 | 104 | | 3,139 | 107 | | 0.888 | $ 218,924 122% |
| 65 | $ 120 | $ 2,815 | 91 | | 0.8376 | 3,416 | 101 | | 3,351 | 104 | | 0.863 | $ 262,709 120% |
| 66 | $ 120 | $ 2,941 | 85 | | 0.7914 | 3,572 | 95 | | 3,532 | 99 | | 0.822 | $ 306,494 119% |
| 67 | $ 120 | $ 3,047 | 80 | | 0.7470 | 3,721 | 90 | | 3,711 | 94 | | 0.782 | $ 350,279 118% |
| 68 | $ 120 | $ 3,143 | 75 | | 0.7045 | 3,818 | 85 | | 3,958 | 89 | | 0.745 | $ 394,064 117% |
| 69 | $ 120 | $ 3,272 | 71 | | 0.6833 | 4,096 | 82 | | 4,293 | 88 | | 0.731 | $ 437,849 116% |
| 70 | $ 120 | $ 3,444 | 67 | | 0.6620 | 4,416 | 79 | | 4,684 | 86 | | 0.716 | $ 481,633 115% |
| 71 | $ 120 | $ 3,641 | 64 | | 0.6404 | 4,786 | 77 | | 5,145 | 84 | | 0.702 | $ 525,418 113% |
| 72 | $ 120 | $ 3,871 | 61 | | 0.6186 | 5,216 | 74 | | 5,692 | 83 | | 0.688 | $ 569,203 111% |
| 73 | $ 120 | $ 4,137 | 57 | | 0.5963 | 5,694 | 72 | | 6,318 | 81 | | 0.675 | $ 612,988 109% |
| 74 | $ 120 | $ 4,430 | 54 | | 0.5736 | 6,207 | 69 | | 7,020 | 79 | | 0.662 | $ 656,773 107% |
| 75 | $ 120 | $ 4,736 | 51 | | 0.5503 | 6,736 | 66 | | 7,785 | 78 | | 0.649 | $ 700,558 105% |
| 76 | $ 120 | $ 5,040 | 48 | | 0.5264 | 7,262 | 63 | | 8,602 | 76 | | 0.636 | $ 744,342 105% |
| 77 | $ 120 | $ 5,330 | 45 | | 0.5020 | 7,785 | 60 | | 9,480 | 75 | | 0.624 | $ 788,127 105% |
| 78 | $ 120 | $ 5,603 | 42 | | 0.4770 | 8,301 | 57 | | 10,429 | 73 | | 0.611 | $ 831,912 105% |
| 79 | $ 120 | $ 5,860 | 39 | | 0.4515 | 8,834 | 54 | | 11,494 | 72 | | 0.599 | $ 875,697 105% |
| 80 | $ 120 | $ 6,116 | 36 | | 0.4255 | 9,387 | 51 | | 12,706 | 71 | | 0.588 | $ 919,482 105% |
| | | $ 6,374 | | | | | | | | | | | |

FIG. 34

| Yearly Ren Dynamic IIR- | Guideline Single Premium | | | Guidel Level Premium (Level DB) | | | Guidel Level Premium (Increasing DB) | | | Increasing DB Cumulative Guideline | | |
|---|---|---|---|---|---|---|---|---|---|---|---|---|
| | Per 1000: $ 373.47 | | | GLP/K $ 32.25 | | | Per 1000: $ 87.57 | | | | | |
| | 7702 Limit $ 186,735 | | | 7702 Limit $ 16,126 | | | 7702 Limit $ 43,785 | | | | | |
| Face Amount $ 500,000 | | PV Expenses | | Life Ann | Expenses | | | PV Guar Mort | PV Expense | | | |
| Age | Expenses | PV Guar Mort | PV Endow | | Exp DB | Expenses | PV Endow | | | Annuity | Max Corridor | |
| 81 | $ 120 | $ 6,637 | $ 33 | 0.3990 | $ 9,965 | $ 48 | | $ 14,105 | $ 69 | 0.576 | $ 936,267 | 105% |
| 82 | $ 120 | $ 6,859 | $ 30 | 0.3718 | $ 10,501 | $ 45 | | $ 15,637 | $ 68 | 0.565 | $1,007,052 | 105% |
| 83 | $ 120 | $ 7,065 | $ 27 | 0.3441 | $ 11,028 | $ 41 | | $ 17,395 | $ 66 | 0.554 | $1,050,835 | 105% |
| 84 | $ 120 | $ 7,237 | $ 25 | 0.3160 | $ 11,519 | $ 38 | | $ 19,400 | $ 65 | 0.543 | $1,094,621 | 105% |
| 85 | $ 120 | $ 7,364 | $ 22 | 0.2874 | $ 11,951 | $ 34 | | $ 21,694 | $ 64 | 0.532 | $1,138,406 | 105% |

FIG. 34 (Cont.)

Determining Fair Market Value for Deferred Annuity with Inactive GMWB
GMWB: Guaranteed Minimum Withdrawal Benefit

| Rates Determining GMWB: | |
|---|---|
| Income Account Rate | 6% |
| Maximum Roll Up Period | 20 |

| Discount Rate: | 2.50% |
|---|---|
| Mortality Factor: | 50% |

| Maximum Fair Market Value | $ | AGE 65 139,245 |
|---|---|---|

| Age | Beginning of Year Income Account | Upon Activation Age-based Payout Rate | Guaranteed Minimun Withdrawal If Activated | Val/Unit | Fair Market Value | Mortality Rate | Survival Rate | Survival and Interest Discount | Actuarial Present Value Fair MV |
|---|---|---|---|---|---|---|---|---|---|
| 65 | $ 100,000 | 5.00% | $ 5,000 | 18.9589 | $100,008 | 0.00398 | 1.00000 | 1.00000 | $ 100,008 |
| 66 | $ 106,000 | 5.00% | $ 5,300 | 18.4815 | $104,832 | 0.00441 | 0.99602 | 0.97561 | $ 102,275 |
| 67 | $ 112,360 | 5.00% | $ 5,618 | 17.9978 | $109,835 | 0.00486 | 0.99163 | 0.94803 | $ 104,126 |
| 68 | $ 119,102 | 5.00% | $ 5,955 | 17.5078 | $115,016 | 0.00537 | 0.98681 | 0.92083 | $ 105,910 |
| 69 | $ 126,248 | 5.00% | $ 6,312 | 17.0118 | $120,376 | 0.00594 | 0.98152 | 0.89400 | $ 107,617 |
| 70 | $ 133,823 | 5.25% | $ 7,026 | 16.5100 | $132,210 | 0.00661 | 0.97569 | 0.86752 | $ 114,695 |
| 71 | $ 141,852 | 5.25% | $ 7,447 | 16.0035 | $138,211 | 0.00740 | 0.96925 | 0.84134 | $ 116,282 |
| 72 | $ 150,363 | 5.25% | $ 7,894 | 15.4932 | $144,398 | 0.00835 | 0.96208 | 0.81540 | $ 117,741 |
| 73 | $ 159,385 | 5.25% | $ 8,368 | 14.9807 | $150,769 | 0.00946 | 0.95404 | 0.78962 | $ 119,050 |
| 74 | $ 168,948 | 5.25% | $ 8,870 | 14.4670 | $157,322 | 0.01072 | 0.94502 | 0.76393 | $ 120,183 |
| 75 | $ 179,085 | 5.50% | $ 9,850 | 13.9531 | $171,866 | 0.01212 | 0.93490 | 0.73825 | $ 126,880 |
| 76 | $ 189,830 | 5.50% | $ 10,441 | 13.4399 | $179,102 | 0.01366 | 0.92357 | 0.71253 | $ 127,615 |
| 77 | $ 201,220 | 5.50% | $ 11,067 | 12.9275 | $186,513 | 0.01536 | 0.91095 | 0.68672 | $ 128,083 |
| 78 | $ 213,293 | 5.50% | $ 11,731 | 12.4163 | $194,092 | 0.01723 | 0.89696 | 0.66082 | $ 128,260 |
| 79 | $ 226,090 | 5.50% | $ 12,435 | 11.9069 | $201,827 | 0.01937 | 0.88151 | 0.63480 | $ 128,121 |
| 80 | $ 239,656 | 6.00% | $ 14,379 | 11.4003 | $228,777 | 0.02184 | 0.86443 | 0.60865 | $ 139,245 |
| 81 | $ 254,035 | 6.00% | $ 15,242 | 10.8984 | $237,534 | 0.02473 | 0.84555 | 0.58230 | $ 138,317 |

FIG. 35

Determining Fair Market Value for Deferred Annuity with Inactive GMWB
GMWB: Guaranteed Minimum Withdrawal Benefit

| Rates Determining GMWB: | |
|---|---|
| Income Account Rate | 6% |
| Maximum Roll Up Period | 20 |

| Discount Rate: | 2.50% |
| Mortality Factor: | 50% |

| Maximum Fair Market Value | $ | AGE 65 139,245 |

| Age | Beginning of Year Income Account | Upon Activation Age-based Payout Rate | Guaranteed Minimum Withdrawal If Activated | Val/Unit | Fair Market Value | Mortality Rate | Survival Rate | Survival and Interest Discount | Actuarial Present Value Fair MV |
|---|---|---|---|---|---|---|---|---|---|
| 82 | $ 269,277 | 6.00% | $ 16,157 | 10.4031 | $246,445 | 0.02797 | 0.82464 | 0.55569 | $ 136,948 |
| 83 | $ 285,434 | 6.00% | $ 17,126 | 9.9155 | $255,499 | 0.03173 | 0.80158 | 0.52873 | $ 135,091 |
| 84 | $ 302,560 | 6.00% | $ 18,154 | 9.4378 | $264,697 | 0.03610 | 0.77615 | 0.50141 | $ 132,722 |
| 85 | $ 320,714 | 6.25% | $ 20,045 | 8.9726 | $285,463 | 0.04117 | 0.74813 | 0.41366 | $ 135,213 |
| 86 | $ 320,714 | 6.25% | $ 20,045 | 8.5228 | $278,651 | 0.04705 | 0.71733 | 0.44543 | $ 124,119 |
| 87 | $ 320,714 | 6.25% | $ 20,045 | 8.0916 | $271,867 | 0.05381 | 0.68359 | 0.41667 | $ 113,279 |
| 88 | $ 320,714 | 6.25% | $ 20,045 | 7.6822 | $265,148 | 0.06145 | 0.64681 | 0.38739 | $ 102,714 |
| 89 | $ 320,714 | 6.25% | $ 20,045 | 7.2977 | $258,529 | 0.06975 | 0.60706 | 0.35760 | $ 92,451 |
| 90 | $ 320,714 | 6.50% | $ 20,846 | 6.9391 | $262,113 | 0.07859 | 0.56472 | 0.32744 | $ 85,827 |
| 91 | $ 320,714 | 6.50% | $ 20,846 | 6.6068 | $255,496 | 0.08768 | 0.52034 | 0.29718 | $ 75,927 |
| 92 | $ 320,714 | 6.50% | $ 20,846 | 6.2993 | $249,013 | 0.09676 | 0.47472 | 0.26714 | $ 66,522 |
| 93 | $ 320,714 | 6.50% | $ 20,846 | 6.0136 | $242,646 | 0.10575 | 0.42878 | 0.23778 | $ 57,695 |
| 94 | $ 320,714 | 6.50% | $ 20,846 | 5.7467 | $236,371 | 0.11418 | 0.38344 | 0.20953 | $ 49,527 |

FIG. 35 (Cont.)

Detremining Fair Market Value for Deferred Annuity with Inactive GMWB
GMWB: Guaranteed Minimum Withdrawal Benefit

| Rates Determining GMWB: | | Discount Rate: | 2.50% | Maximum Fair Market Value | $ | AGE 65 139,245 |
|---|---|---|---|---|---|---|
| Income Account Rate | 6% | Mortality Factor: | 50% | | | |
| Maximum Roll Up Period | 20 | | | | | |

| Age | Beginning of Year Income Account | Upon Activation Age-based Payout Rate | Guaranteed Minimum Withdrawal If Activated | Val/Unit | Fair Market Value | Mortality Rate | Survival Rate | Survival and Interest Discount | Actuarial Present Value Fair MV |
|---|---|---|---|---|---|---|---|---|---|
| 95  | $ 320,714 | 6.50% | $ 20,846 | 5.4925 | $230,136 | 0.12170 | 0.33966 | 0.18280 | $ 42,070 |
| 96  | $ 320,714 | 6.50% | $ 20,846 | 5.2428 | $223,874 | 0.13122 | 0.29832 | 0.15798 | $ 35,368 |
| 97  | $ 320,714 | 6.50% | $ 20,846 | 5.0057 | $217,660 | 0.14135 | 0.25918 | 0.13537 | $ 29,465 |
| 98  | $ 320,714 | 6.50% | $ 20,846 | 4.7817 | $211,502 | 0.15236 | 0.22255 | 0.11474 | $ 24,268 |
| 99  | $ 320,714 | 6.50% | $ 20,846 | 4.5730 | $205,418 | 0.16400 | 0.18864 | 0.09612 | $ 19,744 |
| 100 | $ 320,714 | 6.50% | $ 20,846 | 4.3807 | $199,411 | 0.17605 | 0.15770 | 0.07949 | $ 15,851 |

FIG. 35 (Cont.)

Applying CVAT Method to a Portfolio of Life & Annuity Policies (Increasing DB Policy)

Static IIR Method

Insured Age 65 — 239

| Policy | Type | Cash Value | Fair Market Value | Maximum CV, FMW | Death Benefit | CVAT Net Single Premium/1000 | Net Single Prm Contribution |
|---|---|---|---|---|---|---|---|
| 1 | 30 Year Term | $ - | $ - | $ - | $ 1,000,000 | $ 373.05 | $ 373,055 |
| 2 | Yearly Renewal Term | $ - | $ - | $ - | $ 500,000 | $ 239.37 | $ 119,684 |
| 3 | Deferred Annuity (DA) | $ 400,000 | $ - | $ 400,000 | $ 400,000 | $ 328.49 | $ 131,397 |
| 4 | DA with GMWB | $ 100,000 | $ 139,245 | $ 139,245 | $ 100,000 | $ 328.49 | $ 32,849 |
|  | Total | $ 500,000 | $ 139,245 | $ 539,245 | $ 2,000,000 |  | $ 656,985 |

241  242  243  244  247  246  248
245

Dynamic IIR Method

Insured Age 65 — 240

| Policy | Type | Cash Value | Fair Market Value | Maximum CV, FMW | Death Benefit | CVAT Net Single Premium/1000 | Net Single Prm Contribution |
|---|---|---|---|---|---|---|---|
| 1 | 30 Year Term | $ - | $ - | $ - | $ 1,000,000 | $ 538.54 | $ 538,544 |
| 2 | Yearly Renewal Term | $ - | $ - | $ - | $ 500,000 | $ 312.65 | $ 156,325 |
| 3 | Deferred Annuity (DA) | $ 400,000 | $ - | $ 400,000 | $ 400,000 | $ 463.25 | $ 185,298 |
| 4 | DA with GMWB | $ 100,000 | $ 139,245 | $ 139,245 | $ 100,000 | $ 463.25 | $ 46,325 |
|  | Total | $ 500,000 | $ 139,245 | $ 539,245 | $ 2,000,000 |  | $ 880,167 |

Applying Guideline Premium Method to a Portfolio of Life & Annuity Policies (Increasing DB)

Static IIR Method

Insured Age 65

| Policy | Type | Cash Value | Fair Market Value | Maximum CV, FMW | Corridor Factor | Min Death Benefit Contribution | Death Benefit | Cumulative Guideline Prem | Cumulative Premium Paid |
|---|---|---|---|---|---|---|---|---|---|
| 1 | 30 Year Term | $ - | $ - | $ - | | $ - | $ 1,000,000 | $ 554,347 | $ 46,200 |
| 2 | Yearly Renewal Term | $ - | $ - | $ - | | $ - | $ 500,000 | $ 196,357 | $ 15,000 |
| 3 | Deferred Annuity (DA) | $ 400,000 | $ - | $ 400,000 | 120% | $ 480,000 | $ 400,000 | Not Applicable | $ 200,000 |
| 4 | DA with GMWB | $ 100,000 | $ 139,245 | $ 139,245 | 120% | $ 167,094 | $ 100,000 | Not Applicable | $ 70,000 |
| | Terminated Policies(1) | | | | | | | $ 100,000 | $ 10,000 |
| | Total | $ 500,000 | | $ 539,245 | | $ 647,094 | $ 2,000,000 | $ 850,704 | $ 341,200 |

Dynamic IIR Method

Insured Age 65

| Policy | Type | Cash Value | Fair Market Value | Maximum CV, FMW | Corridor Factor | Min Death Benefit Contribution | Death Benefit | Cumulative Guideline Prem | Cumulative Premium Paid |
|---|---|---|---|---|---|---|---|---|---|
| 1 | 30 Year Term | $ - | $ - | $ - | | $ - | $ 1,000,000 | $ 867,739 | $ 46,200 |
| 2 | Yearly Renewal Term | $ - | $ - | $ - | | $ - | $ 500,000 | $ 262,709 | $ 15,000 |
| 3 | Deferred Annuity (DA) | $ 400,000 | $ - | $ 400,000 | 120% | $ 480,000 | $ 400,000 | Not Applicable | $ 200,000 |
| 4 | DA with GMWB | $ 100,000 | $ 139,245 | $ 139,245 | 120% | $ 167,094 | $ 100,000 | Not Applicable | $ 70,000 |
| | Terminated Policies(1) | | | | | | | $ 140,000 | $ 10,000 |
| | Total | $ 500,000 | | $ 539,245 | | $ 647,094 | $ 2,000,000 | $ 1,270,449 | $ 341,200 |

(1) Term Policied After Age 46 But Terminated Before Age Age 65. Extra Coverage Required Premium and Increased Guideline Limits.

FIG. 37

Fig 40
CLIENT LOGIN

For creating a new master policy:

Name [4001] John Smith

Date of birth 05/15/1978

Gender Male

Create your password [4002] ********

Confirm your password ********

Compliance method selection

Calculation method [4003]

GPT | CVAT

Interest rate method [4004]

Static | Dynamic

Create your master policy [4005]

For accessing an existing master policy:

Name

Policy number

Enter your password

Access your master policy [4006]

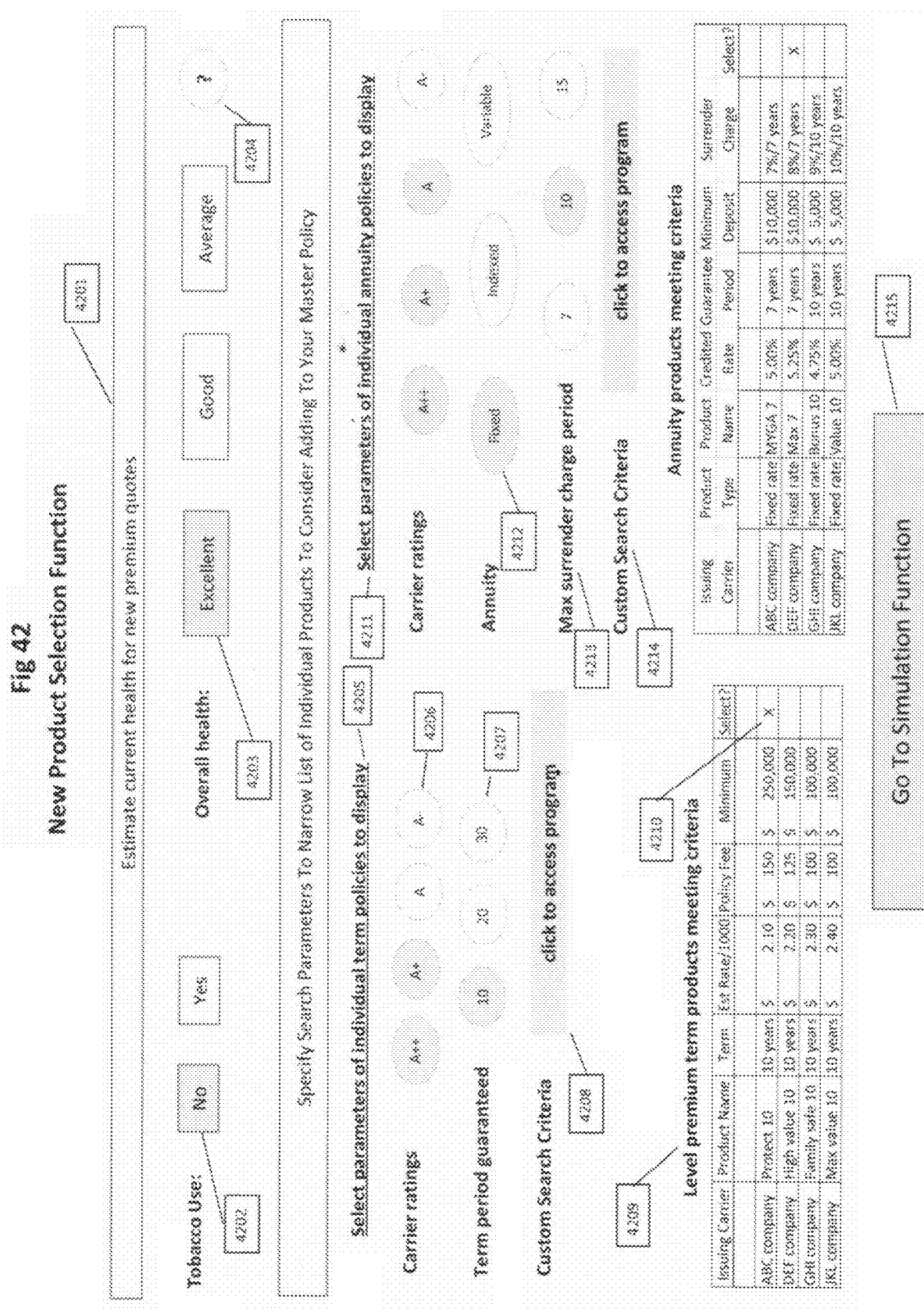

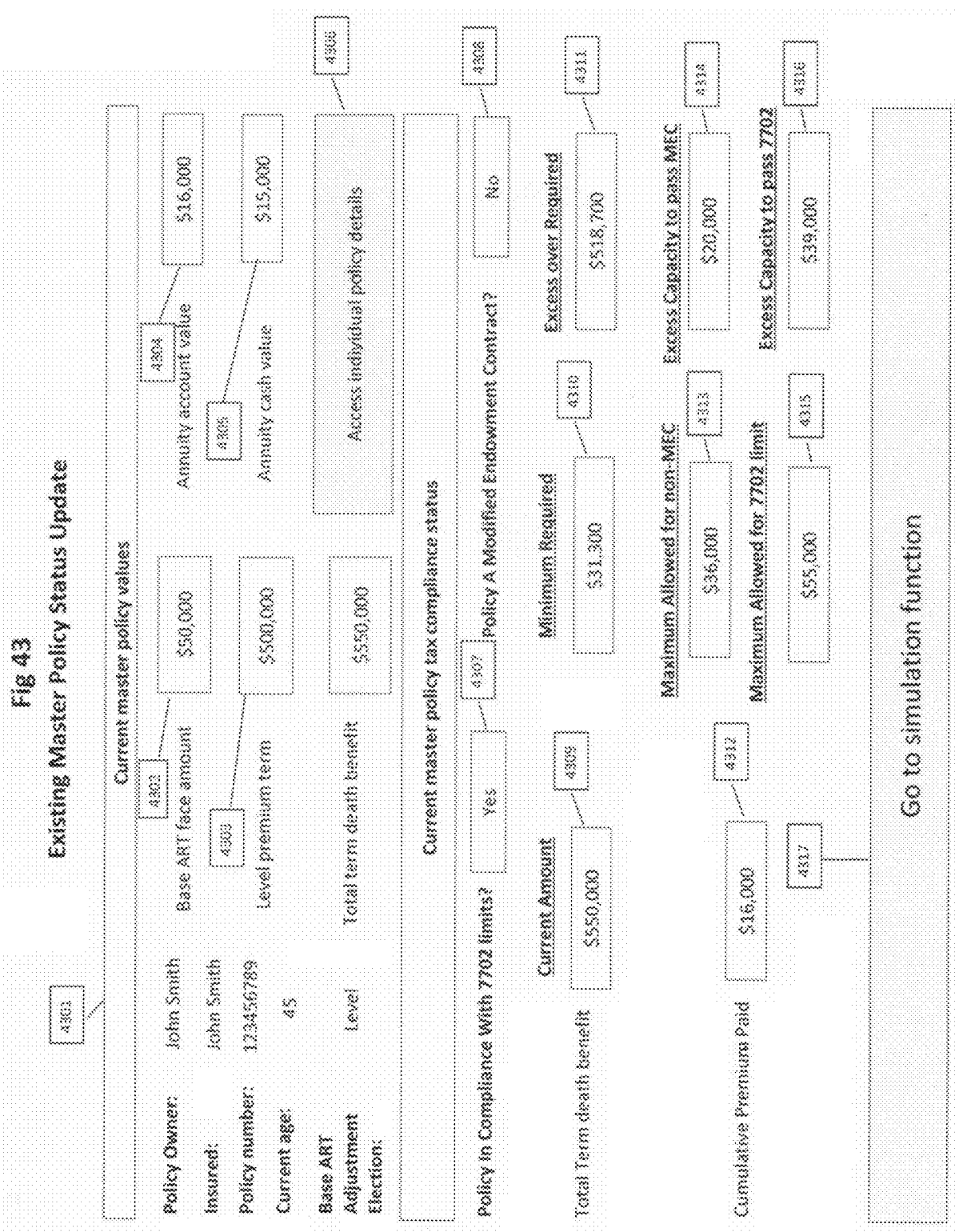

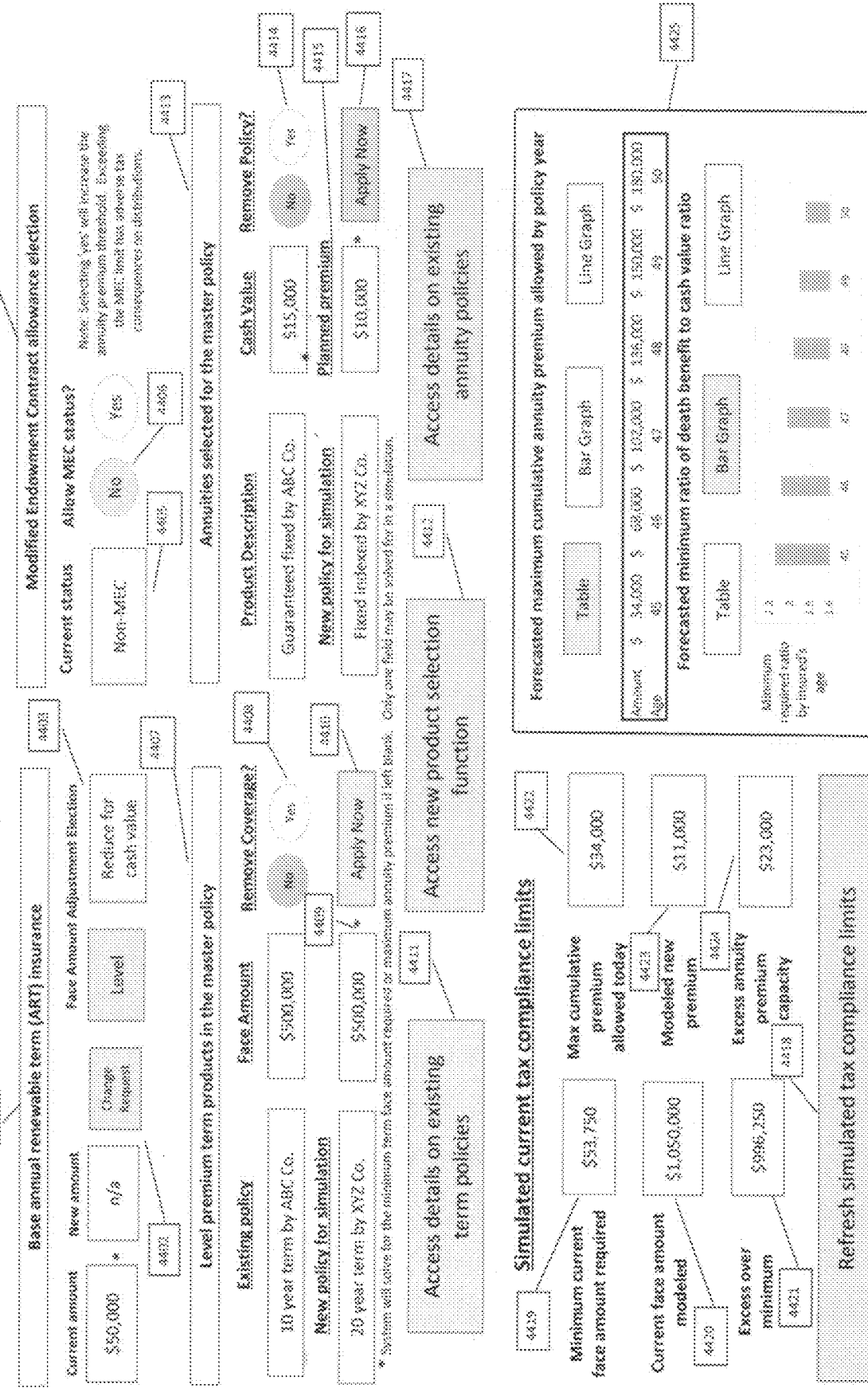

SYSTEMS AND METHODS FOR BUILDING AND MANAGING AN INTEGRATED PERMANENT LIFE INSURANCE PRODUCT USING INDIVIDUAL TERM AND ANNUITY POLICIES

CROSS-REFERENCE TO RELATED APPLICATIONS

This application is a continuation-in-part of U.S. patent application Ser. No. 17/587,244, filed on Jan. 28, 2022, which claims priority under 35 U.S.C. § 119(e) to U.S. Provisional Patent Application Ser. No. 63/142,582, filed on Jan. 28, 2021, the contents of which are hereby incorporated by reference in its entirety for all purposes.

TECHNICAL FIELD

This disclosure relates generally to computing system management and more particularly a user interface for building and managing an integrated permanent life insurance product and its tax compliance.

BACKGROUND

The life insurance industry consists of permanent life insurance, term insurance, annuity and other qualified additional benefit products such as disability income. Product designs evolved over the years to provide policy owners more choices on aspects such as premium flexibility, adjustable death benefits, crediting strategies linked to external indices, and guarantees on premiums and periodic withdrawals. A historical review of some important innovations will provide context for the significance of this invention.

Until the early 1980s, life insurance products basically consisted of whole life (herein referred as "WL") and term insurance. WL products are often viewed as complex and inflexible since they impose high penalties for surrendering the policy for cash. Premiums and death benefits are typically fixed while cash values and dividends are communicated with little transparency how those benefits are derived. WL appeals to policy owners seeking a combination of lifetime guarantees on the death benefit and cash value for a guaranteed level premium.

In the early 1980s the industry responded to the demand for more transparency and flexibility with the creation of a permanent life insurance product known as universal life (herein referred to as "UL"). UL policy values are more transparent on contributions and expense deductions that create the account that earns interest (for fixed products) or is invested in market-based sub-accounts (for variable products). Policy owners have flexibility on the timing and amount of premium deposits, subject only to policy minimums and IRS maximum limits to preserve favorable tax treatment. The policy face amount can be increased (with evidence of insurability) or decreased as policy owner needs change. The original vision of UL combined lower cost term insurance with cash value growth in a permanent life product for better transparency, more flexibility, lower cost and tax efficiency.

Innovation soon emerged in the UL product's credited rate mechanism. Fixed products began offering credited rates linked to a stock market index while providing downside protection (e.g., credited rate can only be zero or positive). Variable UL products allow the policy owner to participate directly in markets with equity and bond sub-accounts, providing the potential for greater returns along with the risk of a market-based loss. Similar innovations were developing with annuity products.

Innovations on other guarantees emerged. UL products began offering level guaranteed premium features that mirrored WL's central benefit of a guaranteed level premium but at a substantially lower premium level. This was an important feature for policy owners since UL policies offer premium flexibility but also bring the risk of policy lapse if the cash value goes to zero. This "no lapse guarantee" premium provision provided the policy owner assurance the policy would not lapse provided they paid at least the stipulated premium level.

UL innovation on the "no lapse guarantee" evolved to allow customization. A UL policy could be designed by the policy owner to function like a level guaranteed term policy for a specified number of years (e.g., like a 30-year term policy, or "30YT") or a lifetime guarantee premium like a WL policy. Innovation was blurring the distinction between insurance product categories with respect to premium guarantees to ensure coverage.

Annuity providers began providing guaranteed lifetime distribution benefits. Known as a guaranteed minimum withdrawal benefit ("GMWB"), these annuities met the consumer need of lifetime income payments they could not outlive while still providing a death benefit and cash value. Fixed indexed deferred annuity providers innovated with the creation of "Income Accounts" whose sole purpose was to determine the available GMWB independent of the annuity's credited rate performance. Variable annuities offered versions of GMWBs that "stepped up" if the underlying performance of the cash value met specified performance targets.

More recently innovation on UL and annuity indexed crediting strategies has shifted from standard stock market indices like the S&P 500 to alternative indices, such as hybrid stock and bond indices or custom-built "volatility controlled" indices.

While the annuity market created innovative solutions on GMWBs, permanent life insurance has not kept pace with innovative solutions regarding systematic distributions of cash value on a guaranteed basis. Due to a variety of hurdles, cash value distribution options from a permanent life insurance policy are usually offered on a non-guaranteed basis. Policy owners can take cash withdrawals or policy loans, but such distributions are only available to the extent the policy has cash value.

Comparing Universal Life Vs. Combination Term and Annuity

The modern-day version of UL has evolved to an expensive version of non-guaranteed yearly renewable term insurance ("YRT") with a cash value account. FIG. 1 provides detail on a typical indexed UL policy issued to a male aged 45 for $1 million face amount. In this example, the death benefit is the $1 million face amount plus the policy's account value (known in the industry as option B death benefit).

The sample indexed UL policy in FIG. 1 has five different types of expense charges. The cost of insurance deduction is not guaranteed at the illustrated level. Some expenses are a fixed amount while others are linked to the premium paid and the account value. Combining all five expense charges, this policy is expensive term insurance when compared to a typical 30YT policy that has a level guaranteed premium for all 30 years (far right side of FIG. 1). Over the first 30 years, the UL's expenses are $206,303 vs. $65,400 for the 30YT policy for the same $1 million of life insurance coverage. In both examples in FIG. 1 the total death benefit is $1 million plus the account value.

In FIG. 1, the UL's account value is illustrated or "projected" at 5.73% for five years, then 6.3% thereafter due to a bonus. In contrast, the policy owner buying the 30YT policy and putting the excess premium into a fixed indexed annuity credited rate is illustrated to earn 3.65%. The difference in illustrated credited rates relates to company and industry practices on index cap management practices between life insurance and annuities. Annuity rates are based on current investment conditions whereas UL policies are usually based on company portfolio yields (e.g., the company's yield on assets backing the product; in other words, bond yields available in the past 10-15 years). Over time the differences will likely converge as both products are investing new premium at similar yields. Many policy owners may not understand this practice. Buyers may compare the illustrated rates and assume the differential will always exist.

In other words, the UL policy's projected performance relies on the higher credited rate to cover the higher expenses. Even if the higher credited rate materializes, the illustration assumes the policy owner consistently pays the high premiums. A UL policy owner experiencing financial hardship and needing to lower the premium funding will end up with relatively costly insurance. In contrast, the policy owner purchasing the 30YT could put the excess premium into an annuity as they are financially able to do so. FIG. 1 shows that the term and annuity combination can outperform the universal life policy for almost 20 years despite crediting a substantially lower earned rate on the account.

Higher agent commission is one reason for the higher costs in the UL policy vs. the 30YT. FIG. 2 compares the typical sales costs for UL versus the 30YT and annuity combination. Life insurance companies typically pay the same or similar commission rate on a WL or UL product as they do on term products. In effect, the excess premium that builds cash value pays out substantially higher commissions on UL than premium paid to an annuity. The policy owner ultimately pays for these higher commissions as demonstrated by the UL policy expenses vs. the 30YT premiums in FIG. 1.

Other Policy Owner Benefits from Building Your Own Permanent Life Insurance Product A policy owner using a lower cost term policy and annuity for cash value growth has several other advantages by unbundling the life insurance protection and cash value vehicles. The first advantage is life insurance optimization. The policy owner can purchase the best available term policy on the market that meets their needs, as well as the best available annuity product. Second, unbundling allows for diversification of carrier and/or product risk by spreading their purchases among several annuities and/or life insurance companies. Finally, unbundling allows for customization. The policy owner can build a portfolio of low-cost term life insurance and annuities that create the blend of premium and benefits, long term guarantees vs. current rates, and credited rate strategies that fit the policy owner's needs and objectives.

These advantages exist for the life of the policy. With no transaction cost to exchange term policies and significantly smaller surrender charges on annuities vs. UL products, policy owners have the flexibility to replace older policies for "new and improved" ones. Similarly, policy owner needs change as well as their ability to pay the premiums. By purchasing the term policy separate from the annuity, the policy owner can manage the cash value component of the plan independent of their health situation. Notwithstanding all the advantages of building a customized life insurance plan with term products and annuities, many policy owners still prefer the bundled UL and WL products. The favorable tax treatment granted UL or WL is a significant reason.

The next section describes the federal tax system as it applies to life insurance and annuities and the methods adopted by Congress and enforced by the IRS. These rules determine the applicable tax treatment for WL and UL policies, term insurance and annuities.

Tax Treatment for Life Insurance and Annuities

Congress granted favorable tax advantages to WL and UL policies with rules and limits to prevent abuse. Congress wanted to ensure that the life insurance policy does not have too much investment orientation (e.g., cash value) relative to the amount of death benefits. To accomplish this goal, Congress adopted Internal Revenue Code ("IRC") section 7702 in 1984 which created the "definitional limit" methods to determine when a policy classifies as life insurance for federal income tax purposes. Congress later adopted section 7702A in 1988 that created a separate set of "definitional limit" methods to determine when a life insurance policy's distribution should be taxed like an annuity.

UL, WL and annuities have one common tax advantage feature: tax deferred interest and/or market-related gains. One tax treatment difference applies upon death. Permanent life insurance death benefits are generally tax free including the accumulated interest and market-based gains on the cash value. This tax advantage applies to both level death benefit structures as well as increasing death benefit structures (e.g., death benefit is the sum of a specified amount and the cash value). Annuities paid out as a death benefit must report the accumulated interest and market-based gains as ordinary income. In spousal beneficiary situations, the spouse can take ownership of the annuity and defer the income tax. The government will eventually collect income taxes on the annuity gains when the spousal beneficiary takes cash out of the annuity or dies.

The other major tax difference is the tax treatment on cash distributions. For UL and WL, cash withdrawals are considered a distribution of principal first (e.g., known as FIFO—first in first out). Thus, the policy owner can withdraw all the premiums paid into the policy before incurring any income tax on the accumulated interest. Additionally, policy loans are not considered a taxable distribution so a policy owner could borrow against the cash value without triggering a taxable event even if all the premiums have already been withdrawn from the policy. Favorable treatment on loans is a reason why many WL and UL products are purchased for both life insurance protection and retirement income. The policy owner can withdraw the policy's cost basis and then take distributions in the form of a policy loan and not pay any income tax. If the policy is held until death, any outstanding policy loan will be netted against the death benefit and completely avoid paying taxes on the accumulated interest earned.

Distributions from annuities are taxed less favorably than permanent life insurance. Distributions from an annuity are deemed as income first for tax purposes (e.g., known as LIFO—last in first out). The policy owner cannot access any of the funds inside the annuity without paying income taxes due on the interest earned. In addition, policy loans are considered a distribution no matter if the policy loan is directly from the insurance company or a bank and the annuity is used as collateral.

Tax treatment on the cost of insurance is another important distinction between permanent life policies and term policies. With permanent life, the mortality charges and other expenses are deducted from the policy's cash value. If the policy owner ultimately incurs income tax on distributions from the policy, the taxable gain is reduced by the mortality charges and expenses. Effectively, the mortality charges and expenses are paid with pre-tax interest gains. In contrast, a standalone term insurance policy owner uses after-tax dollars to pay the term premiums. At a 30% tax rate, the term insurance policy owner is effectively paying an extra 30% for the same cost of life insurance as compared to a permanent life policy (assuming, of course, the permanent life policy earns enough interest and/or market gains over time on the cash value to cover the mortality and expense charges).

FIG. 4 provides a summary of the different tax treatment for various situations and products described.

Definitional Methods Overview for Complying with Section 7702 & 7702A

As used herein, "definitional limit" refers to the generic reference to a policy's maximum cash value and/or premium to receive the favorable tax treatment Congress granted to life insurance and annuities. Furthermore, there are separate "definitional limits" with respect to premium paid to determine when a permanent life policy is taxed like an annuity for distributions. Each policy has its own unique set of definitional limits. The calculations are highly complex and dynamic as benefits change and premiums are paid. Failure to stay within the ever-changing definitional limits on an individual's permanent life insurance policy has significant tax consequences.

Congress created two tax compliance test methods for calculating a permanent life policy's definitional limit. The policy owner must make an irrevocable decision at time of purchase which compliance method to apply for the life of the policy. One option is the "Cash Value Accumulation Test" method (herein referred to as "CVAT"). The second method is the Guideline Premium Test (herein referred to as "GPT") which has a premium test and a corridor test.

The CVAT method begins with an actuarial calculation to determine a policy's net single premium (herein referred to as "NSP"). The NSP is the actuarial present value of death benefits, costs for qualified additional benefits and endowment benefits. The CVAT method's definitional limit (the NSP) is compared to the cash value. Any changes in benefits are immediately reflected in the policy's NSP calculation. Congress spelled out specific rules on how to determine the assumptions used in the actuarial calculations and which benefits are eligible. Note that the CVAT method does not have a definitional limit on premium; the investment orientation is contained via the cash value limit.

The GPT has two compliance tests that must be passed: a cumulative premium test and a cash value test. The premium test compares actual cumulative premium paid to the GPT's definitional limit for that policy. The definitional limit is a combination of a single premium limit (herein referred to as the "GSP") and an annual level premium (herein referred to as the "GLP"). Initially the definitional limit is the GSP. As the years progress the cumulative GLP becomes greater than the GSP and becomes the definitional limit. Changes in benefits will trigger a recalculation of the GPT's definitional limit. The change in the premium limit will be applied prospectively (effectively spreading out the impact of a change in benefits whereas the CVAT method immediately reflects the full impact). The second test, the cash value corridor test, defines the maximum cash value allowed relative to the current amount of death benefit for the insured's current age.

The third definitional limit method is the 7-pay premium (MEC) test which determines whether a permanent life insurance policy's distribution should be taxed like an annuity. Once a policy violates the MEC test it will forever be taxed like an annuity. As the name implies, the premium limit test is applied over a 7-year period. While simple in concept, the 7-pay period must be recalculated and restarted whenever there is a change in benefits, except if the policy passes a fourth definitional limit method is "Necessary Premium Test" (herein referred to as "NPT").

While Congress intended to put strict limitations on premium limits to avoid being taxed like an annuity, Congress recognized the need to incorporate some flexibility around minor changes in benefits to avoid constantly restarting the 7-pay period. A policy's NPT calculation method mirrors its 7702 method (e.g., the selected CVAT and GPT method) but with potentially lower death benefits used in the calculation to help distinguish between "necessary premiums" and excess premiums. Basically, the NPT uses the lowest death benefit in the preceding 7 years to determine if the amount of premium paid is small enough to allow minor changes in benefits without recalculating the MEC premium and restarting the 7-year MEC test period. The administrative system must constantly track both the amount of premiums paid and the constantly changing NPT threshold. If a premium payment breaches the NPT threshold during the 7-pay tracking period, the 7-pay MEC period is restarted.

Actuarial Assumptions Overview for Calculating Definitional Limits

The actuarial calculations underlying each method are complex. Handling changes in benefits and tracking premiums and cash values relative to constantly changing definitional limits compound the complexity. The basic formulas for each test are summarized in FIG. 5. Those skilled in the art of administering the CVAT, GPT, MEC, and NPT methods will appreciate the complexity in administering the tax compliance for policies in general and especially for policies experiencing changes in benefits. The actuarial calculation complexity increases when variables are not uniform (such as unit expenses) or when the policy provides guarantees that are more favorable than the regulatory safe harbor standards. More favorable contractual guarantees must be incorporated into the actuarial calculations in every applicable policy year. The regulatory safe harbor standards are often tied to the policy's calendar year of issue. While anchoring the applicable safe harbor standard to issue year, the administrative complexity increases when certain changes trigger "new issue treatment" and the underlying safe harbor standards underlying all the actuarial definitional limit calculations must be reset to those safe harbor standards applicable to the calendar year that triggered the "new issue treatment".

One such regulatory safe harbor is a policy's interest rate guarantee. If the guaranteed interest rate on the policy exceeds the regulation's safe harbor rate, the higher guaranteed rate must be used in the definitional limit calculations (i.e., the discount rate used in determining the present value). A policy with a strong contractual guaranteed rate will have lower definitional limits on premium and cash values as a result of calculation method using a higher discount rate due to the strong interest rate guarantee. From 1984 through 2020 the safe harbor limit was 4% for all definitional limit calculations except the GSP (which was 6%). Most compliance administrators do not have to deal with the added complexity of strong guaranteed rates violating the safe harbor limit since life insurance policies seldom offer interest rate guarantees greater than the safe harbor limit.

Recently, Congress passed Section 205 of the Consolidation Appropriations Act which updated Section 7702 by indexing the regulatory safe harbor interest rate limit to the calendar year of issue. Starting in 2021 the regulatory safe harbor limit changed from 4% to 2% and the rate is now indexed, potentially changing annually. The base rate is now known as the "Insurance Interest Rate" (herein referred to as the "IIR"). The IIR is the regulatory safe harbor rate for CVAT, GLP, and MEC calculations. The GSP safe harbor rate is the IIR plus 2%.

The other important regulatory safe harbor is the mortality charge which is linked to the applicable Commissioner's Standard Ordinary mortality table (herein referred to as "CSO") during the policy's year of issue. Periodically the Society of Actuaries updates the CSO mortality tables due to changes in observed death rates. As the regulators of the individual states adopt the new CSO table, that table becomes the safe harbor standard for newly issued policies. If a policy's mortality charge in any year is guaranteed to be more favorable (lower) than the applicable CSO mortality rate, the definitional limit calculations must use the more favorable guaranteed mortality charge. Permanent life insurance policies rarely guarantee mortality charges to be more favorable than the CSO table which greatly simplifies the tax compliance administrative calculations.

In summary, both safe harbor limits used in all the definitional limits—the interest rate and mortality table—are linked to the policy's issue year starting in 2021. Embodiments disclosed herein provide the method and thresholds for determining "new issue treatment"—replacing the reference to a policy's actual year of issue for determining the safe harbor limits with the current year when "new issue treatment" was triggered. While changes in the CSO safe harbor rates can impact the definitional limits, changes in the discount rate can have significantly more impact. Now that the IIR is indexed to calendar year of issue, the impact of "new issue treatment" has increased the potential impact to a policy's definitional limit calculations.

Congress intended policies that undergo a "fundamental change in economic characteristics" to get 'new issue treatment' for tax purposes even though the policy is still the original contract under state law. Unfortunately, Congress did not define the method for determining or quantifying what constitutes a "fundamental change in economic characteristics". Congress deferred such determination up to the IRS to examine the context of each situation. Perhaps Congress was viewing the situation from the lens of a bundled, permanent life product where the benefits are largely set at policy issue (and guarantees on interest rates and mortality charges are rarely more favorable than the safe harbor standards).

Regulatory & Definitional Limit Calculation Context for the Invention

Consumers can purchase individual term policies and annuities and enjoy the flexibility, diversification and low-cost benefits relative to the insurance and cash value benefits offered by permanent life. However, the consumer does not receive the favorable permanent life tax treatment because they are considered separate policies under state law. The purpose of the invention is to create the administrative capability to apply the spirit and intent of 7702 and 7702A to a portfolio of individual term and annuities. The fundamental economics of term and annuities combined are no different than UL: the policy owner has life insurance protection and cash value. If the individual states update their statutes to allow separately purchased individual term and annuity policies to be considered a single, integrated contract (e.g., treat them like they currently treat a UL contract) when properly constructed and supported by this invention to be administered as such, consumers will be enabled to create their own permanent life product and enjoy the flexibility, low cost, and tax efficiency granted to cash value life insurance contracts by Congress.

Application of the concepts, regulatory intent and rules of CVAT, GPT, MEC and NPT methods to bundled individual permanent life insurance policies, is complex even with aspects simplified by product construction. Applying such concepts to a portfolio of individual term life insurance and individual annuities where any policy could be added to or withdrawn from the portfolio in the future greatly magnifies the complexity. With the goal of enabling greater flexibility for the consumer, such flexibility significantly increases the need for a test to determine whether the overarching policy meets the "significant change in fundamental economic characteristics" Congress intended to receive "new issue treatment". In short, enabling the consumer to build their own permanent life policy using term and annuities greatly increases the need for a method and system to handle frequent resetting of the safe harbor standards and the consequential impact on all the definitional limit calculations.

Furthermore, using individual annuities for the master product's cash value presents an opportunity to utilize the recently passed legislation on the IIR safe harbor rate. Such indexing was passed by Congress to make the safe harbor guarantee more responsive to changes in interest rate conditions. The invention is uniquely suited to improve such responsiveness with a dynamic safe harbor interest rate guarantee—one based on each annuity policy's purchase year rather than the year the overarching policy product was established. As new premiums are contributed to annuities, or old annuities are exchanged for new ones, a weighted average of the safe harbor limit that is directly linked to the annuity portfolio's activity would better link the definitional limit calculations to interest rate market conditions when the premiums funding the annuities occur.

Consumers would benefit from the ability to purchase term policies with level premium guarantees or annuities with strong interest rate guarantees and/or lifetime GMWBs inside an overarching policy taxed as permanent life insurance. While such guarantees are attractive, the guarantees themselves will directly impact the definitional limit on how much premium they can put in the policy or the maximum cash value. Methods and systems must be flexible and dynamic to handle variables that are potentially changing frequently and be capable of accommodating future product designs yet to be created.

Regulatory approval of the following invention most likely requires several events. First, the IRS must confirm that the invention's methods follow the spirit and intent of Congress and the master product complies with the single, integrated contract test. Second, individual state statutes may need to be updated to clarify that a permanent life insurance policy may consist of individual term and annuity policies as enabled by this invention. Third, the IRS must determine if the dynamic IIR method proposed herein is allowed. Fourth, a method and threshold needs approved for determining when a master policy's changes have breached threshold for requiring new issue treatment. Finally, a benefit of the invention is enabling consumers to purchase annuities with GMWBs inside a permanent life insurance product. Administrative clarity is needed to define acceptable methods for determining the fair market value of such guaranteed benefits.

User Interface to Operate at the Consumer and Life Insurance Advisor Level

Today's bundled permanent life insurance policies are sold with a policy illustration system developed or managed by the issuing carrier (or a third-party vendor on behalf of the carrier) for the bundled permanent life insurance products that carrier sells. The product illustration system is almost universally engaged by the insurance agent when interacting with a prospective insured. These conventional product illustration systems allow the agent to show projected policy values such as interest credits, account values, cash surrender values, and death benefits in the sales process or servicing an existing policy. Tax compliance limits are built within the illustration system since the nature of a bundled permanent product is all guaranteed elements that impact the "definitional tax limits" calculation and is known upfront. Once the agent finalizes the sale, the illustration system can help populate the new policy application with customer information to start the underwriting process.

Unlike conventional product illustration systems, creating and managing a personalized permanent policy using individual term and annuity policies in accordance with the present invention requires a considerably more sophisticated user interface with real-time access to multiple carrier databases for policies already in the master policy as well as new products available for purchase. The flexibility to change the individual term and annuity products means the guaranteed elements that impact the definitional tax limits can change and therefore change the master policy tax compliance limits. In other words, the tax compliance limits are very dynamic and the ability of the user interface to compute in real-time and communicate the impact on the tax compliance limits as the portfolio of term and annuity policies changes before those changes are executed is critical. Users need to know the minimum amount of term insurance to buy or maintain to stay tax compliant as well as the maximum amount of premium they can add to an annuity to build cash value. As new term and annuity products become available, as well as emerging changes with policies already purchased (such as a level premium term policy reaching the end of the guarantee period or an annuity that is underperforming its growth expectations), the need to evaluate the tax implication from making changes to the portfolio of individual term and annuity policies increases.

SUMMARY

Embodiments disclosed herein are directed to a computer system and method for managing and providing a portfolio of individual term life insurance and annuity policies to create a new overarching life insurance product on the same insured which combines the terms and benefits of all the included products and achieves the tax efficiency of a permanent life insurance product, and a user interface to build and manage changes to the portfolio of policies within the consumer's tax compliance objectives. This new, overarching life insurance product shall be referred to herein as the "master product." Methods for determining compliance with federal tax law for life insurance and annuities as described in IRC section 7702 and 7702A are currently applied individual policies. Individual permanent life products are economically bundled versions of term insurance and annuities yet are more costly, more complex, and less flexible to accommodate changes in policy owner's needs after they purchase the product. Some embodiments include applying rules and congressional intent of IRC section 7702 and 7702A to ensure the master product qualifies as a permanent life insurance product regardless of the type and number of policies within the master product.

In one embodiment the policy owner establishes a master product that will be able to own one or more individual term life insurance policies, annuity policies, and qualified additional benefit products. The policy owner selects which compliance method will be applied to the master product for compliance with IRC section 7702 and 7702A. The computer system stores the election and applies the selected method in all compliance test calculations.

In one embodiment one or more policies are purchased from the same or different insurance companies by the policy owner. Such policies may include individual term life insurance, individual annuities, or qualified additional benefits such as disability income. The purchased policies are assigned to the master product, instructions and required data files are sent to the insurance companies administering those policies. The computer system registers the policies and performs compliance calculation tests to determine whether the portfolio of individual policies in the master product comply with IRC section 7702 and 7702A, stores the compliance limits, and manages the compliance process by reporting the definitional limits on premium and cash value, notifying when a compliance test has failed and identifying possible remediation alternatives.

In one embodiment a policy owner may add to or delete policies from the portfolio at any time. The computer system registers the change in benefits, premiums and/or cash value, performs updated compliance calculation tests to determine whether the portfolio of individual policies in the master product comply with IRC section 7702 and 7702A, stores the new compliance limits, and manages the compliance process by reporting the definitional limits on premium and cash value, notifying when a compliance test has failed and identifying possible remediation alternatives.

In one embodiment the computer system applies the CVAT method to the master product that is broadly defined to include a portfolio of term life insurance policies, annuities, and/or qualified additional benefit policies. The computer system receives periodic data feeds from the insurance companies administering the individual policies in the portfolio, applies the formulas to that portfolio of policies to process the compliance tests.

In one embodiment the computer system applies the GPT and corridor test to the master product that is broadly defined to include a portfolio of term life insurance, annuities, and qualified additional benefit policies. The computer system receives periodic data feeds from all the insurance companies administering the individual policies in the portfolio, applies the formulas to that portfolio of policies to process the compliance tests.

In one embodiment the computer system applies the MEC test to the master product that is broadly defined to include a portfolio of term life insurance policies, annuities and qualified additional benefit policies. The computer system also applies the NPT method to determine if the policy qualifies for deferring the restart of the 7-pay MEC period as a result of the change in benefits or restarting the 7-pay MEC period as a result of a premium payment exceeding the NPT definitional limit. The computer system receives periodic data feeds from the insurance companies administering the individual policies in the portfolio, applies the formulas to that portfolio of policies to process the compliance tests.

In one embodiment the computer system applies the new issue treatment test to the master product that is broadly defined to include a portfolio of individual term life insurance policies, individual annuities and qualified additional benefit policies. The computer system receives periodic data feeds from the insurance companies administering the individual policies in the portfolio, applies the methods and formulas to that portfolio of policies to determine if the master product meets the criteria for new issue treatment of the master product. If new issue treatment is required, the computer system resets all compliance tests and assumptions as if the master product has been newly issued in the current year and processes new definitional limits.

In one embodiment the computer system uses the selected safe harbor BR method and interest rate guarantee in the individual annuity policies to determine the interest rates to be used in the respective compliance method calculations. For the static IIR method the computer system compares each annuity's interest rate guarantees to the IIR rate for the master policy (based on its year of issue) to determine the discount rates and performs the various calculations. For the dynamic BR method the computer system segregates the annuity cash values by the policy's respective purchase year and each year's BR rate, applies the safe harbor rates to each annuity to determine each annuity's discount rate and then calculates a weighted average discount rate to use in the definitional limit calculations.

In one embodiment the computer system sends reports to notify the policy owner of a failed compliance test. Management of the master product includes continuous or at least periodic compliance testing to determine whether the portfolio of policies in the master product comply with IRC section 7702 and 7702A. Individual circumstances will determine whether the policy owner can remedy the situation (e.g., request a premium be refunded on one of the individual policies in the portfolio or exercise the "free look" right to decline a new policy application), or whether the master product will lose its permanent life insurance tax benefits or be taxed as an annuity. For a compliant policy, the computer system applies the appropriate method(s) and performs calculations to notify the policy owner of the master product's definitional limits on premium and cash value capacity to stay compliant with section 7702 and 7702A compliance limits.

In one embodiment the computer system determines the present value of future death claims for each individual term life insurance policy, incorporating the stipulated rules and methods for each test including the impact of any guaranteed term premiums that are less than the safe harbor CSO mortality rates. The computer system shall utilize the discount rates calculated from the portfolio of individual annuity policy's interest rate guarantees, cash values, and applicable IIR safe harbor limits. The computer system processes this calculation for each individual term policy in the portfolio whenever the definitional limits are updated and whenever there is a change in benefits such as a policy being added, changed or deleted.

In one embodiment the computer system uses the present value of future death claims for each individual term life insurance policy to determine a weighted average present value of future benefits unit factor (e.g., NSP). The weighted average NSP is applied to the annuity policy death benefits in the definitional limit calculations when the policy owner has selected an increasing death benefit option (e.g., the total death benefit is the sum of the term policy death benefits and the annuity cash value). The computer system processes this calculation for the portfolio of policies periodically and whenever there is a material change in benefits such as a policy being added, changed or deleted.

In one embodiment the computer system applies a level death benefit methodology to the combination of a yearly renewable term (e.g., "YRT") policy and a portfolio of individual annuity policies. The policy owner specifies a total death benefit and the computer system determines the face amount of the YRT policy based on the total death benefit and the aggregate cash value of the individual term policies. The computer system processes this calculation for the portfolio of policies periodically and whenever there is an annuity policy being added, changed or deleted.

In one embodiment the computer system determines the actuarial present value of future eligible expenses for the GPT. Such calculation is done for all individual term life insurance, annuity, qualified additional benefit policies, and the administration of the master product, incorporating the stipulated rules and methods. The computer system shall apply the applicable interest rates and mortality charges based on the selected IIR method, safe harbor interest rates and mortality tables, and each individual product guarantees. The computer system processes this calculation for the portfolio of policies periodically and whenever there is a material change in benefits such as a policy being added, changed or deleted.

In one embodiment the computer system determines a fair market value of an individual annuity policy with guarantees that cause the fair market value to exceed the annuity's stated cash value for purposes of performing cash value limitation tests in both the CVAT and GPT's corridor test. The computer system calculates the fair market value based on prescribed methods and assumptions. The computer system calculates an aggregate modified cash value and uses this value in all applicable definitional limit compliance tests for the master product.

There are many annuity products on the market today providing various types of guaranteed benefits to customers. The method described herein illustrates how to incorporate the fair market value concept of such guarantees into the CVAT and GPT process. The presence of a lifetime GMWB may have a fair market value that exceeds the policy's cash value. Policies with strong guaranteed benefit payments relative to the underlying cash value, age of the insured (e.g., life expectancy), and current interest rate environment (i.e., the present valuing mechanism) are most likely to have a fair market value exceeding the cash value. In these situations, the greater of the fair market value and the cash value must be reflected in the definitional limit compliance tests. For the CVAT method, the cash value limit is compared to the greater of the stated cash value and the fair market value. For the GPT method, the corridor test also uses the greater of the two values to determine the minimum death benefit required. There is not likely to be an active market for policies with such guarantees therefore a method and set of assumptions are needed to determine a policy's fair market value periodically for compliance testing purposes. The invention incorporates one such method to comply with the spirit and intent of IRC section 7702.

The calculations, formulas and general operation of a permanent life tax compliance system are inherently complex even for today's bundled product design. The invention's goal to apply the spirit and intent of IRC sections 7702 and 7702A definitional limit concepts and methods to a portfolio of individual term and policies and support adding or deleting new policies in the future which increase the complexity of the compliance system calculations. Furthermore, the invention's flexibility increases the need for another quantifiable compliance test and presents an opportunity to incorporate a procedural change in the IIR safe harbor recently passed by Congress. Both situations are discussed next.

First, the enhanced consumer flexibility increases the likelihood the regulator (i.e., IRS) may deem so much change in benefits since the policy issue that the changes fundamentally alter the economic characteristics of the master product so the product should get "new issue treatment". The invention incorporates a decision-making framework in the method and processes to trigger such new issue treatment. The invention does not propose a specific, quantified material change threshold but rather includes the methodology in the overall decision-making framework. For example, the quantified threshold could be the percentage change in the total term policy face amount or aggregate death benefits since original issue. If a master product had an initial term policy face amount of $100,000 but eventually became $500,000, a 400% increase in face amount might be deemed a "fundament change in the economic characteristics" and thus require resetting the BR and CSO safe harbors to the current year. All definitional limit calculations would be recalculated using the new safe harbors and treat the master product as a new product.

Second, the invention accommodates two methods for determining the safe harbor BR rate. The traditional or "static" method locks in the BR to the master product's year of issue unless the new issue treatment threshold is breached. Alternatively, the invention's flexibility accommodates a dynamic method that links the safe harbor BR to the annuity purchase year. A weighted average discount rate for each prospective year in the present value calculation is then based on each annuity's discount rate and weighted by that annuity's current cash value.

The invention includes a computer system and method for managing and providing a permanent life insurance product wherein one or more life insurance policies, one or more annuity policies, and qualified additional benefit policies are combined into one product for the purpose of creating a new overarching permanent life insurance product on the same insured. The system and method includes a user interface for the insured and/or their insurance agent to create and manage their master policy within the insured's tax compliance objectives.

In one embodiment the user interface receives demographic information on an applicant as well as a health status self-assessment estimate before formal application to estimate the term insurance premiums which will impact the definitional tax compliance limits for minimum term insurance needed (for a given annuity premium desired) or maximum annuity premium allowed (for a given amount of life insurance coverage desired). Based on whether a new policy is being created or whether an existing policy is being managed, the interface displays the appropriate input fields for the insured to complete and simulate the tax compliance implications of potential changes to the master policy before executing a change. The user interface communicates in real-time with the computer systems and method administering the existing term and annuity policies owned and new products available for inclusion in the master policy portfolio. For newly created policies, the interface provides compliance method options for the user to select. The interface provides filtering options to help the user narrow down the individual term and annuity products to evaluate for potential purchase for the master policy. The interface includes various options to simulate changes to observe the tax compliance implications such as making changes to any existing term or annuity policy already owned by the master policy (if applicable) or adding a new term or annuity policy.

In another embodiment the user interface provides options for the type of information displayed (e.g., tax compliance status, amount of cushion to tax compliance limits) and the format of the information displayed (e.g., numerical tables, graphs). Once the insured is ready to submit an application to an insurance company for a new term or annuity policy, or make a change to an existing policy, the user interface provides a gateway to the formal application process or change request forms. The user interface also provides an account login gateway to complete an application in process, get tax compliance status updates, or receive updates on existing application or policy change requests.

BRIEF DESCRIPTION OF THE DRAWINGS

To facilitate further description of the embodiments, the following drawings are provided in which:

FIG. 1 is a chart comparing the costs and values of a typical UL policy versus a 30YT and annuity combination, according to an embodiment;

FIG. 2 is a chart comparing typical sales commissions paid on a UL policy versus a comparable 30YT and annuity combination paying the same total premium, according to an embodiment;

FIG. 3 is a chart of the corridor factors by attained age for the GPT method, according to an embodiment;

FIG. 4 is a chart summarizing the different federal tax treatment for permanent life products, permanent life contracts classified as MECs, term policies and annuities, according to an embodiment;

FIG. 5 illustrates actuarial formulas for the major definitional limit calculations, according to an embodiment;

FIG. 6 is a chart illustrating the static and dynamic IIR methods for determining the interest rates used in the section 7702 and 7702A definitional limit calculations, according to an embodiment;

FIG. 15 is a chart illustrating the MEC and CVAT calculations for a newly issued YRT policy to a male 45-year-old assuming the static BR method, according to an embodiment;

FIG. 16 is a continuation chart of FIG. 15 illustrating the GSP and GLP calculations (level and increasing death benefit policies), according to an embodiment;

FIG. 17 is a chart illustrating the impact of new issue treatment at age 60 for the example from FIG. 15 with a hypothetically lower CSO safe harbor table and lower BR under the static method. FIG. 17 illustrates the MEC and CVAT calculations, according to an embodiment;

FIG. 18 is a continuation of FIG. 17 showing the GSP and GLP calculations, according to an embodiment;

FIG. 19 is a chart illustrating the MEC and CVAT calculations for same individual from FIG. 15 except it is a 30YT policy instead of a YRT policy, according to an embodiment;

FIG. 20 is a continuation of FIG. 19 illustrating the GSP and GLP calculations, according to an embodiment;

FIG. 21 is a chart illustrating the calculation of the discount rates for the definitional limit calculations for the static and dynamic IRR methods, according to an embodiment;

FIG. 22 is a chart illustrating the MEC and CVAT calculations for the newly issued policy under the static BR Method using the example from FIG. 19, according to an embodiment;

FIG. 23 is a continuation of FIG. 22 chart illustrating the GSP and GLP calculations, according to an embodiment;

FIG. 24 is a chart illustrating the MEC and CVAT calculations for the newly issued policy under the dynamic ER method using the example from FIG. 19, according to an embodiment;

FIG. 25 is a continuation of FIG. 24 chart illustrating the GSP and GLP calculations, according to an embodiment;

FIG. 26 is a chart illustrating the calculation of the static BR and dynamic BR method discount rates for the hypothetical 45-year-old individual 20 years later (now age 65) exchanging previously purchased annuities for new policies, according to an embodiment;

FIG. 27 is a chart illustrating the impact to the MEC and CVAT definitional limit calculations for the example from FIG. 19 to a 45-year-old now age 65 that replaced an old annuity for a new one. This example assumes the static IIR method, according to an embodiment;

FIG. 28 is a continuation of FIG. 27 illustrating the GSP and GLP calculations, according to an embodiment;

FIG. 29 is the same illustration as FIG. 27 but using the dynamic BR method, according to an embodiment;

FIG. 30 is a continuation of FIG. 29 illustrating the GSP and GLP calculations, according to an embodiment;

FIG. 31 is the MEC and CVAT calculations for a YRT policy purchased at age 60 for the hypothetical case at age 65, using the static IIR method, according to an embodiment;

FIG. 32 is a continuation of FIG. 31 illustrating the GSP and GLP calculations, according to an embodiment;

FIG. 33 is the same as FIG. 31 except it assumes the dynamic IIR method, according to an embodiment;

FIG. 34 is a continuation of FIG. 33 illustrating the GSP and GLP calculations, according to an embodiment;

FIG. 35 is an example of the fair market valuation calculation for a 65-year-old that purchased a deferred annuity with the GMWB, according to an embodiment;

FIG. 36 is a chart illustrating the application of the CVAT method for a hypothetical 65-year-old male's master policy, comparing the definitional limit calculations under the static and dynamic IIR methods, according to an embodiment;

FIG. 37 is a chart illustrating the application of the GPT method to the same individual and portfolio of policies (e.g., master policy) in FIG. 36, according to an embodiment;

FIG. 40 illustrates an exemplary user interface for a client login page;

FIG. 42 illustrates an exemplary user interface for a new product selection function;

FIG. 43 illustrates an exemplary user interface for a master policy status update process; and FIG. 44 illustrates an exemplary user interface for an existing master policy change simulation process.

Figure 7A:
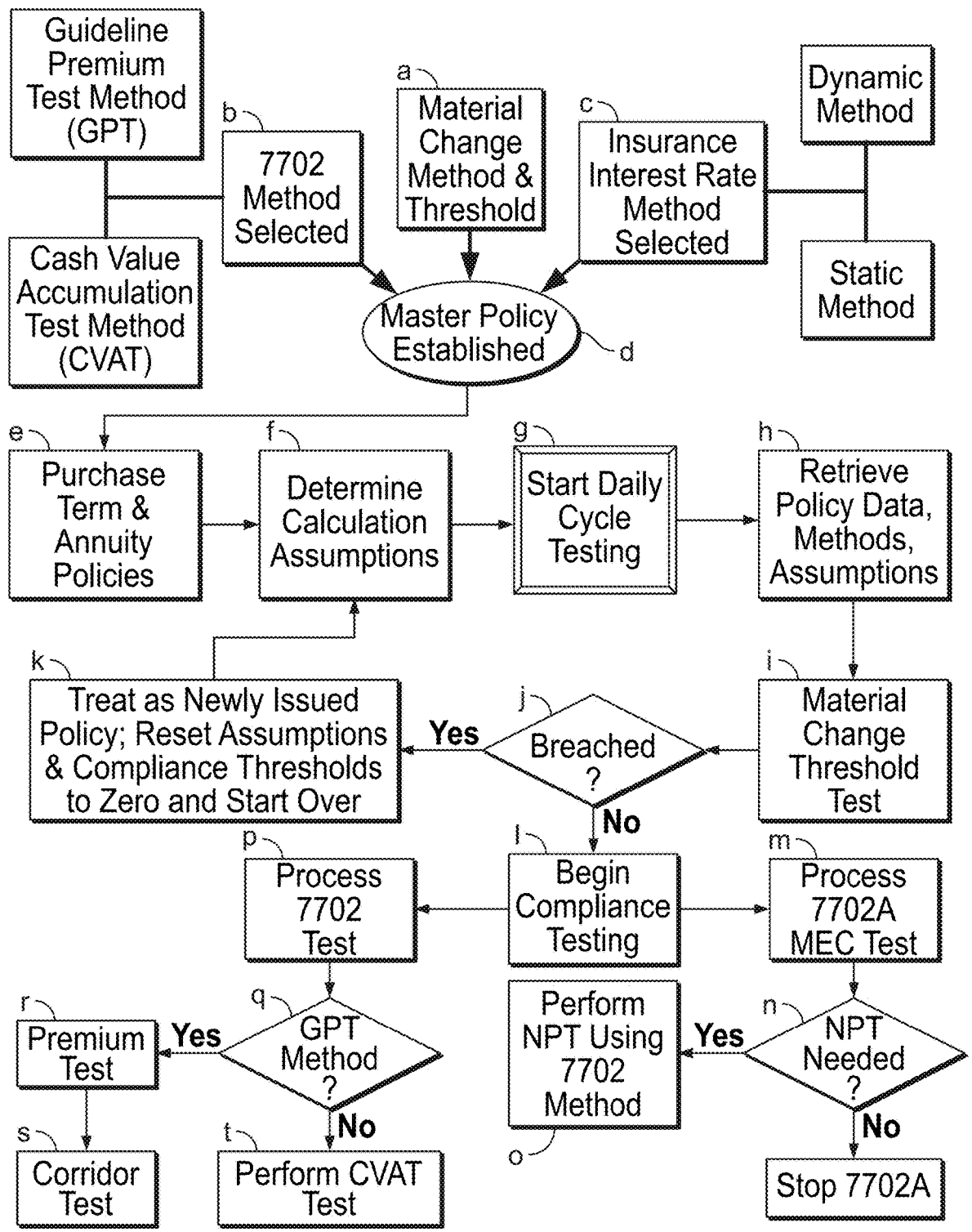
FIG. 7A is a chart providing on overview of the entire compliance process covered in FIGS. 6 through 13, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform: receiving a material change threshold to determine subsequent analysis for a master product; receiving a compliance analysis method corresponding to the master product; receiving an insurance interest rate (IIR) analysis method for the master product; preparing the master product based on (i) the material change threshold, (ii) the compliance analysis method, and (iii) the IIR analysis method; and analyzing the master product by coordinating analysis of data streams from separate computing systems communicatively coupled to different computing networks to determine compliance thresholds, the compliance thresholds corresponding to a level of compliance of the master product.

Various embodiments include a method. The method can be implemented via execution of computing instructions configured to run at one or more processors and configured to be stored at non-transitory computer-readable media. The method can comprise receiving a material change threshold to determine subsequent analysis for a master product; receiving a compliance analysis method corresponding to the master product; receiving an insurance interest rate (IIR) analysis method for the master product; preparing the master product based on (i) the material change threshold, (ii) the compliance analysis method, and (iii) the IIR analysis method; and analyzing the master product by coordinating analysis of data streams from separate computing systems communicatively coupled to different computing networks to determine compliance thresholds, the compliance thresholds corresponding to a level of compliance of the master product.

Embodiments disclosed herein are directed to coordinating analysis of data streams from different companies operating on different computing systems and/or different networks. The coordination of analysis of such data streams, as disclosed herein, provides an individual with a master product (e.g., master policy) that combines one or more individual term policies with one or more individual annuity policies and optionally other qualified benefit policies to create a personalized permanent life insurance product for federal income tax purposes.

Permanent Life Insurance Compliance Process for Federal Income Tax Treatment

Turning to FIG. 7A, a flowchart is illustrated showing the overall process of the embodiments disclosed herein applying the various compliance tests to a portfolio of policies comprising a master policy. FIG. 7A is provided to understand the entire scope of the process described in FIGS. 7 through 13. The process begins with step (a) whereby the method and threshold for determining a policy's classification as a "material change" requiring new issue treatment to an existing policy for compliance testing calculations. Step (a) will be established before any master policies are issued under this invention, either by a regulatory pronouncement or company policy designed to be in compliance with Congressional intent (when regulatory guidance is absent). Step (b) is the compliance method selected by each master policy owner, an irrevocable decision unique to each policy. Step (c) is the insurance interest rate method, either selected by each master policy owner (if the option is given by the regulators when this invention is approved) or the method mandated by the regulators. With the calculation methods determined, a master policy may be established by a new customer in step (d).

Continuing with the process, step (e) involves the policy owner purchasing term and annuity policies to be included in the master policy. Step (f) involves the process to determine the assumption tables that will be used in calculating the "definitional limits" for compliance testing. With the methods and basis for assumptions established and a master policy complete with at least one term policy and one annuity policy, the daily cycle of compliance testing may begin in step (g). The system moves to step (h) to retrieve data on the policies and other relevant information to process the tests. In step (i) the system processes the overall material change threshold test. If the policy has breached the thresholds as determined in step (j), the system moves to step (k) to reset everything, treat the policy as if it were a newly issued policy and go back to step (f) to re-establish new calculation assumptions and restart the daily cycle processing (step (g) again).

If the policy has not experienced enough changes to breach the thresholds, it moves to step (L) to begin additional compliance testing. It starts with step (m) where it performs the MEC compliance testing. Part of the MEC testing is determining whether the Necessary Premium Tests (step n) need to be performed. If so, the system moves to step (o) and performs those tests using the methods consistent with the 7702 method election from step (b).

Once the MEC testing is complete, the system moves to step (p) to perform the 7702 compliance tests. If step (q) determines the policy owner elected the GPT method, the system moves to steps (r) and (s) to perform the premium and corridor tests, respectively. If the policy owner elected the CVAT test under step (b), the system moves to step (t) to compute the compliance tests using that method. This completes the daily compliance test cycle and then moves to step (g) to start the daily cycle of testing on the next day.

Figure 7B:
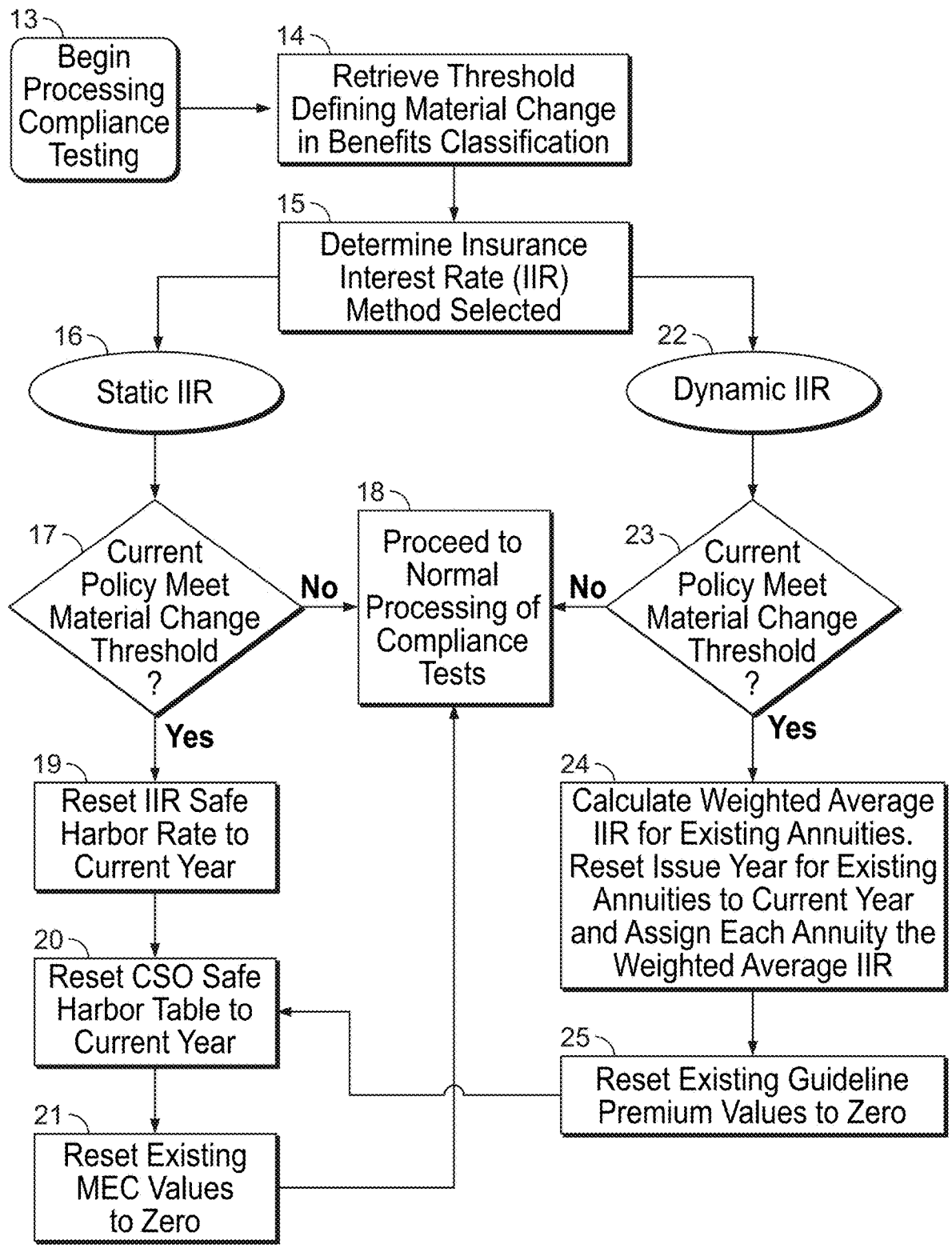
FIG. 7 is a flow chart showing a method and process overview for applying the material change threshold test for applying new issue treatment test and selection of the IIR method, according to an embodiment.

Turning to FIG. 7, a flowchart is provided showing exemplary steps of one embodiment of the invention. The steps may be carried out electronically by a computer which communicates with other computers over a computer network, such as the one shown in FIG. 14 and described below in more detail. The flowchart starts with box 13 where the computer receives the instruction to begin the overall compliance testing. The system then moves to box 14 to retrieve the threshold and testing method that will be used to define if the master product has met the material change in benefits classification and require new issue treatment. Since the testing method might require actuarial calculations, the system moves to box 15 to determine the IIR method for this master product. If the IIR method is static the system branches to step 16 to retrieve the discount rate information under the BR method. The system moves to step 17 to process the material change threshold test that would trigger new issue classification. If the threshold has not been breached, the system moves to box 18 which directs the system to begin normal compliance test processing beginning with box 26 in FIG. 8.

If the threshold has been breached in step 17 the master product undergoes new issue treatment. The system executes box 19 to reset the IIR safe harbor thresholds to the current calendar year and box 20 to reset the CSO safe harbor mortality table. The system then resets the existing MEC values to zero in box 21 in preparation for reestablishing new MEC limits. The system then moves to box 18, signaling the completion of the flowchart for FIG. 7 and moving to FIG. 8 to begin the normal compliance test routine as a newly issued policy.

The flowchart in FIG. 7 shows that if the IIR method in box 15 is the dynamic method then the system begins the cycle in step 22. The system processes the decision step 23 to determine if the material change threshold has been breached. If not then the system proceeds to box 18, signaling the end of the cycle in FIG. 7 and to begin normal compliance testing in FIG. 8. If the threshold has been breached in step 23 then the flowchart moves to box 24 to reset the safe harbor IIR. Since this is the dynamic BR method the system will calculate the weighted average discount rates for the definitional limit calculations. The system will determine the IIR using the existing annuity's current cash values for weighting and use each annuity's issue year based IIR and interest guarantees. Due to the new issue treatment, the existing annuities will be treated as if issued in the current year and assigned the weighted average as their safe harbor IIR. Newly purchased annuities going forward will receive the applicable safe harbor BR based on the published BR for the calendar year of purchase. The flowchart moves to box 25 to reset all existing GPT values to zero in preparation for newly calculated definitional limits. The flowchart moves to box 20 to reset the CSO safe harbor table to the current year, box 21 to reset the MEC premium limits to zero and then move to box 18 to begin the normal compliance test routine as a newly issued policy.

Figure 8:
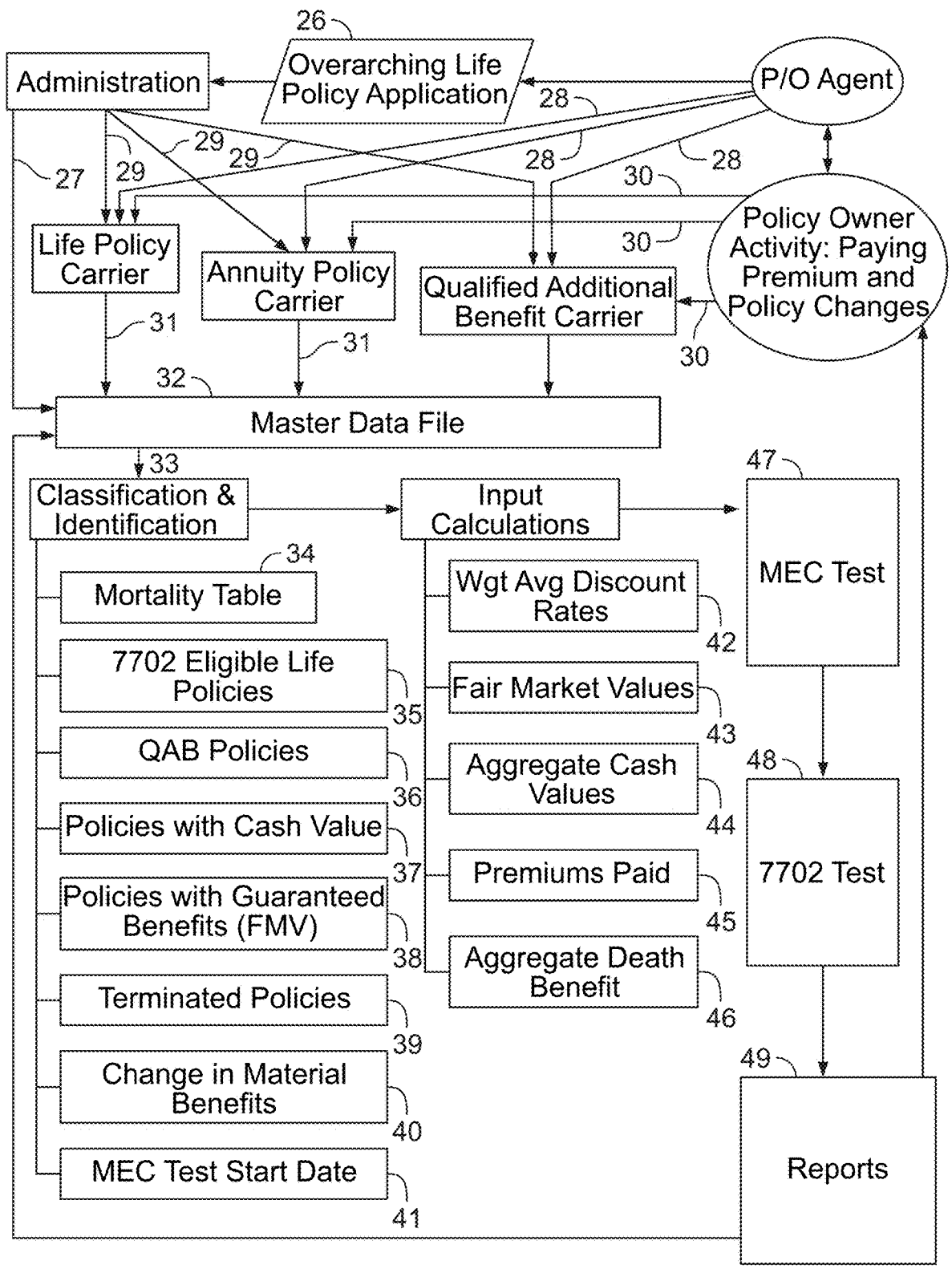
FIG. 8 is a flow chart showing a method and process overview for applying the CVAT, GPT and MEC tests to a portfolio of individual policies, according to an embodiment.

The flowchart in FIG. 8 shows the overall compliance testing process beginning in box 26 with establishing the master product that will ultimately include all the individual term life and annuity policies as well as any qualified additional benefit policies. Administration receives the master product application and uploads the policy owner information to the master data file as shown in box 32. The policy owner (or their licensed agent) submits applications to one or more insurance carriers for one or more types of policies as shown in step 28 and informs administration the policies will be included in the master product. In step 27 administration amends the master data file (box 32) to prepare for incoming data on the policies to be added to the master product. The invention accommodates the ability to stagger the purchases of the individual policies, add multiple individual term life insurance policies and/or multiple individual annuity policies to the master policy.

Step 29 shows administration contacting each insurance company that is issuing a policy within the master product to establish data feeds on policy activity and information. The data feeds provide individual policy information to administration on a periodic basis, such as weekly, daily, or continuously in real time. Step 30 shows the policy owner paying premium to the respective insurance companies on the policies and generally notifying the insurance companies of any policy changes requested.

Insurance companies administering the underlying individual policies send data feeds periodically (e.g., daily) in step 31 to the master data file in box 32 on all necessary policy data information and activity including but not limited to premium paid, cash values, changes in benefits, interest rate guarantee and expense information needed to perform the compliance tests.

Step 33 represents the computer accessing the master data file to classify and identify information on all the active and previously active (e.g., terminated) individual policies assigned to a master product. Box 34 represents the computer selecting and storing the appropriate regulatory safe harbor CSO mortality table to be used in all actuarial definitional limit calculations.

In box 35 the computer cycles through all the individual life insurance policies to determine which policies qualify for inclusion in 7702 processing as permanent life insurance. In box 36 the computer identifies all other individual policies to determine which policies will be included in all compliance tests as qualified additional benefits. In box 37 the computer identifies which annuity policies have explicit cash value benefits and therefore will be needed to process calculations in boxes 42, 43, 44 and 46.

In box 38 the computer reviews the guaranteed benefits and other features of all individual policies to determine which policies will require a fair market value calculation in box 43 processing. In box 39 the computer identifies all individual policies assigned to the master product that are no longer active (e.g., policies that once were part of the master product but now have been terminated). Identification of terminated policies will be needed in box 45 processing for calculating net premiums paid on those policies and including such values in the MEC, NPT and GPT tests. In box 40 the current master data file in box 32 is reviewed to determine if there has been any material change in benefits that will impact the compliance testing.

Processing in box 41 involves accessing the master data file and prior MEC and NPT testing in box 47 to identify the active MEC testing start date. Since certain events can cause the 7-pay testing period to start over, the system must identify the most current official starting date for MEC testing. Box 42 involves computing of the weighted average discount rates for all active individual annuity policies in the master product that have cash values (policies identified in box 37) utilizing each annuity policy's guaranteed credited rates and applicable IIR safe harbor rate. Box 43 involves computing the fair market values for all individual policies flagged in box 38. Box 44 includes computing the aggregate cash value for all active annuity policies in the master product by retrieving current cash values (box 37) and fair market values (box 38), taking the greater of the two for each policy and storing that value for the cash value compliance testing in the CVAT method or the corridor test under the GPT method.

Box 45 represents the system computing the premiums paid on all the individual policies under the master product for all active and terminated individual policies (box 39). Box 46 represents computing the aggregate death benefit on all individual life and annuity policies under the master product on the effective date of the compliance test. Calculated data from box 46 processing will be used in box 47 (MEC) and box 48 (CVAT or GPT) processing. Box 47 represents the overall MEC test (including the NPT) and is covered in greater detail in FIG. 9. Within the MEC test, the NPT is processed in FIG. 10 if the master policy is applying the CVAT method or FIG. 11 if the master policy is applying the GPT method. Box 48 represents the overall 7702 test method and are covered in greater detail in FIG. 12 (CVAT) and FIG. 13 (GPT). Reports containing the results of all compliance tests are processed by the system in box 49, stored in box 32 and communicated to the policy owner as needed.

Figure 9:
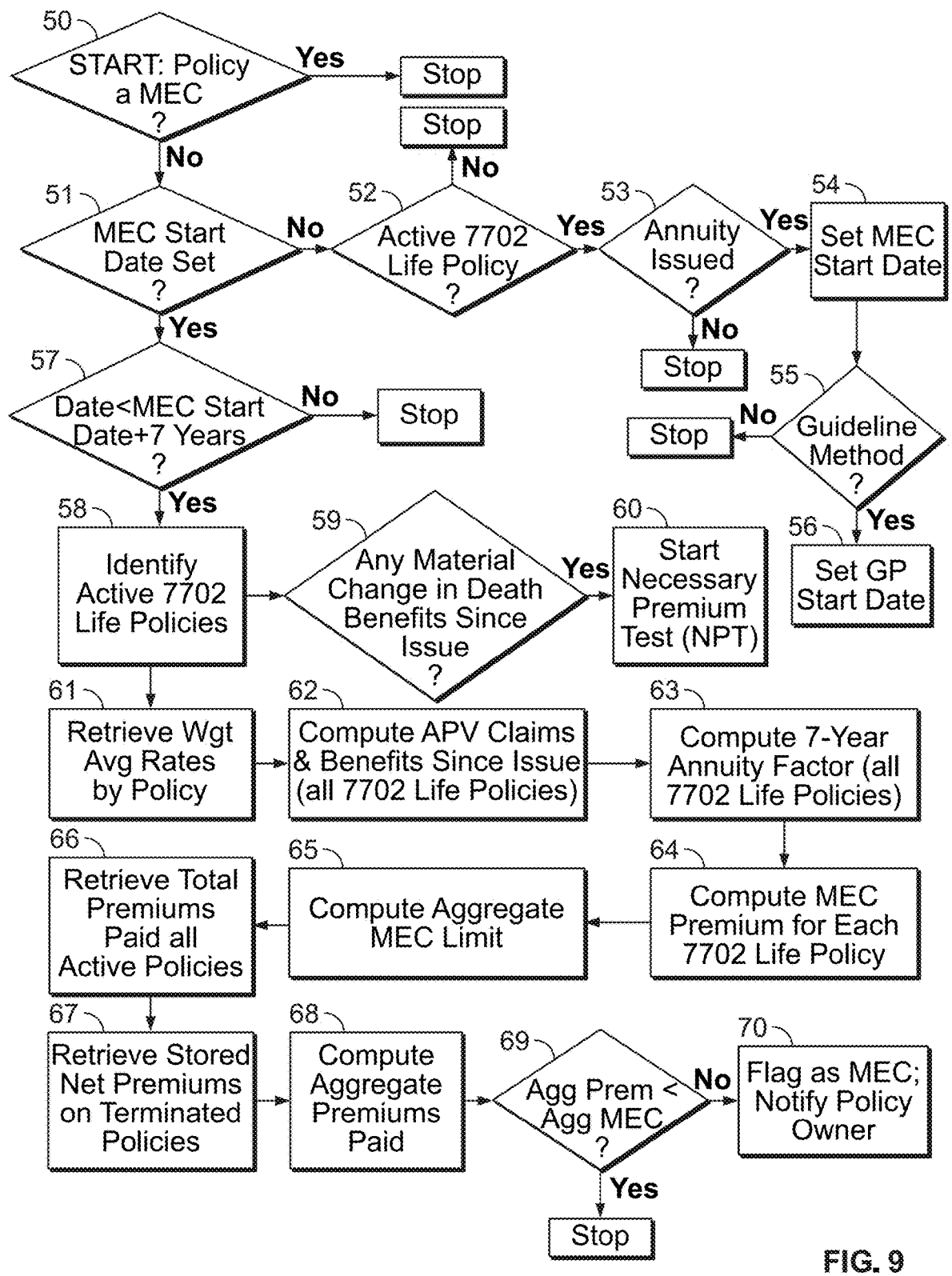
FIG. 9 is a flow chart showing a method and process overview for applying the MEC test to a portfolio of individual policies, according to an embodiment.

FIG. 9 is a detailed flowchart showing the MEC processing on a portfolio of individual life, annuity and qualified additional benefit policies (i.e., the master product). The processing starts with box 50 wherein the system checks with the master product's current classification and whether the product has already been deemed a MEC. If so, the system stops and does not process any more steps in FIG. 9.

In step 51 the system looks to box 41 in FIG. 8 to ascertain if a MEC start date has been established. If not, the system proceeds to step 52 to review the information from box 35 to determine if there is an active life insurance policy eligible for section 7702 qualification. If there is not an active policy, the system stops all processing for this MEC sub-routine. This situation could occur if an annuity has been purchased and assigned to the master product before a term life policy has been issued and assigned. If the answer is yes to step 52, then the system moves to step 53 to determine if an individual annuity policy has been added to the master product. If the answer is no, then the system stops the sub-routine. The master product cannot be eligible as permanent life insurance until there is at least one term policy and one annuity policy.

In box 54, the system sets the MEC start date to be the same as the issue date for the individual annuity purchased or otherwise added to the master product. In step 55, the system retrieves the policy owner's decision on which section 7702 compliance method should be applied. If the policy owner selected GPT then the system sets the start date for the GPT method in step 56 to be the same as the MEC start date from box 54.

The system moves to step 57 to determine if the current testing date is still within the required testing MEC testing period. If yes, the system proceeds to box 58 otherwise the MEC testing sub-routine stops and moves to box 48 in FIG. 8 to begin the 7702 testing.

Box 58 involves the system retrieving the files on all active 7702 individual life insurance policies assigned to the master product from box 35. In step 59 the system reviews the policy data file from box 58 and determines if the master product experienced any material change in benefits that would cause the MEC's 7-year testing period to start over. If a material change is identified, box 60 is instructed to process the NPT in FIG. 10 if the master policy is operating under the CVAT method or FIG. 11 if the master policy is operating under the GPT method.

Figure 10:
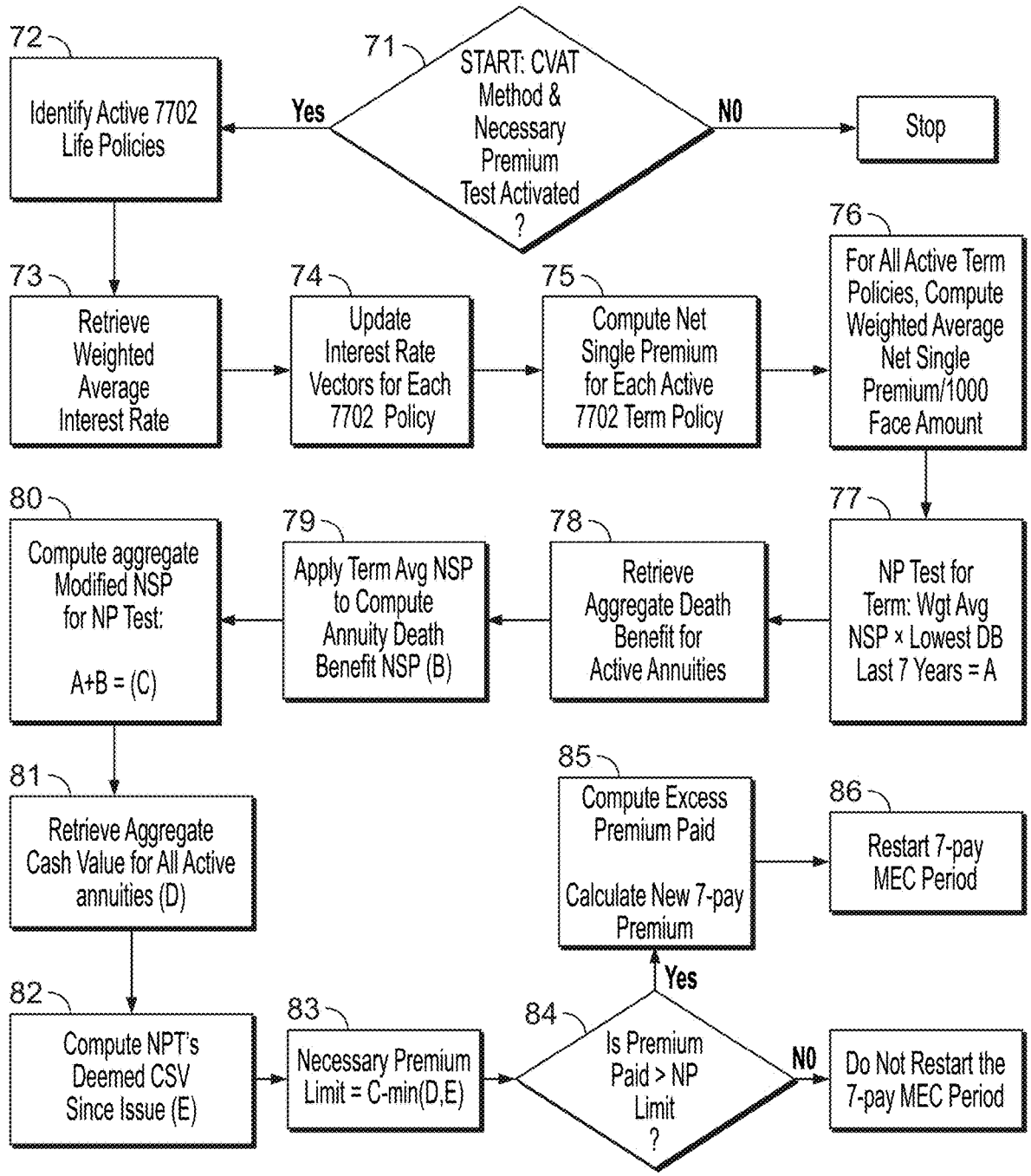
FIG. 10 is a flow chart showing a method and process overview for MEC's NPT under the CVAT method, according to an embodiment.

The flowchart for the system to process the NPT under the CVAT method is described in FIG. 10 starting with box 71. For those skilled in the art of 7702 compliance rules will appreciate that the flowchart in FIG. 10 describes a similar process as that described under FIG. 12. The difference is special rules for the NPT to allow small changes in benefits to defer and/or bypass the restart of the 7-pay MEC testing period if premium payments are low enough relative to the death benefits in the prior 7 years. If CVAT is the compliance test method and the NPT has been activated from box 60 the system moves to box 72 to identify the active 7702 life policies. The system processes for steps 73 through 76 are the same as steps 104 through 107 in FIG. 12. Step 77 is the unique test under NPT by computing the weighted average net single premium (NSP) for the lowest death benefits in the prior 7 years. Steps 78 through 81 are the same as steps 108 through 111 for the CVAT test in FIG. 12. Step 82 is unique to the NPT by instructing the system to calculate a "deemed cash value" since the master product was initially established and use the "deemed cash value" in the forthcoming NPT definitional limit test instead of the master product's actual aggregate cash value. In step 83 the system computes the necessary premium definitional limit from the values computed in steps 80, 81 and 82. Step 84 compares the most recent premium paid to the definitional premium limit calculated by the system in step 83. If the premium paid breached the NPT limit, the system moves to step 85 to compute the amount of the excess premium paid and the new 7-pay premium. The system moves to step 86 to restart the 7-pay MEC period. The change in the MEC start date gets logged in box 41.

Figure 11:
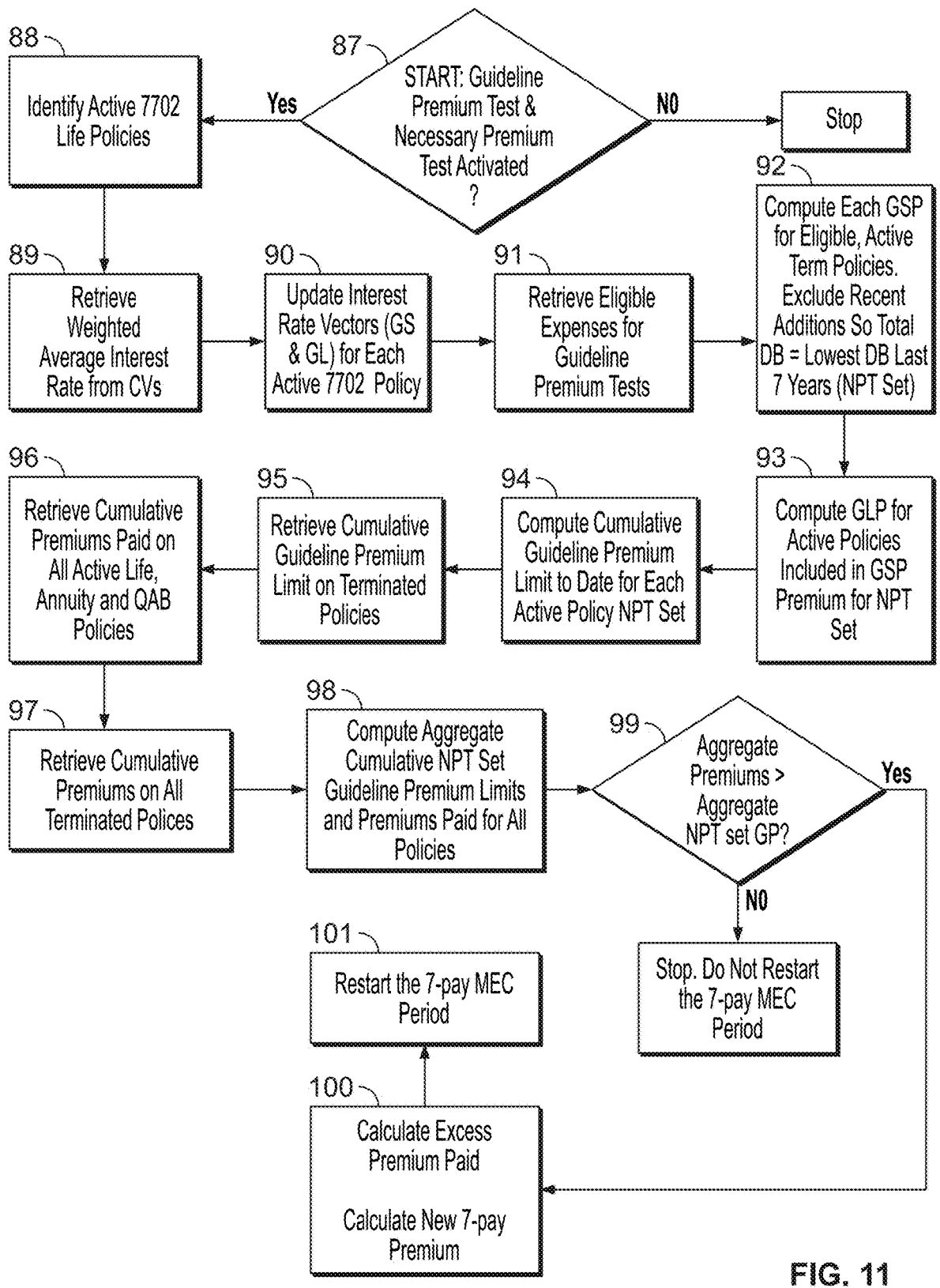
FIG. 11 is a flow chart showing a method and process overview for MEC's NPT under the GPT method, according to an embodiment.

The flowchart for the system to process the NPT under GPT is described in FIG. 11 starting with box 87. The flowchart for FIG. 11 mirrors the process in FIG. 13 except for the special rules for NPT. Steps 88 through 91 are the same as steps 115 through 118 in FIG. 13. Step 92 is unique to the NPT because the system must examine the historical profile of the death benefits and use the lowest recorded amount in the prior 7 years, classifies and records these death benefits as the "NPT set". Step 93 computes the guideline premium limit for the NPT set from step 92. Step 94 computes the cumulative premium limit. Step 95 retrieves cumulative limits on terminated policies. Steps 96 and 97 retrieve premium paid information on active and terminated policies, respectively. Step 98 computes the aggregate premiums paid and the aggregate guideline premium limit for the NPT set. Step 99 compares the premiums paid to the NPT set limit. If the NPT premium threshold has not been breached, the system stops and does not restart the 7-pay MEC period. If the threshold has been breached, the system moves to box 100 to calculate the amount of excess premium paid and the new 7-pay premium limit. The system moves to step 101 to restart the 7-pay MEC period. The change in the MEC start date is recorded in box 41.

Upon completion of any NPT testing, the system reverts to box 61 to retrieve the current weighted average discount interest rates on all cash value policies computed in box 42. In box 62 the system computes the actuarial present value of death claims and maturity benefits for all active 7702 life insurance policies. Box 63 involves computing the 7-year annuity factor for all active and terminated eligible 7702 individual life policies using the respective discount rates computed in box 42. In box 64 the system computes the MEC premium for compliance testing for each active and terminated 7702 eligible individual life insurance policy.

The system adds up the MEC premium for every policy computed in box 64 to determine the aggregate MEC limit for the master policy in box 65.

Box 66 represents the first step for the system to retrieve the actual premium paid on all individual policies ever assigned to the master product from box 45. Next, the system retrieves all net premium paid on terminated policies in box 67 from the data calculated and stored in box 39. The system combines the results from box 66 and 67 in box 68 to compute the aggregate premium for the master policy to be used for the MEC test. The system processes the MEC test in box 69 by comparing the aggregate premium paid from box 68 to the aggregate MEC premium from box 65. If the test fails, the system moves to box 70 to flag the master policy as a MEC and notify the policy owner of the test failure and identify any potential remedies. If the test is successful in box 69, the system stops the processing for the MEC testing.

Figure 12:
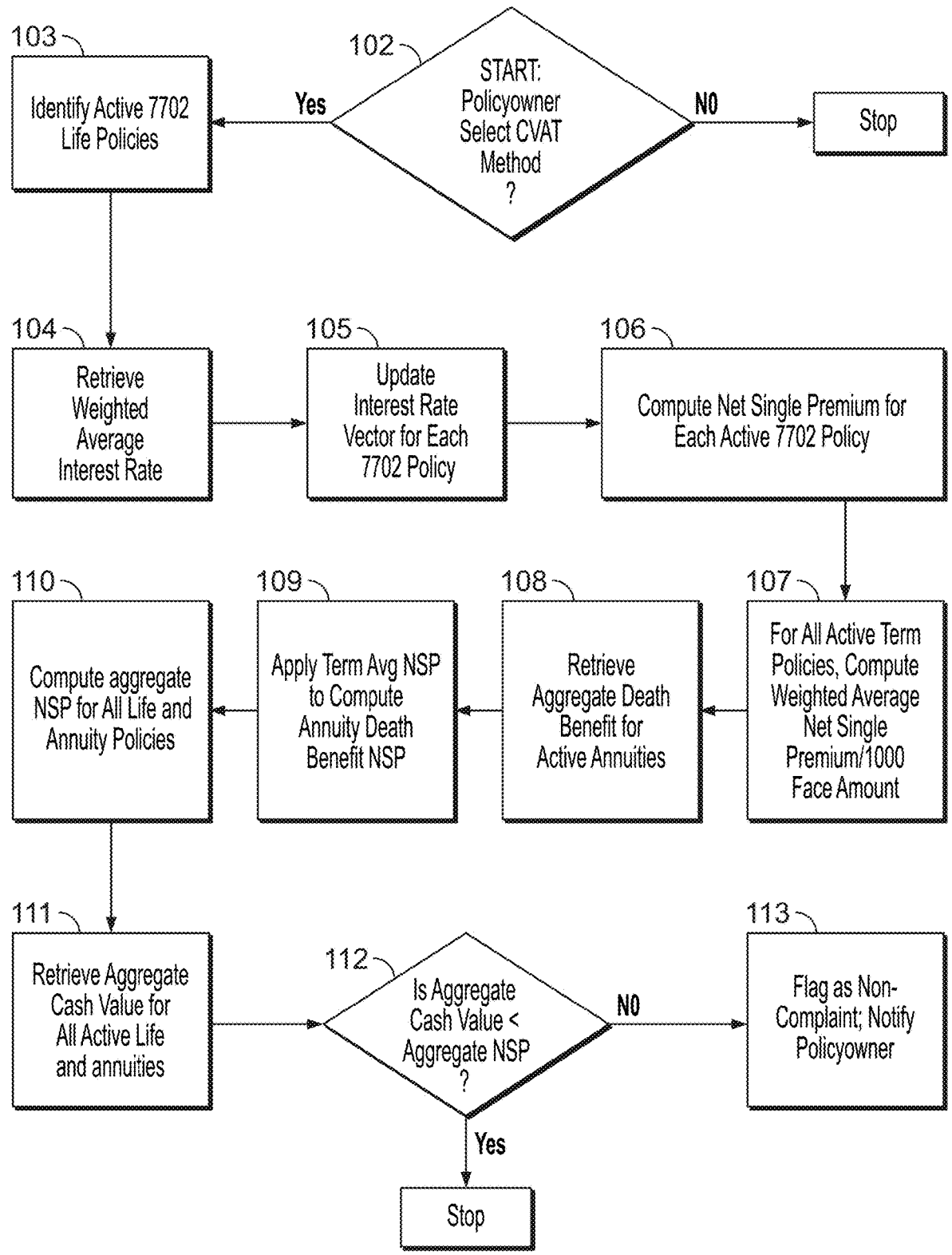
FIG. 12 is a flow chart showing a method and process overview for applying the CVAT method to a portfolio of individual policies, according to an embodiment.

FIG. 12 is a flowchart showing the method and process of the major steps to apply the CVAT method to a portfolio of individual policies in a master product. The process starts with step 102 to determine if the policy owner selected CVAT as the testing method. If not, the system stops CVAT method processing and moves to the GPT method processing starting with step 114 in FIG. 13. Processing the CVAT method begins in box 103 with the system retrieving information on all active 7702 individual life insurance policies assembled in box 35. Next, the system moves to box 104 to retrieve the current weighted average discount rates on all active cash value policies from box 42 and then updates the system records for processing the actuarial calculations in box 105. The system moves to box 106 to compute the NSP for each active qualifying life insurance policy using the updated discount rates from step 105. Since the CVAT method is prospective looking only, any terminated policy that the master product once contained does not get included in this calculation.

Box 107 represents the system collecting the NSP per 1000 rates for all active 7702 eligible term life insurance policies from box 106 processing to determine a face-amount weighted average NSP per 1000 factor. Box 108 represents the system retrieving the aggregate death benefit for all active annuities from box 46. In box 109 operations, the system computes the NSP for active annuities whose cash value is a death benefit that is additive to term policies (e.g., an increasing death benefit structure) by applying the weighted average NSP from box 107 to the active, applicable annuities from box 108. The result from box 109 is the NSP contribution from annuities to the master product's aggregate compliance limit on cash value. In box 110 the system combines the results from box 106 (NSPs for all the active life insurance policies) with the NSP for the applicable annuity death benefits (box 109) to determine the aggregate NSP for the master product.

In box 111 the system retrieves the aggregate cash value for all active individual life and annuity policies from box 44, modified appropriately for any policies with a fair market value exceeding its stated cash value (box 43). Step 112 involves comparing the aggregate cash value from all individual policies in the master product to the aggregate NSP from box 110. If the master product fails the test, the system moves to box 113 operations to flag the master product as non-compliant, notify the policy owner of the situation (step 49) and identify any potential remedies. If the system determines the master product is compliant in step 112, the compliance test cycle has been completed.

Figure 13:
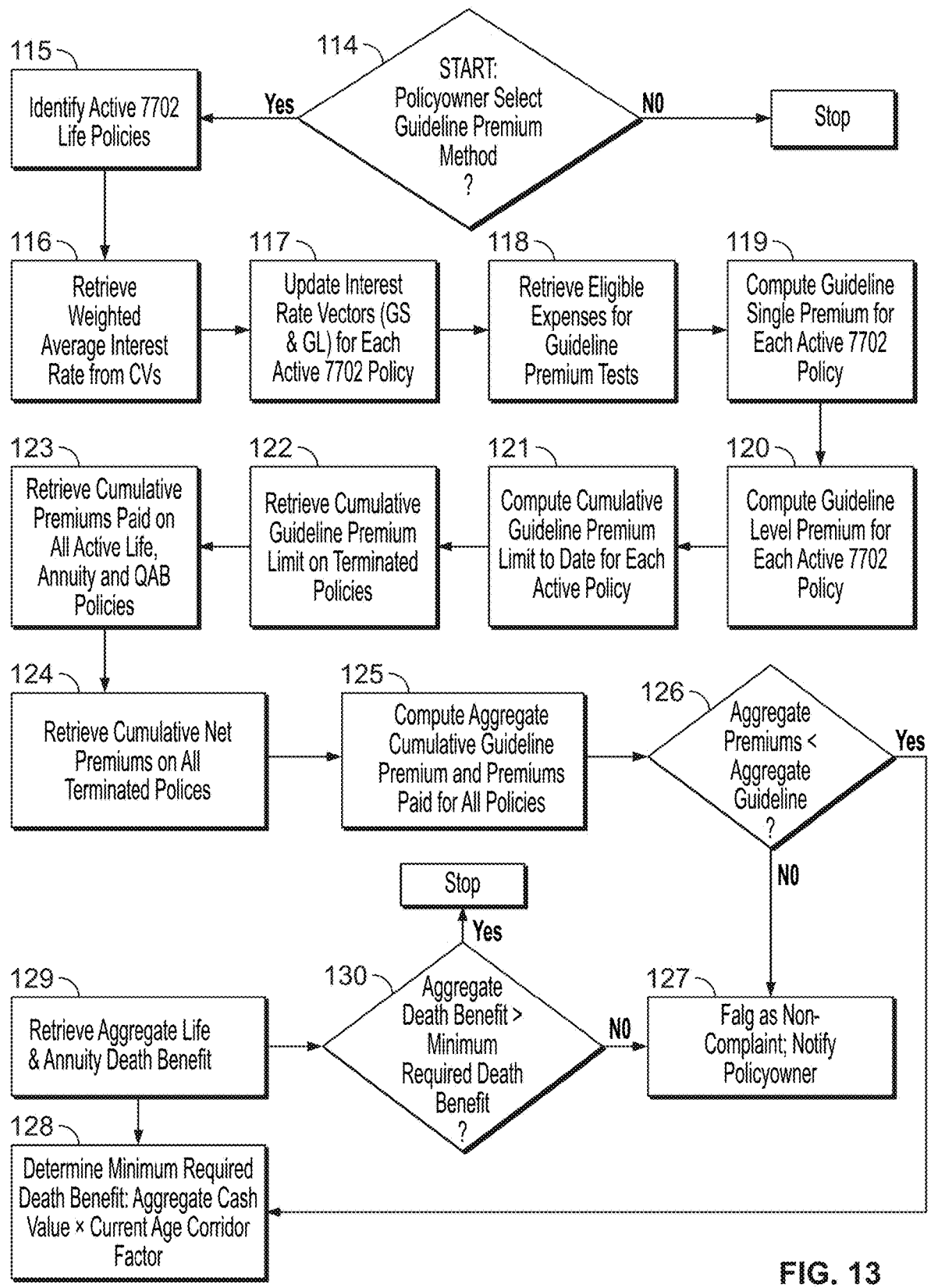
FIG. 13 is a flow chart showing a method and process overview for applying the GPT method for a portfolio of individual policies, according to an embodiment.

FIG. 13 is a flowchart showing the method and process of the major steps to apply the GPT to a portfolio of individual policies in a master product. The system processes more steps for GPT method than the CVAT method for two key reasons. First, GPT allows for certain expenses to be included in the definitional limit calculations whereas CVAT does not allow expenses. Second, the GPT method requires calculating both a GSP and GLP and then determine a cumulative definitional premium limit from these two inputs on the testing date. Finally, the GPT method also has the secondary cash value corridor test.

The GPT method process starts with step 114 to determine if the policy owner selected GPT as the testing method for its master product. If not, the system stops processing. If yes, the system moves to box 115 to identify all eligible active life insurance policies within the master product from box 35. Next, the system moves to box 116 to retrieve the weighted average discount rates from box 42 that will be used to compute the definitional limit calculations. Once retrieved, the system moves to box 117 to update the interest rate vectors for the GSP and the GLP for every active, eligible term life insurance policy identified in box 115. Next, the system moves to box 118 to retrieve the eligible expenses to be included in the definitional limit calculations. Boxes 119 and 120 represent the application of the concepts and formulas listed in FIG. 5 to compute the GSP and GLP, respectively, for every eligible term life insurance policy in the master product.

The system combines the results from box 119 and box 120 in box 121 to calculate the definitional premium limit on every policy. The cumulative limit represents the greater of the GSP and GLP for every year the underlying life insurance policy has been in-force. The cumulative premium limit gets updated daily and will start increasing once the cumulative sum of the GLPs exceed the GSP. Once a policy is terminated, the cumulative guideline premium for the terminated policy is stored in the master data file and retrieved by box 39. Box 122 operations involve retrieving the guideline premium information on terminated policies.

The system retrieves the cumulative premiums paid on all active life, annuity and qualified additional benefit policies in box 123 on the testing date from box 45. Next, the system retrieves premium paid information from terminated policies in box 124. In preparation for the definitional premium limit test for GPT, the system combines the results from box 123 and box 124 in box 125 to compute the total premiums paid into the master product and cumulative GP limits for all active and terminated policies. The system processes the comparison test in Step 126. If the aggregate premiums paid exceed the aggregated cumulative guideline premiums from box 121 and 122 the master product fails the definitional limit test and moves to box 127 to flag the policy as non-compliant, notify the policy owner in box 127, and identify any potential remedies.

If the master product passes the GPT in step 126, the system moves to the box 128 to determine the minimum required death benefit for the master product to pass the corridor test. The system retrieves the aggregate cash value for all active policies from box 44 and multiplies that result by the corridor factor from FIG. 3 for the insured's age. Box 129 represents retrieving the aggregate life and annuity death benefit from box 46. Step 130 is the second test in the GPT method. If the aggregate death benefit exceeds the required minimum calculated in box 128, the master policy is compliant with the 7702 limits. If not, the system moves to box 127 to flag the master product as non-compliant, notify the policy owner in box 49, and identify any potential remedies.

It will be appreciated that each step of the present invention may be implemented with a computer or computer-based network. A computer processing unit represented by box 134 may be specifically programmed to carry out the steps described above and store information related thereto. For example, a computer may be used to store data related to the policy including data about the policy owner and beneficiary. Further, a computer is necessary to assist with most of the numerous calculations in the various steps in FIG. 7 through FIG. 13. Thus, embodiments within the scope of the present invention include program products comprising computer-readable media for carrying or having computer executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical storage, magnetic disk storage or other magnetic storage devices, or any other medium which can be used to carry or store desired program code in the form of computer-executable instructions or data structure and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In addition to a system, the invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. In one embodiment, users such as insurance agents, policy owners, and beneficiaries may be able to access the network to provide and receive information about the individual policies or master product.

The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random-access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and Web implementations of the present invention could be accomplished with standard programming techniques with rule-based logic and other logic to accomplish the various database searching steps, correlation steps, comparison steps and decision steps. It should also be noted that the words "component" or "module" as used herein is intended to encompass implementations using one or more lines of software code, and/or hardware implementations, and/or equipment for receiving manual inputs.

Figure 14:
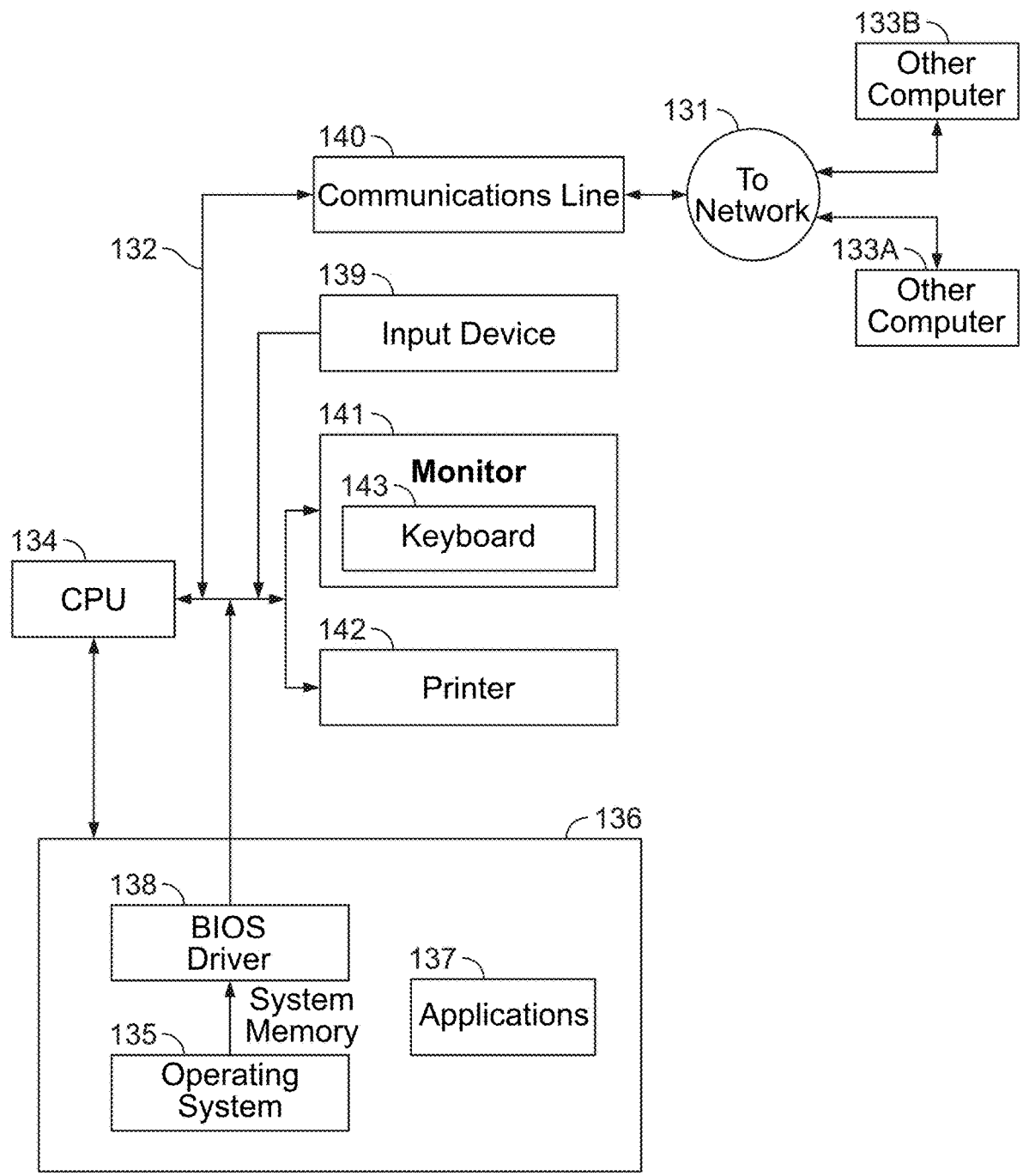
FIG. 14 is a block diagram illustrating the components of a computing system connected to an electronic network, according to an embodiment.

FIG. 14 illustrates the components of a general purpose computing system connected to a general purpose electronic network (item 131), such as a computer network. The computer network can be a virtual private network or a public network, such as the Internet. As shown in FIG. 14, the computer system (item 132) includes a central processing unit (CPU) (box 134) connected to a system memory (item 136). The system memory (item 136) typically contains an operating system (item 135), a BIOS driver (item 138), and application programs (item 137). In addition, the computer system (item 132) contains input devices (item 139) such as a mouse or a keyboard (item 143), and output devices such as a printer (item 142) and a display monitor (item 141), and a permanent data store, such as a database (box 32). The computer system generally includes a communications interface (item 140) to communicate to the electronic network (item 131). Other computer systems (items 133A and 133B) also connect to the electronic network (item 131) which can be implemented as a Wide Area Network (WAN) or as an internetwork, such as the Internet. In some embodiments, the other computer systems (items 133A and 133B) can be other policy product companies. Data is stored either in many local repositories and synchronized with a central warehouse optimized for queries and for reporting or is stored centrally in a dual use database. This system is one example of a system that could execute the method steps set forth above.

Examples of the Invention

FIGS. 15 through 37 illustrate examples of the application of the CVAT, GPT and MEC tests to a portfolio of individual term life insurance and annuity policies. The basic computational formulas are described in FIG. 5 upon which adjustments are made within the rules and spirit of IRC section 7702 for a portfolio of policies. The examples show the detailed calculations for computing the definitional limits such as the MEC premium, the cash value limits under the CVAT method, the GSP limit under the GPT method, the GLP under the GPT method for both a level and increasing death benefit structure, and the cumulative guideline premium limits by year assuming an increasing death benefit structure (e.g., the death benefit is the term policy face amount and the annuity cash value).

Note that in all these examples, cash value and account value are used interchangeably although in practice there is a difference to due surrender charges. For most annuities sold today, the death benefit is the account value. It is possible for an annuity death benefit to be the cash value after application of the surrender charge.

The examples were selected to illustrate a hypothetical 45-year-old male purchasing YRT and 30YT policies to observe the respective differences in the calculated definitional limits. Furthermore, many of the comparisons are shown applying both the static and dynamic IIR methods with assumed changes in the safe harbor IIR to observe the impact. The examples show different annuities purchased in different years with strong initial guaranteed credited rates to illustrate the impact on calculated definitional limits from different discount rates.

One example is provided to illustrate the recognition of a significant material change in benefits such that the new issue treatment applies. The example assumed a new CSO safe harbor mortality table had been adopted along with a change in the safe harbor IIR so the impact on definitional limits can be observed under the given assumptions.

One example is provided to illustrate an annuity with a GMWB and the potential impact on a fair market value that exceeds the stated cash value. The IRS rules on section 7702 do not define how to calculate "fair market value". The patent application does not claim the example provided herein is the only method; the point is to illustrate how a fair market value (however determined) would be incorporated into the master product compliance testing.

The illustrations conclude by assuming the hypothetical 45-year-old male individual is now age 65 and the system is processing the CVAT and GPT methods on the master product. The example illustrates the original 30YT, a YRT policy purchased at age 60, a traditional deferred annuity and a deferred annuity with a GMWB. Each compliance test method is illustrated under both the static and dynamic IIR method.

The first example is a YRT policy using a static IIR method. FIG. 15 shows yearly details of assumptions used to compute the various definitional limits. FIG. 15 shows the MEC and CVAT method calculations while FIG. 16 shows the GSP and two GLP calculations. Each column is described herein to better understand its role in the calculations, applying the formulas from FIG. 5. Examples in other figures will only highlight selected definitional limit calculations and the differences driving the results.

For YRT policies the premiums are typically not guaranteed to be less than the CSO safe harbor mortality table. Therefore, the policy's non-guaranteed premiums are not shown since they do not impact the definitional limit calculations. Column 144 shows policy expenses which are allowed in the GPT method calculations. Column 145 is the 2017 CSO safe harbor mortality rates for a nonsmoking male. Column 146 is the survival probability rate to the end of each year based on the mortality rates in column 145. Column 147 is the discount rate used in all the calculations for the MEC, CVAT and GL tests. This discount rate ties to the IIR in this example and does not reflect any annuities with guaranteed rates higher than the safe harbor BR. Column 148 is an interest rate factor applied to the expected death claims to adjust the discounted values for an immediate payment of claims assumption. Column 149 is the discounting factor back to current age 45. Columns 150 through 152 are the same as columns 147 through 149 except it uses the higher safe harbor BR rate allowed for the GSP calculation.

The rest of the columns for FIG. 15 show all the actuarial values used to compute the definitional limits for the MEC premium and CVAT cash value limits. Column 153 represents the actuarial present value of the guaranteed mortality charges. Column 154 is the actuarial present value of the presumed endowment amount for the policy's face amount at the beginning of age 95 (the earliest age allowed by the regulations). Column 155 is the calculation of the 7-pay annuity that is used to compute the 7-pay MEC premium. Item 156 utilizes the values in columns 153-155 to compute the 7-pay MEC premium. To compute the CVAT net single premium, the calculations use the present value of the mortality charges (column 157) and endowment benefit (column 158). At policy issue the maximum cash value allowed to qualify as life insurance is $247,339 (item 160) which is the sum of the values in column 157 and 158 (e.g., the actuarial present value of the mortality charges and the endowment benefit).

Each year's maximum cash value allowed is shown in column 159—the NSP at that age which is the actuarial present value of future guaranteed mortality charges and the age 95 endowment benefit under the mortality assumptions from column 145 and the interest assumptions in columns 147-149. Item 160B is highlighted for a future example reference. The current age 60 maximum cash value allowed per 1000 of death benefit is $408.11. If the policy owner selected a level death benefit structure (e.g., the YRT policy's death benefit would decrease by the amount of the annuity cash value so the total death benefit was level) then the maximum allowed annuity cash value at age 60 would be $408,211 for a $1 million policy. If the policy selected an increasing death benefit structure (e.g., the YRT policy's death benefit would be a fixed amount and the annuity cash value would be an additional death benefit), the maximum annuity cash value would be (YRT face amount+annuity cash value)×$408.11/1000).

FIG. 16 is a continuation of FIG. 15 showing the detailed calculations for all three GPT calculations. The GSP calculations are shown in columns 161-163 and the final GSP definitional limit is item 164; same process as the CVAT calculations except GSP uses the interest rate factors in columns 150-152 and GSP may use eligible expenses in the definitional limit calculation (column 162). In this example for the $1 million YRT policy to age male age 45, the GSP is $138,527. This represents the maximum amount of premium that could be paid into the policy in to qualify as life insurance until future years when the cumulative sum of the GLP becomes larger than the GSP. Note that if the policy owner paid this much premium in the first year, the $39,845 MEC premium would be breached so the policy would forever be flagged as a MEC, taxed like an annuity for distributions but still receive permanent life insurance tax treatment for death benefits.

Columns 165 through 168 show the details to calculate the GLP (item 169) for a level death benefit policy structure.

Note that column 166 shows the present value of the eligible expenses from column 144. Column 168 is the annuity factor used to calculate the GLP from issue age 45 to age 95 using the applicable mortality and interest rates. Columns 170 through 173 show the details to calculate the GLP for an increasing death benefit policy structure (item 174). Note that the level premium allowed for the increasing death benefit structure ($30,325) (item 174) is significantly higher than the level death benefit plan ($13,154) due to the higher expected mortality costs from the increasing death benefit structure.

Column 175 in FIG. 16 illustrates the year-by-year GPT definitional premium limit assuming an increasing death benefit structure. As described in the formulas in FIG. 5, the cumulative premium limit is the greater of the GSP (item 164) and the GLP (item 174) multiplied by the number of years the policy has been in force. For example, item 175B is the cumulative premium definitional limit after 6 years: greater of $138,527 or ($30,325×6=$181,947). Column 176 shows the corridor factor for each attained age to compute the corridor test required to pass the GPT method. For example, at age 55 (item 176B) the GPT stipulates that the death benefit must be at least 150% of the aggregate policy cash value. The corridor test factors are the same for level or increasing death benefit plans.

The compliance process starts on FIG. 7 with the overall material change in benefits test in step 14 to determine if new issue treatment applies and the safe harbor limits are reset to the current year requirements. FIG. 17 illustrates such a potential impact to the definitional limits from resetting the safe harbor CSO table to a new table with 15% lower mortality rates as well as the safe harbor BR reset from 4% to 2%. The example assumes a YRT policy where the policy owner is now age 60. This example facilitates comparison to FIG. 15 where the insured was age 45 at purchase but now is age 60 and the policy has the safe harbor references reset. For comparative simplicity it is assumed the death benefit is $1 million in both FIGS. 15 and 17.

The hypothetical new CSO mortality rates are shown in column 177. The new safe harbor BR rates are shown in item 178. The first comparison is the MEC premium limit (item 179) of $94,218 vs. $138,527 before the new issue treatment. This policy's 7-pay MEC premium would restart due to new issue treatment. Item 180 is the age 60 maximum cash value per 1000 of death benefit ($613.301) which is materially higher than the amount in item 160B ($408.211). The lower mortality table used in the definitional limit calculations decreased the definitional limits but the lower BR safe harbor rate would increase the definitional limits. If the reverse had occurred (e.g., a new issue treatment resulting in the IIR increasing), the CVAT cash value limit would have decreased and potentially trigger a compliance violation if the master product had too much cash value. Remediation would be required by forcing distribution of cash value to stay under the revised definitional cash value limit.

FIG. 18 shows the revised definitional limits for GPT for this hypothetical YRT policy undergoing new issue treatment at age 60. Prior to the new issue treatment trigger, the cumulative GPT limit for age 60 was $485,192 (item 175C). After the new issue treatment trigger, the age 60 limit is $393,437 (item 183A) which is the GSP for a newly issued policy at this age (item 181). The revised GLP limits (item 182B) does not begin increasing the cumulative GPT limits until age 65.

FIGS. 19 and 20 is identical to the example in FIGS. 15 & 16 except the underlying product is 30YT instead of YRT. The premium guarantees on 30YT impact the definitional limit calculations when the guaranteed level premium is less than the CSO safe harbor mortality rate. Column 184 shows the assumed premium that is guaranteed and level for 30 years. The MEC premium, item 185, is $31,651 due to the guarantees vs. $39,845 (item 156; FIG. 14). Similar reduction in definitional limit for the age 45 CVAT cash value is also observed: $196,474 (item 186), a decrease from $247,339 (item 160). The GSP is also lower: $106,209 (item 187) vs. $138,527 (item 164). The GLPs are also lower: $10,467 (item 188) vs. $13,154 (item 169) for the level death benefit structure, and $27,509 (item 189) vs. $30,325 (item 174) for the increasing death benefit structure. The cumulative premium limits for the GPT are shown in column 190. By age 60 the cumulative definitional limit under GPT is $440,145 (item 190B) for the 30YT vs. $485,192 (item 175C) for the YRT policy. In this comparative case, the 30YT product has a $45,000 lower cumulative premium limit after 15 years (age 45 to age 60) due to the presence of the term premium guarantees being lower than the CSO safe harbor mortality rates in many years.

The charts in FIG. 21 illustrate how the discount rates used in the definitional limit calculations are calculated when applying the static and dynamic BR methods. The chart also illustrates the static and dynamic method for a master product that purchased two annuities in different calendar years when the safe harbor BR changed. To illustrate the application of the methodology, the example assumes one annuity purchased in 2020 when the BR was 4% (items 191 and 193) and a second annuity is purchased in 2021 when the IIR was 2% (items 192 and 194). Regulations require that the discount rate for any given duration (e.g., future year in the present value calculation) is the lessor of the policy's guaranteed credited rate that year and the applicable safe harbor BR rate. These hypothetical examples assume guarantee rates higher than the safe harbor IIR.

The system calculates the discount rate for each prospective duration for each annuity using that annuity's guaranteed rate and the applicable safe harbor IIR. For the static IIR method (charts on the left side), the safe harbor IIR is based on the master product's purchase year. For the dynamic IIR method, the safe harbor BR is based on each annuity's purchase year. A weighted average discount rate is then calculated by the computer based on each annuity's current cash value. As shown in FIG. 21, the IIR for items 191 and 192 are the same despite the annuities purchased in different years since the IIR is based on year 2020 when the master product was purchased.

For the dynamic IIR method the system examines the guarantees (item 193C) and 2021 IIR (item 193) to compute the MEC, CVAT and GL discount rates for that annuity (item 193B). For the annuity purchased in 2021 the system examines the guarantees on that annuity (item 194C), the IIR for annuities purchased that year (item 194) to calculate the MEC, CVAT and GL discount rates for that annuity (item 194B). The system calculates the weighted average set of discount rates from both annuities (item 196). The same process is applied in the static IRR method except the IIR safe harbor rate is the same for all annuities regardless of purchase year. The weighted average set of discount rates is shown in item 195. Since the product guarantees are higher than the IIRs in the first three years, the discount rates derived from applying the dynamic method become different in years four and beyond due to the decrease in the BR for 2021.

FIGS. 22 and 23 use the example in FIGS. 19 & 20 except the discount rates (item 197) from the two annuity purchases in FIG. 21 reflect the impact from the interest rate guarantees on the annuities. This example assumes the static BR method (item 195). As a result of the revised/higher discount rates in the first three years, the various definitional limits calculated decreased slightly. The MEC limit decreases from $31,651 (item 185) to $31,443 (item 198). The CVAT cash value limit decreased from $196,474 (item 186) to $190,977 (item 199) at age 45. FIG. 23 shows the updated GPT calculations due to the revised discount rates. Similar to the MEC and CVAT definitional limitations, all three GPT premium limits decreased slightly in FIG. 23 vs. comparable values in FIG. 20.

One item to note in the calculations is item 200 in FIG. 22, present value of guaranteed mortality charges at age 75. The significant jump at age 75 from age 74 is due to the original level premium guarantee ceasing. The longer the premium guarantee, and the lower the level premium guarantee relative to the CSO safe harbor, the more these items will impact the calculated definitional limits to keep the favorable tax advantages of permanent life insurance.

The definitional limit calculations in FIGS. 24 and 25 use the same case study as FIGS. 22 and 23 except the discount rates use the dynamic method (item 205) rates from FIG. 21 (item 196). The primary difference is the lower IIR for 2021 which, due to an annuity representing 50% of the total annuity cash value in this example, has a meaningful impact on the definitional limits. A lower discount rate will increase the definitional limit. Since the weighted average discount rate is 1% lower for most future years, the impact is significant. For example, the MEC premium limit is $43,019 under the dynamic method scenario (item 206) vs. $31,443 (item 198). The age 45 CVAT cash value limit increased to $263,258 (item 207) vs. $190,977 (item 199). The GPT limits in this example (items 209-212 in FIG. 25) show a 20-30% increase in allowable premium limits due to the use of a dynamic IIR method in a decreasing interest rate environment coupled with newly purchased annuities that represent a significant portion of the overall annuity cash values.

The invention's responsiveness to the interest rate environment is often beneficial to consumers: increasing the ability to pay more premium into annuities assigned to the master product when interest rates are lower compensates for the lower expected rate of return on the fixed annuity.

The chart in FIG. 26 continues the case study but now the insured is age 65 and the policy owner exchanged the two original annuities from FIG. 21 for two new annuities and also added significantly more premium to each annuity. For the static IIR method, the safe harbor IIR remains at 4% as shown in item 213 which is the applicable IIR for all annuity purchases regardless of when they are purchased. The first annuity has a strong 8% guarantee for three years which significantly impacts the weighted average discount rate (item 213A). Furthermore, since annuity #1 represents 80% of the total annuity cash values, its discount rates will significantly influence the overall set of discount rates for the master product's definitional limit calculations (item 215). For the dynamic IIR method, both annuities utilize the assumed safe harbor IIR (item 214) for the calendar year they were purchased (e.g., the current year). The resulting discount rates (item 216) will be used in the following examples.

FIGS. 27 and 28 apply the revised discount rates from FIG. 26 to the 30YT policy purchased at age 45 (the example in FIGS. 22 and 23) for the static IIR method. The point of this illustration is to highlight the cumulative impact on the definitional limit calculations for this 30YT policy when the policy owner makes changes to the annuity policies and the annuities have strong interest rate guarantees relative to the safe harbor IIR rate. Given static IIR method the safe harbor IIR does not change. The only change to the discount rates come from the new annuity's guaranteed rates exceeding the IIR. The revised discount rates are noted in item 217.

The definitional limit impact can be observed at age 65, the year of the annuity exchanges, in the CVAT method cash value limit. The new limit is $373.055 per 1000 of death benefit (item 218) compared to $394.81 in FIG. 22 (item 199B). In effect, exchanging the annuities into a strong rate guarantee for three years reduced the immediate cash value limit by 5.5%. A similar impact can be observed in the cumulative premium limit under the GPT method. At age 65 the new cumulative limit is $554,347 (item 219) compared to $576,515 (item 204B), a 3.8% reduction.

It is important to note that today's conventional bundled UL products do not provide the ability to exchange or upgrade the cash value into vehicles with strong guarantees. The invention is more robust and dynamic. Even with the static IIR method, a purchase of strong guaranteed rate annuity products will cause a restatement of the cumulative definitional limits. The method and system must store historical values from original purchase as well as project forward many years to compute the revised definitional limits.

FIGS. 29 and 30 apply the revised discount rates from FIG. 26 to the 30YT example in FIGS. 24 and 25 for the dynamic IIR method. The process is the same in the prior figures except the system utilizes the appropriate discount rates (item 220). In this example it is assumed the dynamic IIR for MEC, CVAT and GL was 3% for most of the prior 20 years. The exchange of the old annuities for new policies when the current safe harbor IIR (age 65) is 2% will have a meaningful impact on the definitional limits. Item 221 shows the age 65 CVAT cash value limit increasing to $538.544 per 1000 of death benefit vs. $480.048 (item 208 in FIG. 24).

The impact of the revised discount rates also impacts the GPT cumulative premium limits as shown in FIG. 30. The method and system incorporate both historical values and prospective assumptions to recompute the GSP and GLP back to the original issue date and then determine the new cumulative GPT definitional premium limit. In this example, the cumulative premium limit at age 65 increased to $867,739 (item 222) from $752,079 (item 212B), a 15% increase.

In preparation to illustrate a master product compliance test for a portfolio of policies, it is assumed a hypothetical YRT policy was purchased by the consumer at age 60 (5 years prior to the compliance test date at age 65). The example assumes the static IIR method and the same annuity as described in FIG. 26. In FIG. 31, item 223 shows the face amount for this YRT policy to be $500,000. At age 65 the CVAT cash value limit for this policy $239.368 per 1000 (item 224). Note that the discount rates for this static IIR example is 4% for CVAT and others (item 223B) which are based on the IIR safe harbor rates for the master product purchased at age 45. FIG. 32 shows the cumulative GPT premium limits at age 65 for this policy, $196,357 (item 225).

FIGS. 33 and 34 is the age 60 YRT purchase in FIGS. 31 and 32 applying the dynamic IIR method. The new annuity purchases at age 65 change the discount rates as shown in item 226. The age 65 CVAT cash value limit is $312.649 per 1000 (item 227), considerably higher than the cash value limit from application of the static IIR method from FIG. 31, $239.368 per 1000 (item 224). FIG. 34 shows the cumulative GPT premium limit at age 65 is $262,709 (item 228) for this YRT increasing death benefit policy, substantially higher than the $196,357 from the static IIR method in FIG. 32, item 225. The substantial increase in the CVAT cash value definitional limit and the GPT cumulative premium definitional limit is due to the dynamic IIR method's responsiveness to the reduction in safe harbor IIR for new purchases and applying the new, lower IIR to the newly purchased annuities.

FIG. 35 illustrates the details of a fair market value calculation for a deferred annuity with a GMWB. This policy is the newly purchased annuity #4 from FIG. 26. The presence of a lifetime GMWB may result in a fair market value that exceeds the policy's cash value. In FIG. 35, box 229 contains two of the annuity's contract provisions that determine the amount of the annual lifetime withdrawal benefit when the policy owner activates the start of the guaranteed distribution benefits. Many such policies use a notional account called the "income account" as the basis for calculating the guaranteed distribution benefit upon activation. Upon activation by the policy owner, the annual benefit is determined from the income account value (column 229B) and an age and sex-based payout rate (column 230). In this example, the income account increases 6% a year for 20 years and then the annual increase ceases. Column 231 shows the guaranteed withdrawal amount if activated at each age (column 229B multiplied by column 230). The longer the policy owner waits to activate the benefit, the higher the amount once it starts.

Application of actuarial and present value calculations begin with column 232. The general methodology is to determine the fair market value of the guaranteed benefits at each age in the future as if the policy owner elected to start receiving the benefits at that age. The amount of the annual benefit increases due to both the income account increasing at 6% per year as well as the age-based payout rate increasing every five years (column 230). To determine the fair market value at each future age, the computer applies actuarial mathematics using the applicable mortality table and interest rates. Column 232 is the prospective actuarial present value of future guaranteed benefits at each age per dollar of guaranteed benefit. The interest rate and mortality table (e.g., set as a percentage of the CSO safe harbor mortality table in this example; the mortality table to determine the fair market value could be an entirely separate mortality table) are shown in items 234A and 234B.

The fair market value of the GMWB at each future age is shown in column 233. Columns 235 and 236 show the computer's application of the mortality rate and interest rate to calculate the survival rate to each age in the future, and the actuarial discount rate with interest (column 236). The system next determines the current fair market value at each age assuming the policy owner waited until that age to activate the benefit. The final fair market value determination, item 238, is the highest current value of each potential fair market value for each activation age (age in this example). For the example in FIG. 35, the $100,000 annuity has a fair market value of $139,245 at age 65 which will reduce the definitional limit capacity since the fair market value exceeds the stated cash value.

The last two figures bring these examples together to illustrate the overall compliance test on the master product. FIG. 36 illustrates the process for the CVAT method under both the static and dynamic IIR method. The master product consists of four policies. Both the static and dynamic IIR methods are shown using inputs from FIGS. 27, 29, 31, 33 and 35. Item 239 shows that the master product consists of four policies: a 30YT, a YRT, a regular deferred annuity and a deferred annuity with the GMWB. Item 241 shows the cash value for each policy on the compliance testing date. The term policies do not have a cash value. Item 242 shows the fair market value for any policy that has guarantees requiring the assessment (policy #4). Item 243 shows the adjusted cash value for compliance testing, reflecting the excess of any fair market values over the policy's cash value ($539,245).

The CVAT method has one definitional limit: the maximum cash value. In FIG. 36 for the static IIR method, the system compares the modified cash value (item 243) to the aggregate NSP (item 248). Computing the aggregate NSP requires the system to calculate the NSP for each active term policy (items 245 and 246) and computing a weighted average NSP per 1000 factor from the term policies to apply to any annuity death benefits. As detailed in prior exhibits, the different premium guarantees created different per unit NSP factors for the 30YT vs. the YRT. Since this is an increasing death benefit example, the system must apply a weighted average NSP factor to each annuity to determine the contribution to the maximum cash value limit. All annuities will receive the same NSP factor (item 247) which is the term death benefit weighted NSP factor. The system applies the NSP factor for each term and annuity policy death benefit to calculate the aggregate NSP. This is CVAT's definitional limit on the modified cash value as of the testing date (item 248), or $656,985. Since the modified cash value (item 243) is less than the aggregate NSP (item 248), the master product is compliant.

The bottom chart in FIG. 36 is the same process except the system references the NSP factors for each policy on the testing date using the dynamic IIR method. Note that the dynamic IIR method has no impact on the cash value or fair market value calculation. The CVAT NSP factors in items 249, 250 and 251 are applied to the respective death benefits to calculate the aggregate modified cash value limit of $880,167 (item 252).

The charts in FIG. 37 illustrate the application of the GPT method on the hypothetical master product for the same policies (items 253 and 254) as shown in FIG. 36. Both the static and dynamic IIR methods are shown using inputs from FIGS. 28, 30, 32, 34 and 35. The cash value and fair market values (item 255) are the same as the CVAT method. Item 256 is the corridor factor for the insured's age on the compliance testing date. This factor is used in the corridor test. Based on the stated cash value for all the policies and the 120% corridor factor, the minimum death benefit required to be compliant is $600,000 (item 263). Given an aggregate death benefit of $2,000,000 (item 264), the policy is compliant.

For the GPT method the system must calculate the cumulative definitional premium limit for each active term life policy (item 257 and 258 for the static method, active policies) as well as include the contribution to the premium limit from terminated policies (item 259). The total cumulative premium limit is $850,704 (item 260). The system then computes the actual cumulative premium paid on active life and annuity policies and terminated policies (item 261) to determine the total premium paid (item 262). The GPT method compares the premium paid to the definitional limit to assess compliance. In the static method example, since the cumulative premium paid (item 262) is less than the GPT limit (item 260), this policy is currently compliant.

The chart at the bottom of FIG. 37 is identical to the top chart except all the definitional limit calculations apply the dynamic IIR method. As a result, the definitional premium limitations are different. Items 265 and 266 are figures obtained from prior exhibits. Item 267 is the limitation value from terminated policies (not shown in any other exhibits). The cumulative premium limit (item 268) is different than item 260 due to the different IIR methodology. This hypothetical master product passes the GPT (dynamic IIR method) on the compliance testing since the cumulative premium paid (item 269) is less than the aggregate definitional limit (item 268), and the master policy passes the corridor test (item 270). The policy passes the corridor test since the aggregate $2,000,000 death benefit exceeds the $600,000 minimum required based on the fair market value adjusted cash value and the 120% corridor factor for the insured's current age.

Figure 38:
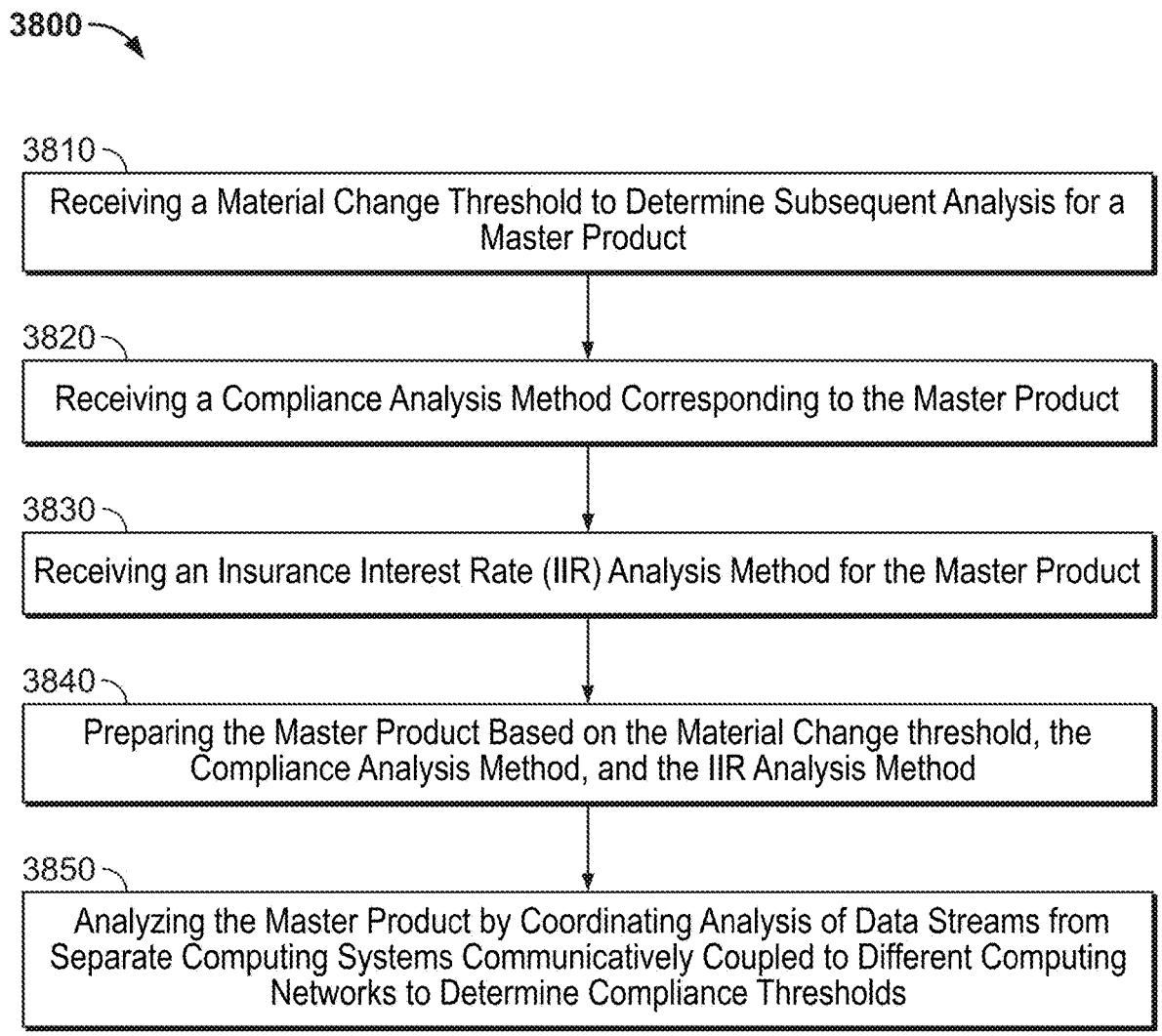
FIG. 38 illustrates a flowchart for a method, according to certain embodiments.

Turning ahead in the drawings, FIG. 38 illustrates a flow chart for a method 3800, according to an embodiment. Method 3800 is merely exemplary and is not limited to the embodiments presented herein. Method 3800 can be employed in many different embodiments or examples not specifically depicted or described herein. In some embodiments, the activities of method 3800 can be performed in the order presented. In other embodiments, the activities of method 3800 can be performed in any suitable order. In still other embodiments, one or more of the activities of method 3800 can be combined or skipped. In many embodiments, the system of FIG. 14 can be suitable to perform method 3800 and/or one or more of the activities of method 3800. In these or other embodiments, one or more of the activities of method 3800 can be implemented as one or more computer instructions configured to run at one or more processing modules and configured to be stored at one or more non-transitory memory storage modules. Such non-transitory memory storage modules can be part of a computer system such the computer system of FIG. 14. The processing module(s) can be similar or identical to the processing module(s) described above with respect to computer system in FIG. 14.

In many embodiments, method 3800 can comprise an activity 3810 of receiving a material change threshold to determine subsequent analysis for a master product. In some embodiments, the material change threshold and a method for determining the material change threshold comprise at least one of: a regulation established by a regulator, or an interpretation of the regulator's intent to establish a regulation. Further details are discussed above in connection with FIGS. 7A-13.

In many embodiments, method 3800 can comprise an activity 3820 of receiving a compliance analysis method corresponding to the master product. In some embodiments, receiving the compliance analysis method corresponding to the master product further comprises determining whether a guideline premium test (GPT) method or a cash value accumulation test (CVAT) method was selected by an owner of the master product. For example, a user may select which of the methods to utilize in subsequent processing. Further details are discussed above in connection with FIGS. 7A-13.

In many embodiments, method 3800 can comprise an activity 3830 of receiving an insurance interest rate (IIR) analysis method for the master product. In some embodiments, receiving the insurance interest rate (IIR) analysis method for the master product further comprises selecting a dynamic method or a static method based on a selection by an owner of the master product or a method established by a regulator. Further details are discussed above in connection with FIGS. 7A-13.

In many embodiments, method 3800 can comprise an activity 3840 of preparing the master product based on the material change threshold, the compliance analysis method, and the IIR analysis method. In some embodiments, preparing the master product further comprises receiving policy data and contract information on one or more term policies and one or more annuity policies obtained by an owner of the master product. Further details are discussed above in connection with FIGS. 7A-13.

In many embodiments, method 3800 can comprise an activity 3850 of analyzing the master product by coordinating analysis of data streams from separate computing systems communicatively coupled to different computing networks to determine compliance thresholds. In some embodiments, analyzing the master product to determine the compliance thresholds further comprises determining assumption information. The assumption information is utilized to determine definitional limits for compliance testing. The system also receives analysis information corresponding to policy information and definitional limit information corresponding to one or more compliance tests.

In some embodiments, analyzing the master product further comprises determining if the master product has satisfied the material change threshold, and in response to determining the material change threshold has not been satisfied: resetting one or more variables, determining new assumption information, and restarting compliance analysis. In some embodiments, in response to determining the material change threshold has been satisfied, the system performs compliance analysis on the master product for a first period of time. For example, the first period of time is 24 hours. That is, the compliance testing is performed on a daily basis. However, the system can perform compliance testing for any desired period of time (e.g., daily, weekly, monthly, etc.). In some embodiments, the compliance analysis comprises performing a modified endowment contract (MEC) operation, and a 7702 operation and obtaining outputs from the MEC operation and the 7702 operation. Further details are discussed above in connection with FIGS. 7A-13. In some embodiments, the compliance metric is based on the outputs from the MEC operation and the 7702 operation.

In some embodiments, the method 3800 further comprises establishing data feeds with the separate computing systems across the different networks. For example, the system establishes data feeds with computing systems of different companies. In some embodiments, the data feeds comprise individual term policy information and individual annuity policy information. For example, the individual term policy information corresponds to a first network of a first company and the individual annuity policy information corresponds to a second network of a second company. Accordingly, embodiments disclosed herein coordinate analysis of data streams from different computing systems across different networks.

In some embodiments, the compliance thresholds correspond to definitional limits that are to maintain the master products satisfaction with tax regulations. Further details are discussed above in connection with FIGS. 7A-13.

Returning to FIG. 14, in several embodiments, the system of FIG. 14 can at least partially perform the method 3800 of FIG. 38.

Figure 39A:
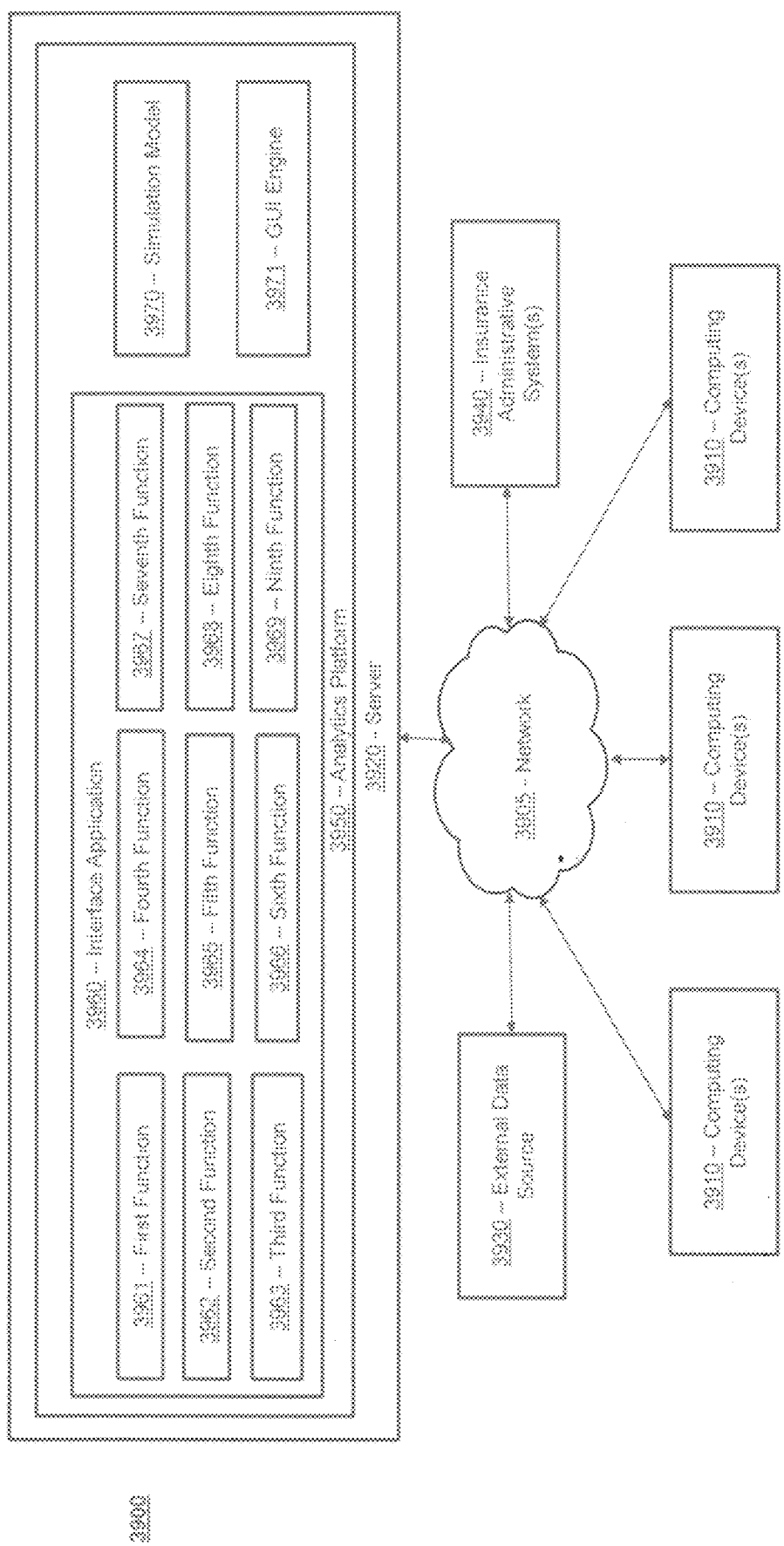
FIGS. 39A and 39B are block diagrams illustrating an exemplary system including a user interface application, simulation model, and analytics platform, in accordance with certain embodiments.
Figure 39B:
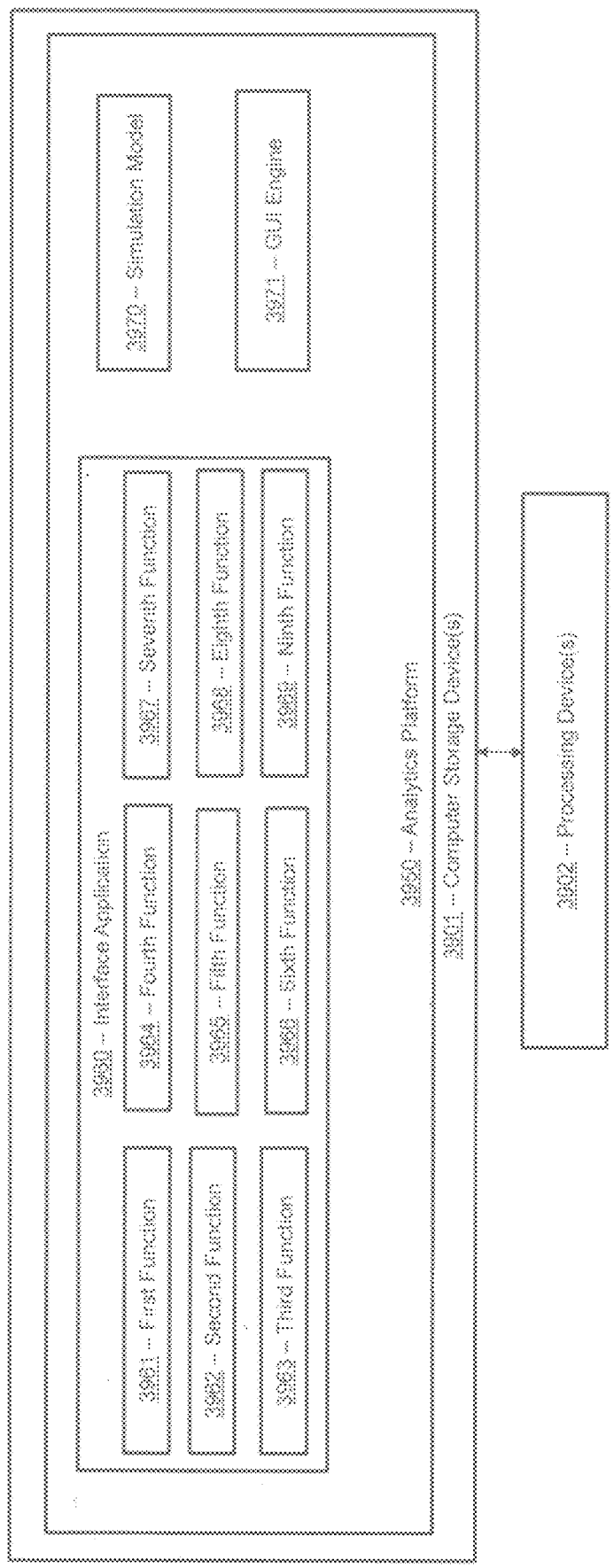

FIG. 39A is a block diagram of an exemplary system 3900 in accordance with certain embodiments that includes, inter alia, an analytics platform 3950. FIG. 39B is a block diagram illustrating exemplary features, components, and/or functions associated with the analytics platform 3950. FIGS. 39A and 38B are jointly discussed below.

The system 3900 comprises one or more computing devices 3910, one or more servers 3920, one or more external data sources 3930, and one or more insurance administrative systems 3940 that are in communication over a network 3905. An analytics platform 3950 is stored on, and executed by, the one or more servers 3920. The network 3905 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 39A, including the one or more computing devices 3910, one or more servers 3920, one or more external data sources 3930, and one or more insurance administrative systems 3940, and analytics platform 3950 can be configured to communicate directly with each other and/or over the network 3905 via wired or wireless communication links, or a combination of the two. Each of the computing devices 3910, servers 3920, external data sources 3930, insurance administrative systems 3940, and analytics platform 3950 can include one or more communication devices, one or more computer storage devices 3901, and one or more processing devices 3902 (FIG. 39B) that are capable of executing computer program instructions.

The one or more computer storage devices 3901 may include (i) non-volatile memory, such as, for example, read only memory (ROM) and/or (ii) volatile memory, such as, for example, random access memory (RAM). The non-volatile memory may be removable and/or non-removable non-volatile memory. Meanwhile, RAM may include dynamic RAM (DRAM), static RAM (SRAM), etc. Further, ROM may include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In certain embodiments, the one or more computing storage devices 3901 may be physical, non-transitory mediums. The one or more computer storage devices 3901 can store, inter alia, instructions associated with implementing the functionalities of the analytics platform 3950 described herein.

The one or more processing devices 3902 may include one or more central processing units (CPUs), one or more microprocessors, one or more microcontrollers, one or more controllers, one or more complex instruction set computing (CISC) microprocessors, one or more reduced instruction set computing (RISC) microprocessors, one or more very long instruction word (VLIW) microprocessors, one or more graphics processor units (GPU), one or more digital signal processors, one or more application specific integrated circuits (ASICs), and/or any other type of processor or processing circuit capable of performing desired functions. The one or more processing devices 3902 can be configured to execute any computer program instructions that are stored or included on the one or more computer storage devices 3901 including, but not limited to, instructions associated with implementing the functionalities of the analytics platform 3950 described throughout this disclosure.

Each of the one or more communication devices can include wired and wireless communication devices and/or interfaces that enable communications using wired and/or wireless communication techniques. Wired and/or wireless communication can be implemented using any one or combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware can depend on the network topologies and/or protocols implemented. In certain embodiments, exemplary communication hardware can comprise wired communication hardware including, but not limited to, one or more data buses, one or more universal serial buses (USBs), one or more networking cables (e.g., one or more coaxial cables, optical fiber cables, twisted pair cables, and/or other cables). Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.). In certain embodiments, the one or more communication devices can include one or more transceiver devices, each of which includes a transmitter and a receiver for communicating wirelessly. The one or more communication devices also can include one or more wired ports (e.g., Ethernet ports, USB ports, auxiliary ports, etc.) and related cables and wires (e.g., Ethernet cables, USB cables, auxiliary wires, etc.).

In certain embodiments, the one or more communication devices additionally, or alternatively, can include one or more modem devices, one or more router devices, one or more access points, and/or one or more mobile hot spots. For example, modem devices may enable some or all of the computing devices 3910, servers 3920, external data sources 3930, insurance administrative systems 3940, and/or analytics platform 3950 to be connected to the Internet and/or other network. The modem devices can permit bi-directional communication between the Internet (and/or other network) and the computing devices 3910, servers 3920, external data sources 3930, insurance administrative systems 3940, and/or analytics platform 3950. In certain embodiments, one or more router devices and/or access points may enable the computing devices 3910, servers 3920, external data sources 3930, insurance administrative systems 3940, and/or analytics platform 3950 to be connected to a LAN and/or other more other networks. In certain embodiments, one or more mobile hot spots may be configured to establish a LAN (e.g., a Wi-Fi network) that is linked to another network (e.g., a cellular network). The mobile hot spot may enable the computing devices 3910, servers 3920, external data sources 3930, insurance administrative systems 3940, and/or analytics platform 3950 to access the Internet and/or other networks.

In certain embodiments, the computing devices 3910 may represent desktop computers, laptop computers, mobile devices (e.g., smart phones, personal digital assistants, tablet devices, vehicular computing devices, wearable devices, or any other device that is mobile in nature), and/or other types of devices. The one or more servers 3920 may generally represent any type of computing device, including any of the aforementioned computing devices 3910. The one or more servers 3920 also can comprise one or more mainframe computing devices and/or one or more virtual servers that are executed in a cloud-computing environment. In some embodiments, the one or more servers 3920 can be configured to execute web servers and can communicate with the computing devices 3910, external data sources 3930, insurance administrative systems 3940, and/or other devices over the network 3905 (e.g., over the Internet).

In certain embodiments, the analytics platform 3950 can be stored on, and executed by, the one or more servers 3920. Additionally, or alternatively, the analytics platform 3950 can be stored on, and executed by, the one or more computing devices 3910 and/or other suitable computing devices.

In some embodiments, the analytics platform 3950 also can be stored as a local application on a computing device 3910, or interfaced with a local application stored on a computing device 3910, to implement the techniques and functions described herein. The computing device 3910 may be part of insurance administrative system 3940 in some scenarios.

The insurance administrative systems 3940 can generally correspond to third-party systems, networks, and/or devices that communicate with the analytics platform 3950 and/or transmit data to the analytics platform 3950. For example, the insurance administrative systems 3940 can be operated and managed by businesses, and/or other entities that send data on individual term and annuity policies administered by its respective carrier where such individual policies are included in the master policy and therefore used by the analytics platform 3950 and the functionalities of one or more systems and/or one or more applications. For example, the insurance administrative systems 3940 can be an insurance carrier that utilizes the output from the analytics platform 3950 to process the simulation model 3970 for modeling and administering the tax compliance.

Each of the insurance administrative systems 3940 may include one or more computing devices, such as computing devices 3910, that enable the insurance administrative systems 3940 to communicate with the analytics platform 3950 over the network 3905. In some cases, one or more of the insurance administrative systems 3940 may include sophisticated technological infrastructures, such those that include enterprise systems, servers, such as servers 3920, virtual private networks (VPNs), intranets, etc. The computing devices 3910, servers 3920, and/or other devices associated with each insurance administrative system 3940 can store and execute various applications (e.g., such as insurance products, etc.). The insurance administrative systems 3940 and associated applications can send data on the individual term and annuity policies they administer to the analytics platform 3950 in various ways.

In certain embodiments, the analytics platform 3950 can be integrated with (or can communicate with) various applications hosted by the insurance administrative systems 3940 including, but not limited to, applications that provide products or services for insurance needs. In certain embodiments, the analytics platform 3950 additionally, or alternatively, can be integrated with (or can communicate with) other applications. For example, servers 3920 and analytics platform 3950 could be hosted by a third party and interface with one or more insurance administrative systems 3940 over network(s) 3905.

The aforementioned applications and/or other applications, each of which may be integrated or interfaced with the analytics platform 3950, can be stored on one or more insurance administrative systems 3940 in some embodiments. For example, the aforementioned applications and/or other applications can be stored on one or more computing device 3910 and/or one or more servers 3920 associated with one or more insurance administrative systems 3940.

As discussed throughout this disclosure, the analytics platform 3950 can generally provide functions associated with selecting individual term and annuity policies to include in the master policy or selecting options to simulate the tax compliance implications before executing any changes to the master policy. In certain embodiments, the analytics platform 3950 is implemented with an interface application 3960 that enables a user to interact with a user interface to create or manage their master policy portfolio of individual term and annuity products and correspond such changes with the insurance administrative systems 3940 computing the tax compliance calculations and/or administering the individual term and annuity policies. The interface application 3960 can facilitate a user interface displaying a plurality of functions for a prospective or existing insured that may be method elections, product selection, input fields, solve requests, and output fields that may be numbers, tables, graphs, or data relationship components.

In the illustrated embodiments, the interface application 3960 can include a plurality of adjustable functions that facilitate an insured or new applicant to create their master policy portfolio of term and annuity policies, and enable the insured to view and evaluate a variety of possible combinations and compliance election options to understand the tax implications prior to formally applying for new policies or making changes to existing policies (including the submission of additional premium to annuity contracts). The interface application 3960 can display one or more functions to the insured in creating a master policy or managing changes in an existing master policy, wherein the input fields and simulation output include product selections, existing product removals, data input or solve requests, the one or more functions corresponding to the interface application 3960 and comprising, in the illustrated example, a first function 3961, a second function 3962, a third function 3963, a fourth function 3964, a fifth function 3965, a sixth function 3966, a seventh function 3967, an eighth function 3968, and a ninth function 3969. In the illustrated embodiment, the analytics platform 3950 includes a graphical user interface (GUI) engine 3971 that coordinates the inputs from the interface application with a simulation model 3970. The simulation model 3970 is described in greater detail in connection with FIGS. 7A-13.

In certain embodiments, the simulation model 3970 can be implemented as separate algorithms, modules, components, spreadsheets, or any other suitable computer application or software and interface with the GUI engine 3971 and/or interface application 3960, such as via application programming interfaces (APIs). Alternatively, or additionally, the simulation model 3970 can be implemented together with or as part of GUI engine 3971 and/or interface application 3960.

The first function 3961 corresponds to selection of a compliance calculation method when the master policy is first established. The first function 3961 can be displayed on a GUI via the GUI engine 3971 to enable a user to change the election and observe the tax compliance limits and implications prior to formally applying for the master policy. In some embodiments, the first function 3961 corresponds to a selection of a compliance method from at least one of: a guideline premium test (GPT) method or a cash value accumulation test (CVAT) method, if the insured is creating a new integrated cash value policy, otherwise the system identifies the compliance method selected when the integrated cash value policy was created, thereby providing the insured the ability to simulate and compare the compliance limits generated by each method in real-time prior to making an irreversible selection when creating the integrated cash value policy.

The second function 3962 corresponds to selection of an insured interest rate method that is used by the compliance calculation method selected in the first function 3961. The second function 3962 can be displayed on a GUI via the GUI engine 3971 to enable a user to change the selection in the second function 3962. In some embodiments, the second function 3962 corresponds to selecting an insurance interest rate (IIR) method from at least one of: a dynamic method or a static method, if the insured is creating a new integrated cash value policy, or a default method, otherwise the system identifies the IIR method selected when the integrated cash value policy was created, thereby providing the insured the ability to simulate and compare the compliance limits for both IIR methods in real-time prior to making the irreversible selection when creating the integrated cash value policy.

The third function 3963 corresponds to selection of a tax compliance tolerance related to whether the simulated premium limits comply with the Modified Endowment Contract ("MEC" also known as the 7-pay) limits. The third function 3963 can be displayed on a GUI via the GUI engine 3971 to enable a user to modify the selection related to the third function 3963. In some embodiments, the third function 3963 corresponds to selecting compliance tolerance filters when an administrative system simulates and displays combinations of term life insurance and annuity policies that trigger violation of 7-Pay Modified Endowment Premium limits, thereby accelerating processing time and increasing potential portfolio combinations when the insured accepts implications with combinations that violate the 7-Pay Modified Endowment Premium limits.

The fourth function 3964 corresponds to determining an estimate of the proposed insured's current health status for premium quotes for new life insurance purchases to be added to the master policy prior to the insurance company underwriting a formal application, the health status corresponding to an expected underwriting class, wherein the fourth function includes displaying risk input fields for age, gender, smoker status, and general health assessment fields with computer-assisted definitions to assist the insured in estimating an underwriting class. The fourth function 3964 can be displayed on a GUI via the GUI engine 3971 to enable a user to modify information related to the fourth function 3964. In some embodiments, the fourth function 3964 corresponds to input fields to specify the insured's demographics, and current health status estimate with computer-assisted definitions to assist in estimating the insured's risk class for potential new term integrated cash value policy applications.

The fifth function 3965 corresponds to the insured selecting the face amount adjustment election on the annual renewable term coverage within the master policy where the insured choses between the face amount for the annual renewable coverage remaining fixed or elects the option where the face amount of the annual renewable term coverage is reduced for increases in the aggregate annuity cash value (effectively creating a level total death benefit between the annual renewable term coverage and the annuity cash value). The fifth function 3965 can be displayed on a GUI via the GUI engine 3971 to enable the user to change this election within the fifth function 3965. In some embodiments, the fifth function 3965 corresponds to selecting a term insurance face amount adjustment option where one option is to maintain the specified coverage amount regardless of the annuity cash values and a second option is to adjust down the specified face amount of the designated term policy for the increase in annuity cash values, thereby providing the insured the ability to simulate and compare the total death benefit options and their respective tax implications in real-time prior to applying for a new master policy or making changes to an existing master policy.

The sixth function 3966 corresponds to the insured specifying parameters on available new term and annuity products to narrow the selection options for inclusion in the master policy tax compliance simulation, including access to product details. The sixth function 3966 could include standard filters such as the financial strength rating of the carrier, guaranteed premium term length or type of annuity, but also customizable filtering capabilities. The sixth function 3966 can be displayed on a GUI via the GUI engine 3971 to enable a user to select the search and inclusion parameters related to the sixth function 3966. In some embodiments, the sixth function 3966 corresponds to the insured specifying individual term policy preferences such as range on term policy guarantee periods for potential new policy applications, and preferences for type of annuity such as fixed, indexed, or variable, for filtering purposes, including computer-assisted filtering by the fourth function, to reduce the new term and annuity products displayed to the insured for consideration in the simulation, thereby simplifying the term and annuity product selection process for the insured to build a hypothetical master policy, or change an existing master policy, and to simulate the tax compliance implications.

The seventh function 3967 corresponds to the insured specifying if they are creating a new master policy or accessing an existing policy. If the insured is creating a new master policy, the system displays the first and section function for selecting the respective methods before proceeding. If the insured is accessing an existing master policy for a compliance status update or simulate potential changes to the master policy portfolio, the system provides input fields for the policy number and retrieves information on the existing policy. The seventh function 3967 can be displayed on a GUI via the GUI engine 3971 to enable a user to input necessary information related to the seventh function 3967. In some embodiments, the seventh function 3967 corresponds to selecting whether the simulation applies to a newly created integrated cash value policy or an existing integrated cash value policy, with an input field for policy account information facilitating real-time updates from the administrative system on existing policy details.

The eighth function 3968 corresponds to simulating tax compliance based on a plurality of simulation input parameters on potential changes, or combination of changes, to existing term and/or annuity policy(ies), purchase of one or more new term and/or annuity policies, additional premium to existing annuity(ies), with each product selection requesting user input on the simulation parameters to help the insured maximize their time efficiency and ensure any changes being considered are compliant before making irreversible changes to existing integrated cash value policies or applying for new integrated cash value policies. Output from the simulation activated by the eighth function can be displayed on a GUI via the GUI engine 3971 with electable options to display the information in the user's preferred format. In some embodiments, the eighth function 3968 corresponds with a plurality of simulation input parameters on potential changes, or combination of changes, to existing term and/or annuity policy(ies), purchase of one or more new term and/or annuity policies, additional premium to existing annuity(ies), with each product selection requesting user input on the simulation parameters to help the insured maximize their time efficiency and ensure any changes being considered are compliant with the 7702 definitional limits and the MEC tolerance election made in the third function, before making irreversible changes to existing integrated cash value policies or applying for new integrated cash value policies.

The analytics platform 3950 can process the modifications to the first function 3961, the second function 3962, the third function 3963, the fourth function 3964, the fifth function 3965, the sixth function 3966, the seventh function 3967 and/or the eighth function 3968 in several ways. The following are embodiments illustrating the operation of the analytics platform 3950. As one example, in a first embodiment, in response to the insured using the seventh function to identify whether the master policy is being created or accessing an existing policy, the insured selecting the guideline premium test method in the first function if a new policy, the insured selecting the static option in the insurance interest rate method in the second function if a new master policy, the insured selecting the option to avoid creating a Modified Endowment Contract in the third function, the insured entering their age and gender and selecting their health status in the fourth function, the insured selecting the level face amount option for the annual renewable term coverage in the fifth function, the insured using the sixth function to filter and select individual term and annuity products to simulate the tax compliance limits, and the insured engaging the eighth function to simulate the tax compliance limitations. The analytics platform 3950 utilizes the adjustments to the eighth function to calculate and display via the tables and the graphs the initial and projected tax compliance information such as the minimum term face amount needed to comply, or the maximum annuity premium allowed for the specified term insurance death benefits.

In some embodiments, subsequent to the master policy being established with individual term insurance products and annuities, the analytics platform 3950 can execute at least one of the following: (1) transmit a notification to the insured to access the insured's life insurance policy account, in response to changes in premiums paid, cash withdrawn or changes in term policy face amount, the tax compliance status being updated, and, in response to the insured accessing the master policy account, displaying, via the output field, tables or graphs the insured's updated tax compliance status, projected status, or available cushion to compliance violations; (2) enable the insured to make changes to the master policy by removing an existing term or annuity policy, adding additional premium to an existing annuity policy, applying for additional term policy or annuity contract, based on the insured simulating such potential changes and engaging the simulation model to evaluate the potential tax compliance consequences before submitting such change requests; (4) wherein, the third function, fourth function, fifth function, sixth function and/or eighth function of the user interface enable the insured to simulate and evaluate, in real-time different possible changes to the existing master policy and view, in real-time, information from the management component corresponding to such simulated combinations, including information about the tax compliance limitations. In some embodiments, the analytics platform 3950, in response to receiving an indication that the insured has completed all inputs and changes to the master policy through the user interface, submits a formal application for a new individual policy, or change to an existing policy, to a third-party system associated with an insurance carrier.

The GUI engine 3971 displays the first function 3961, the second function 3962, the third function 3963, the fourth function 3964, the fifth function 3965, the sixth function 3966, the seventh function 2967, and/or the eighth function 3968 to a user, such as shown in the exemplary embodiments illustrated in FIGS. 40-44. In some embodiments, the GUI engine 3971 displays the information numerically, graphically, or other means by needs category and/or in totality, and provides adjustable input fields to change the election, revise any input field, add or change any individual term or annuity product, and receive real-time updates on the tax compliance implications. In some embodiments, the GUI engine 3971 enables the insured to simulate and evaluate, in real-time, different inputs and enables the insured to stay tax compliance and optimize the benefit of their master policy. In some embodiments, the GUI engine 3971 submits a formal application to a third-party system (e.g., insurance administrative system 3940) associated with an insurance carrier in response to receiving a request through the GUI engine 3971.

In some embodiments, users or operators may utilize various gestures to make selections and provide inputs via the GUI engine 3971. Other input mechanisms (e.g., mouse devices, keyboards, input buttons, etc.) also may be utilized to make selections and provide inputs.

In certain embodiments, the GUI engine 3971 can include both a display (e.g., an LCD or liquid crystal display) device and capacitive sensing medium that is configured to detect touches and gestures. In some cases, the capacitive sensing medium can be configured to detect the location where the touch screen display is engaged or touched by an object (e.g., a user's figurer or stylus), the time and duration of each engagement or touching of the touch screen display, and/or the pressure exerted each instance the touch screen display is engaged or touched. The capacitive sensing medium also can generate signals indicating the same. The capacitive sensing medium can include one or more sensors that utilize capacitive sensing, resistive sensing, surface acoustic wave sensing, strain gauges, force sensitive resisters, load cells, pressure plates, piezoelectric transducers, and/or the like to detect the aforementioned parameters.

The capacitive sensing medium can be configured to detect various types of gestures. Exemplary gestures that may be utilized to provide inputs via the capacitive sensing medium and/or touch screen displays of the GUI engine 3971 can include: Tap Gestures: Touch or tap one finger on the touch screen display; Touch and Hold Gestures: Touch the touch screen display and hold in place for a predetermined period of time (e.g., 1-3 seconds); Swipe Gestures: Touch the touch screen display, and move or drag a finger in a direction across touch screen display; Scroll Gestures: Move or drag one finger across the touch screen display without lifting, and capable of moving bi-directionally (e.g., up and down or side to side); Zoom Gestures: Place two fingers on the touch screen display near each other and spread them apart to zoom in, or move them toward each other to zoom out. Other types of gestures also may be utilized to provide inputs and selections via the GUI engine 168. It should be understood that any portion of this disclosure that describes selections, inputs, or the like being received on an interface can be provided by usage of one or more of the aforementioned gestures.

FIGS. 40-44 illustrate exemplary user interface outputs that can be generated by the GUI engine 3971. A more in-depth discussion of these user interface examples follow.

FIG. 40 illustrates an exemplary client login page for the user interface. Item 4001 identifies input fields for basic demographic data needed to retrieve term insurance premium quotes. Item 4002 provides password input fields to create an account so new master policies can be created, simulated, and stored for later analysis before formal application. Items 4003 and 4004 correspond to compliance method selections required when creating a new master policy and relate to the first and second function, respectively. Item 4005 corresponds to gateway to the next steps in creating a new master policy. Item 4006 corresponds to the access point for accessing an existing master policy. Items 4005 and 4006 correspond to the seventh function.

Figure 41:
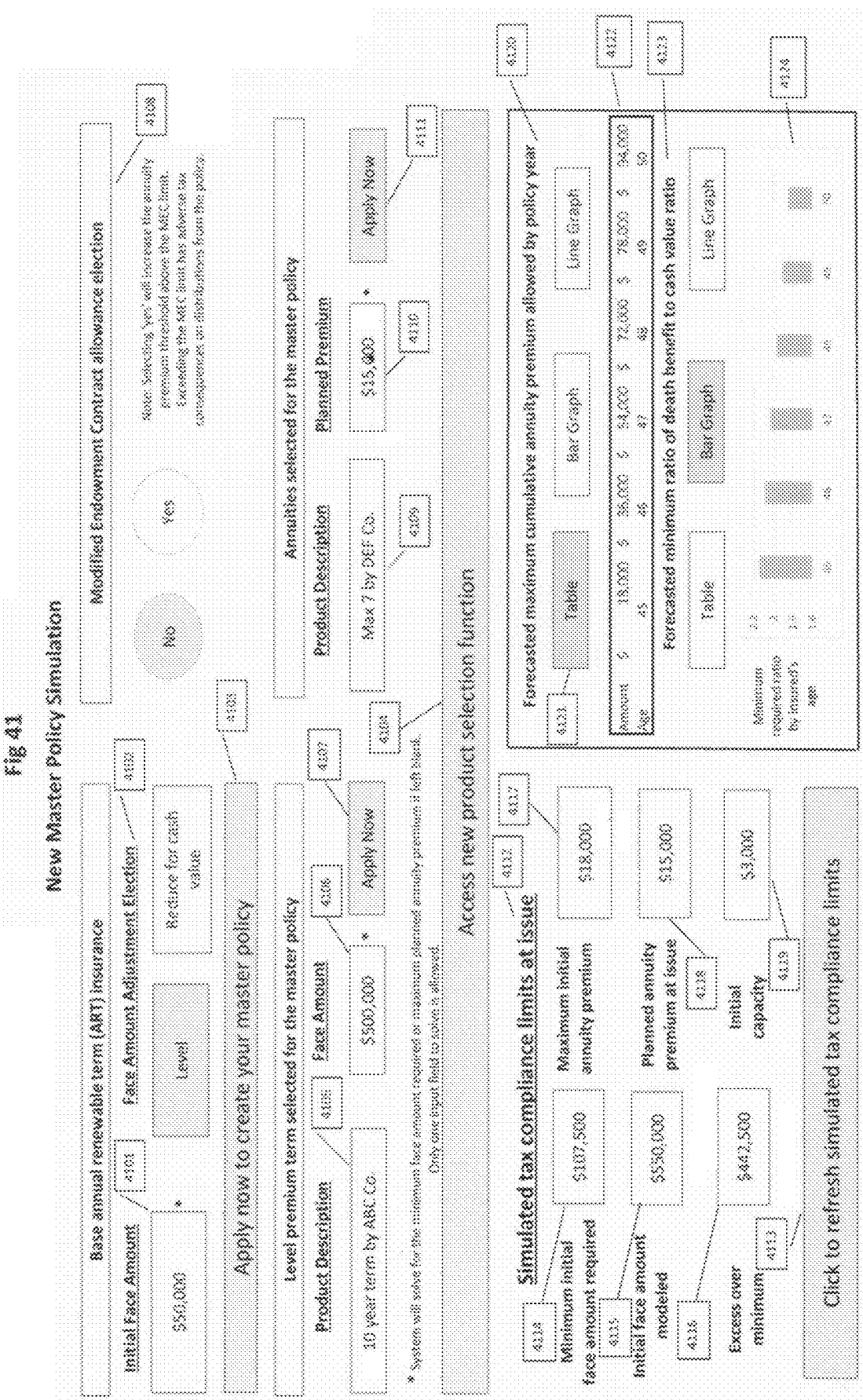
FIG. 41 illustrates an exemplary user interface for a new policy creation and simulation process.

FIG. 41. illustrates an exemplary GUI page for creating a new master policy and simulating the tax compliance limits. The master policy creation process begins with inputting (or solving for) the base annual renewable term coverage face amount 4101. Next, the insured selects a "death benefit option" whereby the amount of annual renewable term insurance amount 4101 either remains level and the total death benefit is the sum of 4101, any level premium term policies, and the annuity cash values, or the annual renewable term coverage face amount 4101 is reduced by the amount of annuity cash value (effectively creating a level death benefit because the annuity cash value growth results in a reduction in the annual renewable term coverage 4101). When the insured is ready to formally begin establishing their master policy, 4103 provides a gateway to the application process with the master policy host insurance carrier providing the coverage for the base annual renewable term coverage.

The insured makes an election in 4108 whether the simulated maximum amount of annuity premium allows the modified endowment contract limits (e.g., IRC section 7702A also known as the 7-Pay limit) to be violated.

As shown in FIG. 41, the insured engages the new product selection function 4104 which is discussed in more detail below (in connection with FIG. 42). In this illustration the insured selected a 10-year term policy by ABC Co 4105, inputs $500,000 face amount 4106, and engages 4107 to enter the application process for that specific carrier's product. Similarly, the insured selected an annuity by DEF company and plans to deposit $15,000 into the annuity 4110. Once the simulation is complete and the insured can proceed with the formal application by engaging 4111 to enter that annuity application queue. At any time during the simulation process the insured can add to or replace any term or annuity product by accessing 4104.

Once the insured finishes making the elections described above, they can simulate the tax compliance limits for the constructed portfolio with initial limits displayed in item 4112. Note the asterisk next to the policy amount fields 4101, 4106 and 4110. If one of these fields is left empty, the system will simulate the minimum amount needed to satisfy the 7702 tax compliance limits (and the MEC limits if 'No' is selected in item 4108). Only one input field may be solved for in any given simulation.

The new master policy simulation process in FIG. 41 begins by engaging the eighth function 4113 which will access the simulation model 3970. Item 4114 shows the minimum initial face amount required for the annuity planned premium 4110. Total initial face amount from all term policies (the base ART insurance 4101 and the level premium term 4105 combined) is compared to the minimum required 4114 to display the excess 4116. Also provided in 4112 is the maximum annuity premium allowed at issue 4117, the planned premium 4118, and the initial capacity for additional premium 4119. The eighth function also forecasts the maximum cumulative premium 4120 which can be displayed in various ways (e.g., table of numbers or graphically) with 4121 providing clickable options. The simulated limits are provided in 4122. Besides premium limits, the tax compliance laws also impose tests related to the ratio of the master policy's total death benefit to the aggregate cash value. This minimum ratio test 4123 is displayed for several years in the future 4124 under a format selected by the user.

FIG. 42 is an exemplary user interface for a new product selection function. The process begins with section 4201 where the insured identifies their tobacco use status 4202 and overall health status estimate 4203, assisted by computer-generated definitions of the health status options 4204. This information corresponds to the fourth function.

Selecting one or more individual level premium term products for the master policy begins with selecting the parameters 4205 to narrow down the possibilities within the complete network of products offered by participating carriers. One filter is the carrier's financial strength rating 4206. Another filter is the length of the level premium guarantee period 4207. The user interface can provide the option for more sophisticated filtering criteria 4208. Any suitable known types of filtering may be utilized in addition to, or in place of, the examples shown in FIG. 42. As the filter parameters are specified, the list of available products by carriers is displayed 4209 with the ability to select one or more products to add to the master policy for simulation 4210. The process is similar for specifying annuity filtering parameters 4211 with standard filters such as carrier rating, type of annuity product 4212 and the maximum length of surrender charge 4213. Customizing the search criteria 4214 may be more valuable for filtering potential annuities given the broad array of product features, credited rates, and optional riders and their fees. Once the user has selected product(s) for the master policy simulation, they access item 4215 to return to the simulation function.

FIG. 43 is an exemplary user interface for a master policy update page which can be accessed from the client login page 4006. The status update starts with an overall review 4301 of the policy's annual renewable term death benefits 4302, total death benefit from level premium term policies 4303, total annuity account value 4304 and total annuity cash value 4305. The insured can access additional details on the policies 4306 such as the individual term policy monthly premiums, credited rate performance on the annuities, etc. FIG. 43 illustrates the master policy's overall tax compliance status. Item 4307 provides confirmation that the policy meets the compliance standards to be taxed as a permanent life insurance contract. Item 4308 communicates if the policy has violated the MEC limits and therefore any distributions will be taxed like an annuity instead of a permanent life insurance policy. Additional details such as the gap to the current compliance limits is provided. Item 4309 communicates the total term insurance death benefit while 4310 shows the current minimum face amount required with the excess over the required amount in 4311. The tax compliance limits on premium paid are covered for both the 7702 test 4310 (Guideline Premium Test in this example) and the MEC limit 4313. Variances to those respective thresholds are shown in 4314 and 4316, respectively. If the insured wishes to simulate some changes to the portfolio, they access the simulation function 4317.

FIG. 44 illustrates an exemplary user interface for an existing master policy simulation. The base annual renewable term coverage 4401 can be changed 4402 and/or the adjustment election 4403 can be changed which corresponds to the fifth function. For simulating premium limits the user can elect whether over-funding the master policy with additional annuity premium can be allowed to violate the MEC limits 4404. This election corresponds to the third function. As shown in FIG. 44, 4407 lists a summary of the current term policies and whether the insured wishes to simulate removing (e.g., lapsing) this coverage 4408. Details on existing term policies can be accessed via 4411. New term policies can be evaluated and selected by engaging 4412 which corresponds to the sixth function. In some embodiments, the simulation can be processed with input fields completed 4409 or left blank and the eighth function will solve for the minimum amount needed. Item 4410 provides the application gateway to formally applying for this new term policy. Access to existing annuity policy details 4417 is provided. Simulating the exchange of an existing annuity 4414 (e.g., surrender that annuity for its cash value) for the purchase of a new annuity 4415 empowers the insured to simulate any potential tax implications. Planned premium 4415 for the simulation is provided by the insured or left blank to solve for the maximum amount as provided by the eighth function. Once the simulation is done and the insured decides to apply for that new annuity, access to the application queue 4416 is available from the user interface.

Corresponding with the eighth function, once the insured has completed all potential changes to existing and/or new term and annuity policies, the system simulates the tax compliance limits 4418 by engaging with the simulation model 3970. Similar to the example shown in FIG. 42, the initial compliance limit information is displayed in 4419 through 4424. Projected limits on cumulative annuity premium and future minimum ratios on death benefit to cash value are provided in 4425 in a format specified by the user.

In many embodiments, the techniques described herein can provide a practical application and several technological improvements. In some embodiments, the techniques described herein can provide for coordinating the operation amongst different computing systems to create and maintain a master product.

In many embodiments, the techniques described herein can be used continuously at a scale that cannot be reasonably performed using manual techniques or the human mind. For example, processing millions of data points while a user is inputting information within milliseconds cannot be feasibly completed by a human. Further, coordinating the analysis of data streams cannot feasibly be completed by a human.

The embodiments disclosed herein improve upon previous systems by creating a master product of policy products that were previously unable to be combined. In particular, embodiments disclosed herein further analyze the master product to ensure the master product is in compliance with all the necessary codes and regulations.

Although systems and methods for coordinating data streams from different computing systems have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-44 may be modified, and that the foregoing discussion of certain of these embodiments does not necessarily represent a complete description of all possible embodiments. For example, one or more of the procedures, processes, or activities of FIG. 38 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system of administering compliance for an integrated cash value life insurance policy comprised of at least one individual term insurance policy and at least one individual annuity policy, owned by an insured, with the at least one individual term insurance policy or the at least one individual annuity policy issued from a same or separate insurance companies, providing the insured the ability to unbundle a traditional permanent life insurance policy into life insurance protection and cash value components and obtain real-time compliance information based on modifications to the at least one individual term annuity insurance policy without impacting the at least one individual annuity policy or modifications to the at least one individual annuity policy without impacting the term life insurance protection products, the system comprising:
   a user interface including a plurality of adjustable functions that enable the insured to evaluate compliance implications on a variety of possible combinations of individual term and annuity policies prior to formally applying for a new individual term and/or annuity policy(ies), changing the benefits of an existing term policy(ies), or submitting a new premium or withdrawing cash from an existing annuity policy(ies);
   the user interface displaying a plurality of functions containing simulation parameters including at least one of: compliance objectives, insurance benefit and annuity cash value objectives, total integrated cash value policy premium objectives or limits, wherein the simulation parameters or compliance objectives are provided in an input field, formula field, data relationship component, or variable table, the plurality of functions including the following:
   a first function corresponding to a selection of a compliance method from at least one of: a guideline premium test (GPT) method or a cash value accumulation test (CVAT) method, if the insured is creating a new integrated cash value policy, otherwise the system identifies the compliance method selected when the integrated cash value policy was created, thereby providing the insured the ability to simulate and compare the compliance limits generated by each method in real-time prior to making an irreversible selection when creating the integrated cash value policy;

a second function corresponding to selecting an insurance interest rate (IIR) method from at least one of: a dynamic method or a static method, if the insured is creating a new integrated cash value policy, or a default method, otherwise the system identifies the IIR method selected when the integrated cash value policy was created, thereby providing the insured the ability to simulate and compare the compliance limits for both IIR methods in real-time prior to making the irreversible selection when creating the integrated cash value policy;

a third function corresponding to selecting compliance tolerance filters when an administrative system simulates and displays combinations of term life insurance and annuity policies that trigger violation of 7-Pay Modified Endowment Premium limits, thereby accelerating processing time and increasing potential portfolio combinations when the insured accepts implications with combinations that violate the 7-Pay Modified Endowment Premium limits;

a fourth function corresponding to input fields to specify the insured's demographics, and current health status estimate with computer-assisted definitions to assist in estimating the insured's risk class for potential new term integrated cash value policy applications;

a fifth function corresponding to selecting a term insurance face amount adjustment option where one option is to maintain the specified coverage amount regardless of the annuity cash values and a second option is to adjust down the specified face amount of the designated term policy for the increase in annuity cash values, thereby providing the insured the ability to simulate and compare the total death benefit options and their respective tax implications in real-time prior to applying for a new master policy or making changes to an existing master policy;

a sixth function corresponding to the insured specifying individual term policy preferences such as range on term policy guarantee periods for potential new policy applications, and preferences for type of annuity such as fixed, indexed, or variable, for filtering purposes, including computer-assisted filtering by the fourth function, to reduce the new term and annuity products displayed to the insured for consideration in the simulation, thereby simplifying the term and annuity product selection process for the insured to build a hypothetical master policy, or change an existing master policy, and to simulate the tax compliance implications;

a seventh function corresponding to selecting whether the simulation applies to a newly created integrated cash value policy or an existing integrated cash value policy, with an input field for policy account information facilitating real-time updates from the administrative system on existing policy details;

an eighth function with a plurality of simulation input parameters on potential changes, or combination of changes, to existing term and/or annuity policy(ies), purchase of one or more new term and/or annuity policies, additional premium to existing annuity(ies), with each product selection requesting user input on the simulation parameters to help the insured maximize their time efficiency and ensure any changes being considered are compliant with the 7702 definitional limits and the MEC tolerance election made in the third function, before making irreversible changes to existing integrated cash value policies or applying for new integrated cash value policies;

upon completion of all fields, the insured engages the user interface's simulation function to interact with the administrative system to calculate and display via numbers, tables, graphics, or data relationship components, the simulated integrated cash value policy's premiums paid, death benefits, and annuity cash values and the compliance limits and capacity for additional premium and/or cash value, or increases in term life insurance face amount needed, thereby helping the insured to determine in real-time the right combination of term insurance death benefit amounts, specific product terms, and annuity products that fit the insured's life insurance protection, cash value growth and tax management objectives before submitting applications to the insurance companies;

a modelling system to process the insured's request to simulate the creation of a new integrated cash value life insurance policy or changes to an existing integrated cash value life insurance policy, and ongoing determination of the compliance tests from changes in premium, cash value and benefit amounts for an existing integrated cash value life insurance policy, the modelling system comprising:

one or more processors; and one or more non-transitory computer-readable media storing computing instructions that, when executed on the one or more processors, perform:

transmitting a first electronic communication to a first respective insurance company administrative system to obtain first individual policy data, the first respective insurance company administrative system connected to a first secure network;

transmitting a second electronic communication to a second respective insurance company administrative system to obtain second individual policy data, the second respective insurance company administrative system connected to a second secure network different than the first secure network;

receiving, in a third electronic communication from the first respective insurance company administrative system, the first individual policy data;

receiving, in a fourth electronic communication from the second respective insurance company administrative system, the second individual policy data;

combining the first and second individual policy data from the at least one individual term insurance policy and the at least one individual annuity policy from the respective insurance company administrative systems into an integrated portfolio of policies;

determining aggregate premiums and cash value for the integrated portfolio of policies to create an integrated cash value life insurance policy;

determining whether the integrated portfolio of policies creating the integrated cash value life insurance policy, satisfies a material change in benefits threshold;

identifying the compliance method from the first function to be used for an integrated cash value life insurance policy calculation of definitional limits of premium and cash value for the integrated portfolio of policies;

identifying the insurance interest rate (IIR) method from the second function for determining the method to be used in the definitional limit calculations;

identifying the face amount adjustment election from the fifth function for determining if the master policy is considered a level death benefit or increasing death benefit policy for tax compliance calculation purposes;

determining definitional limits on aggregate premium and cash value for the integrated portfolio of policies based on (i) the material change in benefits threshold, (ii) the compliance method, and (iii) the IIR;

analyzing, by coordinating analysis of data streams from separate computing systems communicatively coupled to different computing networks, whether the integrated cash value life insurance policy consisting of a portfolio of separate individual term insurance and annuity policies is compliant with the definitional limits for the integrated cash value life insurance policy;

notifying the insured of any compliance breaches by updating compliance status on an account accessible from the user interface while continuously analyzing the data streams from the separate computing systems communicatively coupled to different computing networks;

in response to the insured manipulating the plurality of functions via the user interface, a real-time communication exchange is initiated between the user interface and the modeling system and the user interface is updated in real-time to display permanent life tax compliance implications for an unbundled integrated cash value policy, wherein the updated user interface enables the insured to evaluate the unbundled integrated cash value policy's compliance prior to submitting one or more individual term and annuity policy applications, making changes to existing term and annuity contracts, increasing annuity funding, or taking cash distributions from an existing annuity; and in response to receiving the tax compliance implications to the unbundled integrated cash value policy through the user interface, the user interface enables the insured to submit the one or more individual term and annuity policy applications, request changes to an existing policy and increase annuity funding or take distributions from an annuity for the unbundled integrated cash value policy to one or more third-party systems associated with one or more insurance carriers.

* * * * *